United States Patent
Otsuki et al.

(10) Patent No.: US 9,080,480 B2
(45) Date of Patent: *Jul. 14, 2015

(54) EXHAUST PURIFICATION SYSTEM FOR INTERNAL COMBUSTION ENGINE

(75) Inventors: Hiroshi Otsuki, Susono (JP); Shigeki Nakayama, Gotenba (JP); Hiromasa Nishioka, Susono (JP); Katsuhiko Oshikawa, Tokyo (JP); Yoshihisa Tsukamoto, Susono (JP); Junichi Matsuo, Susono (JP); Yuichi Sobue, Susono (JP); Daichi Imai, Susono (JP); Kou Sugawara, Kakegawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/127,355

(22) PCT Filed: Jun. 29, 2012

(86) PCT No.: PCT/JP2012/067405
§ 371 (c)(1),
(2), (4) Date: Dec. 18, 2013

(87) PCT Pub. No.: WO2013/005850
PCT Pub. Date: Jan. 10, 2013

(65) Prior Publication Data
US 2014/0216016 A1   Aug. 7, 2014

(30) Foreign Application Priority Data

| Jul. 1, 2011 | (WO) | PCT/JP2011/065632 |
| Jul. 1, 2011 | (WO) | PCT/JP2011/065633 |
| Jul. 1, 2011 | (WO) | PCT/JP2011/065635 |
| Jul. 1, 2011 | (WO) | PCT/JP2011/065636 |
| Jul. 1, 2011 | (WO) | PCT/JP2011/065637 |
| Jul. 1, 2011 | (WO) | PCT/JP2011/065638 |
| Jul. 1, 2011 | (WO) | PCT/JP2011/065639 |
| Jul. 1, 2011 | (WO) | PCT/JP2011/065642 |
| Jul. 1, 2011 | (WO) | PCT/JP2011/065648 |

(51) Int. Cl.
*B01D 50/00* (2006.01)
*B01D 24/00* (2006.01)
(Continued)

(52) U.S. Cl.
CPC ............... *F01N 3/023* (2013.01); *B01D 46/00* (2013.01); *B01D 46/006* (2013.01);
(Continued)

(58) Field of Classification Search
CPC  Y02T 10/24; C04B 38/0006; B01D 53/9418; B01D 2255/20738; B01D 2258/012; B01D 2255/9155; B01D 2253/3425
See application file for complete search history.

(56) References Cited

U.S. PATENT DOCUMENTS

| 4,515,758 | A * | 5/1985 | Domesle et al. | 423/213.2 |
| 6,345,496 | B1 * | 2/2002 | Fuwa et al. | 60/274 |

(Continued)

FOREIGN PATENT DOCUMENTS

| EP | 0925830 A1 | 6/1999 |
| EP | 1297886 A1 | 4/2003 |

(Continued)

OTHER PUBLICATIONS

International Search Report issued in International Patent Application No. PCT/JP2012/067405 dated Feb. 13, 2013.

(Continued)

*Primary Examiner* — Amber Orlando
(74) *Attorney, Agent, or Firm* — Oliff PLC

(57) ABSTRACT

A wall flow type particulate filter is arranged inside the exhaust passage of an internal combustion engine where combustion is performed under an excess of oxygen. The particulate filter carries a solid acid. The solid acid has an acid strength which is higher than the acid strength of sulfurous acid and lower than the acid strength of sulfuric acid. To remove the ash from the particulate filter, ash atomization processing for rendering the state of the particulate filter a state where the exhaust gas which flows into the particulate filter is lowered in concentration of oxygen and the particulate filter is raised in temperature is temporarily performed.

17 Claims, 44 Drawing Sheets

(51) Int. Cl.

| | | |
|---|---|---|
| *B01D 39/06* | (2006.01) | |
| *B01D 39/20* | (2006.01) | |
| *B01D 39/14* | (2006.01) | |
| *F01N 3/023* | (2006.01) | |
| *B01D 46/24* | (2006.01) | |
| *B01D 46/00* | (2006.01) | |
| *F01N 3/022* | (2006.01) | |
| *F01N 3/035* | (2006.01) | |
| *F01N 3/021* | (2006.01) | |
| *B01D 46/32* | (2006.01) | |
| *B01D 53/64* | (2006.01) | |
| *F01N 3/08* | (2006.01) | |
| *B01D 41/00* | (2006.01) | |
| *B01D 53/82* | (2006.01) | |
| *F01N 3/00* | (2006.01) | |

(52) U.S. Cl.
CPC ....... *B01D 46/0061* (2013.01); *B01D 46/2418* (2013.01); *B01D 46/32* (2013.01); *B01D 53/64* (2013.01); *F01N 3/021* (2013.01); *F01N 3/0222* (2013.01); *F01N 3/0232* (2013.01); *F01N 3/035* (2013.01); *B01D 41/00* (2013.01); *B01D 53/82* (2013.01); *B01D 2257/302* (2013.01); *B01D 2259/40083* (2013.01); *B01D 2279/30* (2013.01); *F01N 3/00* (2013.01); *F01N 3/022* (2013.01); *F01N 3/085* (2013.01)

(56) References Cited

U.S. PATENT DOCUMENTS

| | | | | |
|---|---|---|---|---|
| 6,713,031 | B2* | 3/2004 | Harris et al. | 423/239.1 |
| 8,157,897 | B2* | 4/2012 | Meister et al. | 95/279 |
| 8,332,124 | B2* | 12/2012 | George et al. | 701/102 |
| 8,741,240 | B2 | 6/2014 | Hihara et al. | 423/213.2 |
| 2002/0025905 | A1* | 2/2002 | Harris et al. | 502/309 |
| 2006/0191412 | A1* | 8/2006 | Sellers et al. | 95/279 |
| 2007/0089403 | A1* | 4/2007 | Pfeifer et al. | 60/286 |
| 2007/0217978 | A1* | 9/2007 | Baican et al. | 423/213.2 |
| 2008/0148715 | A1* | 6/2008 | Osumi et al. | 60/295 |
| 2008/0202107 | A1* | 8/2008 | Boorse et al. | 60/301 |
| 2009/0000477 | A1* | 1/2009 | Meister et al. | 95/279 |
| 2009/0084090 | A1* | 4/2009 | Nakatsuji et al. | 60/299 |
| 2010/0257847 | A1* | 10/2010 | Nishioka et al. | 60/286 |
| 2011/0047991 | A1* | 3/2011 | Kato | 60/297 |
| 2011/0120088 | A1* | 5/2011 | George et al. | 60/274 |
| 2011/0144294 | A1 | 6/2011 | Bub et al. | |
| 2011/0268635 | A1* | 11/2011 | Boorse et al. | 423/213.7 |
| 2012/0034133 | A1* | 2/2012 | Patchett et al. | 422/172 |
| 2012/0073273 | A1* | 3/2012 | Asanuma et al. | 60/299 |
| 2012/0318134 | A1* | 12/2012 | Sellers et al. | 95/1 |
| 2014/0116033 | A1 | 5/2014 | Otsuki et al. | |
| 2014/0116034 | A1 | 5/2014 | Otsuki et al. | |

FOREIGN PATENT DOCUMENTS

| | | |
|---|---|---|
| EP | 1607467 A1 | 12/2005 |
| JP | A-10-33985 | 2/1998 |
| JP | A-11-123306 | 5/1999 |
| JP | H11-244701 A | 9/1999 |
| JP | A-2006-255539 | 9/2006 |
| JP | A-2006-289175 | 10/2006 |

OTHER PUBLICATIONS

Katsue Shibata, Tadamitsu Kiyoura, Jun Kitagawa, Takashi Sumiyoshi, Kozo Tanabe, "Acidic Properties of Binary Metal Oxides", Bulletin of the Chemical Society of Japan, vol. 46 (1973) No. 10 p. 2985-2988.
May 27, 2014 Office Action issued in Japanese Patent Application No. 2014-555657 w/translation.
May 27, 2014 Office Action issued in Japanese Patent Application No. 2014-555656 w/translation.
May 27, 2014 Office Action issued in Japanese Patent Application No. 2014-514345 w/translation.
Sep. 19, 2014 Office Action issued in U.S. Appl. No. 14/126,997.
Sep. 3, 2013 International Preliminary Report on Patentability in PCT Application No. PCT/JP2012/067404.
Sep. 3, 2013 International Preliminary Report on Patentability in PCT Application No. PCT/JP2012/067406.
May 21, 2014 Office Action issued in U.S. Appl. No. 14/126,997.
May 20, 2014 Office Action issued in U.S. Appl. No. 14/126,947.
Sep. 10, 2014 Office Action issued in U.S. Appl. No. 14/126,947.
U.S. Appl. No. 14/126,904, filed Dec. 17, 2013 in the name of Otsuki et al.
Jan. 7, 2014 International Preliminary Report on Patentability issued in PCT Application No. PCT/JP2012/067407.
Oct. 8, 2012 International Search Report issued in PCT Application No. PCT/JP2012/067407.
Dec. 22, 2014 Notice of Allowance issued in U.S. Appl. No. 14/126,904.
Jan. 14, 2014 Notice of Allowance issued in U.S. Appl. No. 14/126,947.
May 8, 2014 Office Action issued in U.S. Appl. No. 14/126,904.
Aug. 22, 2014 Office Action issued in U.S. Appl. No. 14/126,904.
Mar. 26, 2015 Corrected Notice of Allowability issued in U.S. Appl. No. 14/126,904.
Apr. 24, 2015 Corrected Notice of Allowability issued in U.S. Appl. No. 14/126,997.
May 8, 2015 Corrected Notice of Allowability issued in U.S. Appl. No. 14/126,997.
May 19, 2015 Corrected Notice of Allowability issued in U.S. Appl. No. 14/126,947.

* cited by examiner

EXHAUST GAS

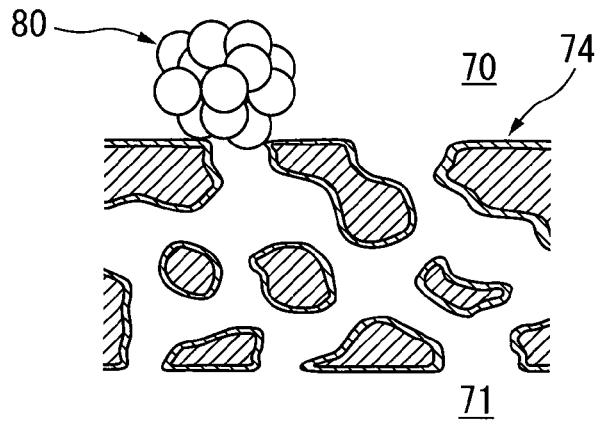
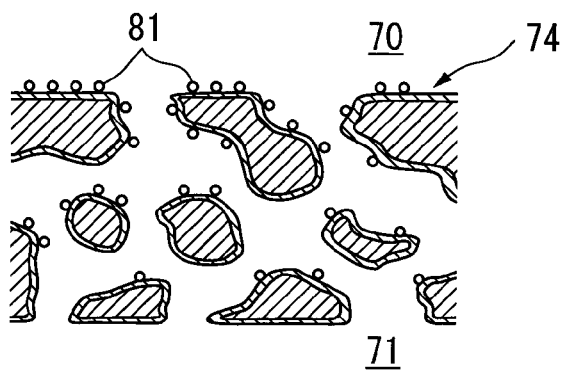
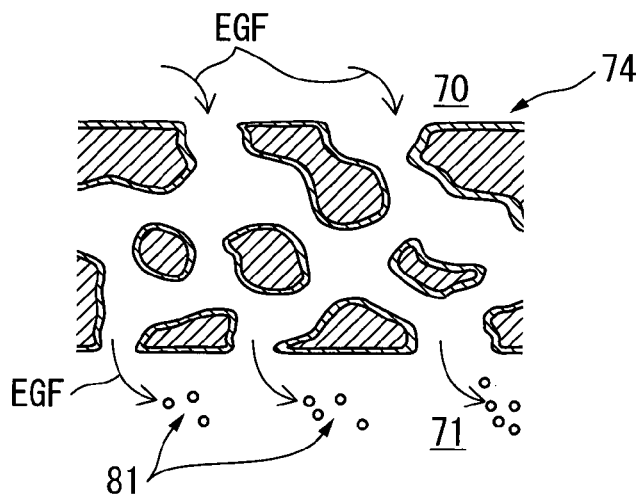

(EXCERPT FROM REFERENCE 1 (Fig. 4))

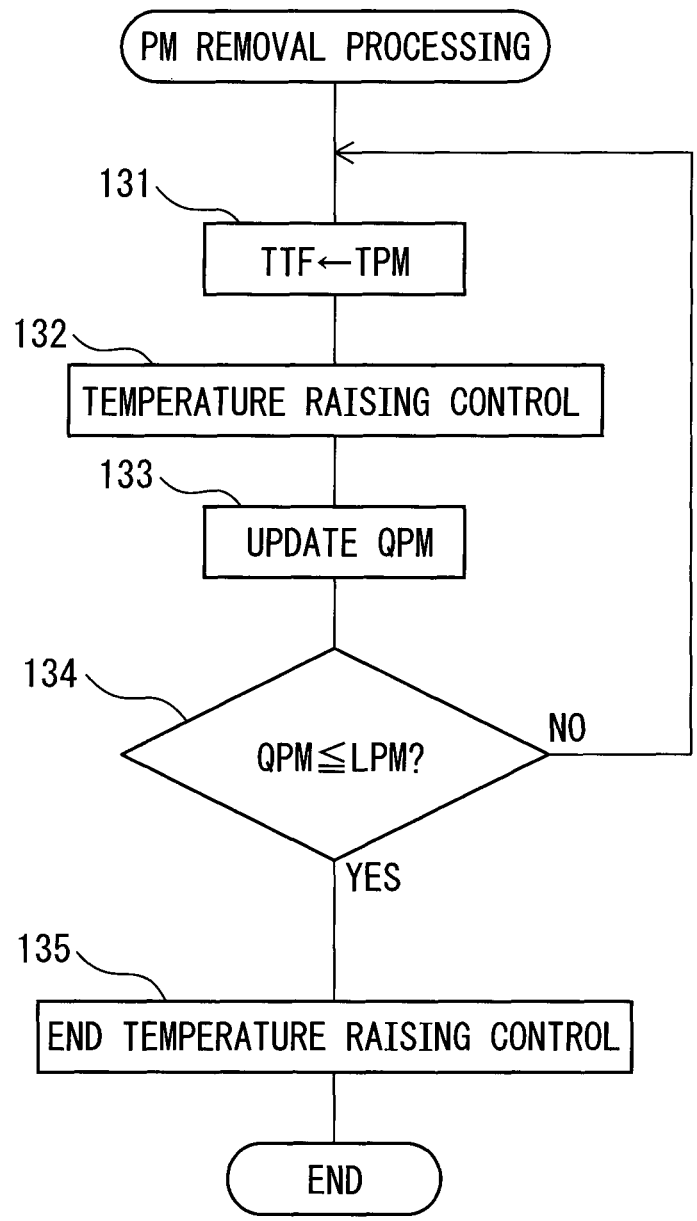

EXHAUST PURIFICATION SYSTEM FOR INTERNAL COMBUSTION ENGINE

TECHNICAL FIELD

The present invention relates to an exhaust purification system for an internal combustion engine.

BACKGROUND ART

Known in the art is a compression ignition type internal combustion engine which arranges a particulate filter for trapping particulate matter in the exhaust gas in an exhaust passage. By doing this, it is possible to suppress the amount of particulate matter which is exhausted into the atmosphere.

In this regard, as the engine operating time becomes longer, the amount of particulate matter on the particulate filter gradually becomes greater and the pressure loss of the particulate filter gradually becomes larger. As a result, the engine output is liable to fall.

Therefore, in general, PM removal processing, which burns the trapped particulate matter so as to remove it from the particulate filter, is temporarily performed. In this PM removal processing, the particulate filter is maintained in an oxidizing atmosphere while the temperature of the particulate filter is raised to the PM removal temperature, for example 600° C.

To efficiently perform the PM removal processing, various improvements have been proposed. For example, to lower the PM removal temperature, a particulate filter is known which carries on its surface a catalyst which is comprised of a solid super strong acid which carries an active metal (see PLT 1). Further, to efficiently remove particulate matter from the particulate filter, a particulate filter which holds a catalyst having a precious metal and a solid super strong acid on its surface is known (see PLT 2). Furthermore, known in the art is a particulate filter where, downstream of a wall flow type particulate filter on which a catalyst is carried for removing the particulate matter, a cracking catalyst is arranged for cracking the unburned hydrocarbons in the exhaust gas to produce hydrocarbons of smaller numbers of carbon atoms and where the carrier of the cracking catalyst is formed from a solid acid having a Hammett acidity function $H_0$ of −0.56 to −12 (see PLT 3). Note that the acid strength of the super strong acid is higher than the acid strength of sulfuric acid, while the Hammett acidity function $H_0$ of the super strong acid is −12 or less.

CITATIONS LIST

Patent Literature

PLT 1: Japanese Patent Publication No. 2006-289175 A1
PLT 2: Japanese Patent Publication No. 10-033985 A1
PLT 3: Japanese Patent Publication No. 11-123306 A1

SUMMARY OF INVENTION

Technical Problem

In this regard, exhaust gas contains noncombustible ingredients called "ash". This ash is trapped along with the particulate matter by the particulate filter. In this regard, even if PM removal processing is performed, the ash will not burn or vaporize but will remain on the particulate filter. For this reason, as the engine operating time becomes longer, the amount of ash on the particulate filter will gradually increase and the pressure loss of the particulate filter will gradually become larger. As a result, even if PM removal processing is repeatedly performed, the engine output is liable to drop.

In the above PLT 1, 2, and 3, this problem is not considered at all. Nor then further is any solution disclosed. In particular, in PLT 3, the ash is trapped by the wall flow type particulate filter, so the cracking catalyst which is arranged downstream of the particulate filter never contacts ash.

Solution to Problem

According to the present invention, there is provided an exhaust purification system for an internal combustion engine in which fuel is burned under an oxygen excess, in which a wall flow type particulate filter for trapping particulate matter in the exhaust gas is arranged inside of an exhaust passage, and in which ash is trapped along with particulate matter by the particulate filter, the exhaust purification system characterized in that the particulate filter carries a solid acid, the solid acid having an acid strength which is higher than the acid strength of sulfurous acid and lower than the acid strength of sulfuric acid, and the exhaust purification system is provided with an ash atomizing means temporarily performing ash atomization processing which renders the state of the particulate filter a state where the concentration of oxygen in the exhaust gas which flows into the particulate filter is lowered and the temperature of the particulate filter is raised to remove ash from the particulate filter.

Preferably, the acid strength of the solid acid is expressed by one or more parameters selected from a Hammett acidity function, hydrogen ion exponent, acid dissociation constant, and measurement value obtained by the temperature programmed desorption method using ammonia.

Preferably, in the standard state (25° C., 1 atm ($10^5$ Pa)), the solid acid has a Hammett acidity function smaller than −0.83 and larger than −12.

Preferably, the solid acid is formed from one or more complex oxides which are selected from silica-alumina, silica-titania, titania-zirconia, silica-zirconia, silica-gallium oxide, titania-alumina, silica-yttrium oxide, alumina-zirconia, silica-lanthanum oxide, titania-cadmium oxide, titania-stannous oxide, titania-zinc oxide, zinc oxide-silica, and zinc oxide-cadmium oxide. More preferably, the solid acid is formed from silica-alumina.

Preferably, the ash atomizing means makes the exhaust gas which flows into the particulate filter substantially the stoichiometric air-fuel ratio or rich in the air-fuel ratio.

Preferably, the ash atomizing means makes the temperature of the particulate filter about 600° C. in the ash atomization processing.

Preferably, the exhaust purification system is further provided with a PM removing means for temporarily performing PM removal processing which renders the state of the particulate filter a state where the temperature of the particulate filter is raised in an oxidizing atmosphere to remove the particulate matter trapped by the particulate filter, and the ash atomizing means performs the ash atomization processing following the PM removal processing. More preferably, the ash atomizing means judges if the ash atomization processing should be performed and performs the ash atomization processing following a PM removal processing which is firstly performed after it is judged that ash atomization processing should be performed. More preferably, the ash atomizing means judges if the ash atomization processing should be performed on the basis of the quantity of ash which is not atomized on the particulate filter. More preferably, an NOx storage reduction catalyst which stores NOx which is contained in the exhaust gas when the inflowing exhaust gas is lean in air-fuel ratio and releases the stored NOx if the inflowing exhaust gas becomes the stoichiometric air-fuel ratio or rich in the air-fuel ratio is arranged in the exhaust passage, the exhaust purification system is provided with an SOx releasing means for temporarily performing SOx release processing which renders the state of the NOx storage reduction catalyst a state where the exhaust gas which flows into the NOx storage reduction catalyst is rich in air-fuel ratio and the temperature of the NOx storage reduction catalyst is raised to the SOx release temperature to make the NOx storage reduction catalyst release SOx, and the SOx releasing means performs the SOx release processing following the PM removal processing. More preferably, when the ash atomization processing and SOx release processing should be performed, the SOx releasing means performs the SOx release processing following the PM removal processing and the ash atomizing means omits the ash atomization processing.

Preferably, the PM removing means ends the PM removal processing so that the particulate filter has a predetermined set residual quantity of the particulate matter remaining on it. More preferably, the ash atomizing means judges if the ash atomization processing should be performed and performs the ash atomization processing following a PM removal processing which is firstly performed after it is judged that ash atomization processing should be performed. More preferably, the ash atomizing means judges if the ash atomization processing should be performed on the basis of the quantity of ash which is not atomized on the particulate filter. More preferably, furthermore, the particulate filter carries a catalyst which has an oxygen storage ability, and the set residual quantity is set to at least the quantity which is required for consuming substantially all of the oxygen which is stored in the catalyst at the time of start of the ash atomization processing. More preferably, the set residual quantity is set to not more than the quantity which is required for making the ash removal efficiency an allowable lower limit efficiency.

Preferably, the ash atomizing means repeatedly performs the ash atomization processing at a predetermined set interval, finds the quantity of ash which was processed by the ash atomization processing, and updates the set interval on the basis of the found quantity of processed ash. More preferably, the ash atomizing means perform the ash atomization processing with a plurality of mutually different intervals, finds the quantities of ash processed by the respective ash atomization processings, and updates the set interval on the basis of these intervals and found quantities of processed ash. More preferably, furthermore, the exhaust purification system is provided with a PM removing means for temporarily performing PM removal processing which renders the state of the particulate filter a state where the temperature of the particulate filter is raised in an oxidizing atmosphere to remove the particulate matter trapped by the particulate filter, and the ash atomizing means performs the ash atomization processing following the PM removal processing. More preferably, the ash atomizing means judges if the ash atomization processing should be performed and performs the ash atomization processing following a PM removal processing which is firstly performed after it is judged that ash atomization processing should be performed. More preferably, the ash removing means judges if the ash atomization processing should be performed on the basis of the quantity of ash which is not atomized on the particulate filter.

Preferably, upstream of the particulate filter in the exhaust passage, an SOx storage agent is arranged, the SOx storage agent having the property of storing SOx in the exhaust gas which flows in when the SOx storage agent is low in temperature or the exhaust gas which flows into the SOx storage agent is high in concentration of oxygen and of releasing the stored SOx if the SOx storage agent becomes high in temperature or if the exhaust gas which flows into the SOx storage agent becomes low in concentration of oxygen, the exhaust purification system is further provided with a PM removing means for temporarily performing PM removal processing which renders the state of the particulate filter a state where the temperature of the particulate filter is raised in an oxidizing atmosphere to remove the particulate matter trapped by the particulate filter, and the SOx storage agent releases SOx when the PM removal processing is performed. More preferably, the exhaust purification system is further provided with an SOx increasing means for temporarily performing SOx increasing processing which increases the quantity of SOx that is released from the SOx storage agent and is fed to the solid acid, and the SOx increasing means performs the SOx increasing processing before the PM removal processing. More preferably, the SOx increasing processing is SOx increasing temperature processing which raises the temperature of the SOx storage agent to make the SOx storage agent release SOx. More preferably, in the SOx increasing temperature processing, the temperature of the SOx storage agent is raised to the SOx release temperature, in the PM removal processing, the temperature of the particulate filter is raised to the PM removal temperature, and the SOx release temperature is set lower than the PM removal temperature. More preferably, in the SOx increasing temperature processing, the temperature of the SOx storage agent is made the SOx release temperature, the SOx release processing is performed for the SOx release time, and one or both of the SOx release temperature and SOx release time are set so that the SOx release speed of the SOx storage agent from when the SOx increasing temperature processing is started to when the PM removal processing is ended is substantially maintained in an allowable range. More preferably, the exhaust purification system is further provided with an SOx increasing means for temporarily performing SOx increasing processing which increases the quantity of SOx that is released from the SOx storage agent and is fed to the solid acid, and the SOx increasing means judges if the quantity of exhaust gas which flows into the particulate filter is greater than a predetermined set quantity and performs SOx increasing processing when judging that the quantity of exhaust gas which flows into the particulate filter is greater than the set quantity. More preferably, the SOx increasing means judges that the quantity of exhaust gas which flows into the particulate filter is greater than the set quantity when an engine acceleration operation is performed. More preferably, the SOx increasing processing is SOx increasing oxygen concentration processing which maintains the particulate filter in an oxidizing atmosphere while making the concentration of oxygen in the exhaust gas which flows into the SOx storage agent drop to make the SOx storage agent release SOx.

Preferably, the ash atomizing means finds the ash atomization ability of the solid acid after the ash atomization processing is performed and judge whether to perform the next ash atomization processing on the basis of the found ash atomization ability. More preferably, the ash atomizing means performs the next ash atomization processing when the ash atomization ability of the solid acid is higher than a predetermined set ability. More preferably, the ash atomization ability of the solid acid is expressed by the number of active acid points of the solid acid. More preferably, the solid acid is temporarily fed with ammonia in a reducing atmosphere, the quantity of the ammonia which was held at the solid acid is found, and the ash atomization ability is found on the basis of the found quantity of ammonia. More preferably, an ammonia producing catalyst is arranged upstream of the particulate filter in the exhaust passage, the ammonia producing catalyst producing ammonia from the NOx in the exhaust gas which flows in when the inflowing exhaust gas is rich in the air-fuel ratio, and, to produce ammonia, the exhaust gas which flows into the ammonia producing catalyst is temporarily switched to rich in air-fuel ratio. More preferably, downstream of the particulate filter inside of the exhaust passage, an NOx sensor is attached for detecting the quantity of NOx in the exhaust gas, and the quantity of held ammonia is found on the basis of the quantity of NOx which flows out from the particulate filter under an oxidizing atmosphere after ammonia is fed to the solid acid.

Preferably, a quantity of the solid acid which is carried per unit volume of the particulate filter at a downstream side part of the particulate filter is greater than a quantity of the solid acid which is carried per unit volume of the particulate filter at an upstream side part of the particulate filter. More preferably, the quantity of the solid acid which is carried per unit volume of the particulate filter is continuously increased the further from the upstream end of the particulate filter to the downstream end of the particulate filter.

Preferably, the particulate filter further carries a catalyst which has an oxidation function and the catalyst is formed from ceria and silver.

Preferably, the particulate filter has exhaust gas inflow passages and exhaust gas outflow passages alternately arranged through porous partition walls.

Advantageous Effects of Invention

The pressure loss of the particulate filter can be sufficiently suppressed.

BRIEF DESCRIPTION OF DRAWINGS

FIG. 4A is a view which explains an ash removal action of an ash atomization agent.
FIG. 4B is a view which explains an ash removal action of an ash atomization agent.
FIG. 4C is a view which explains an ash removal action of an ash atomization agent.
FIG. 21 is a flow chart which shows a routine for performing PM removal processing of the fourth embodiment according to the present invention.

DESCRIPTION OF EMBODIMENTS

Figure 1:
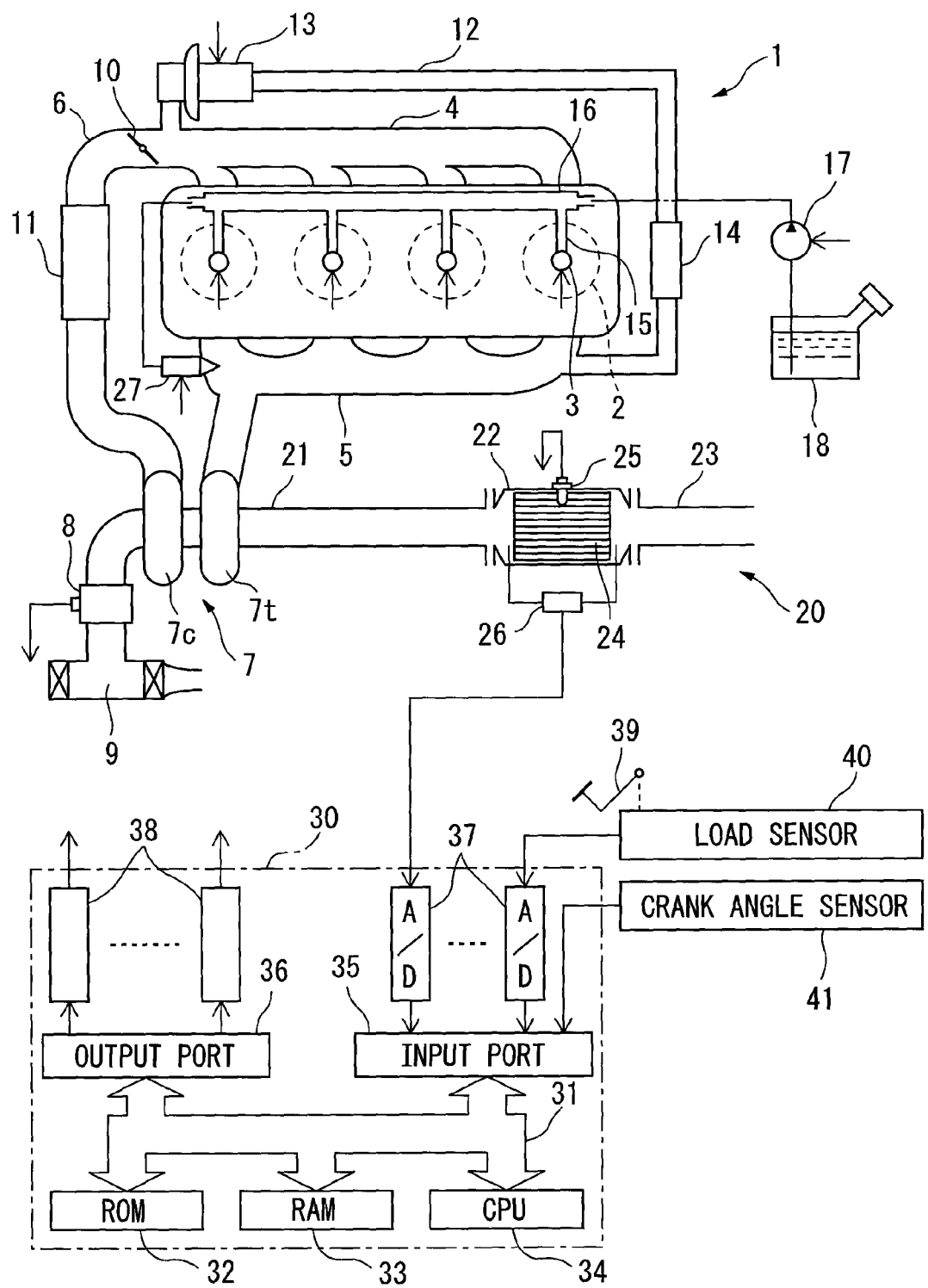
FIG. 1 is an overview of an internal combustion engine.

FIG. 1 shows a first embodiment of the present invention. Referring to FIG. 1, 1 indicates a body of a compression ignition type internal combustion engine, 2 a combustion chamber of each cylinder, 3 an electronically controlled fuel injector which injects fuel into a combustion chamber 2, 4 an intake manifold, and 5 an exhaust manifold. The intake manifold 4 is connected through an intake duct 6 to an outlet of a compressor 7c of an exhaust turbocharger 7, while an inlet of the compressor 7c is connected through an air flowmeter 8 to an air cleaner 9. Inside the intake duct 6, an electrically controlled throttle valve 10 is arranged. Furthermore, around the intake duct 6, a cooling device 11 is arranged for cooling the intake air which flows through the inside of the intake duct 6. On the other hand, the exhaust manifold 5 is connected to an inlet of an exhaust turbine 7t of the exhaust turbocharger 7, while an outlet of the exhaust turbine 7t is connected to an exhaust post-treatment device 20.

The exhaust manifold 5 and the intake manifold 4 are connected to each other through an exhaust gas recirculation (hereinafter referred to as "EGR") passage 12. Inside the EGR passage 12, an electrically controlled EGR control valve 13 is arranged. Further, around the EGR passage 12, a cooling device 14 is arranged for cooling the EGR gas which flows through the inside of the EGR passage 12. On the other hand, each fuel injector 3 is connected through a fuel runner 15 to a common rail 16. The inside of this common rail 16 is supplied with fuel from an electronically controlled variable discharge fuel pump 17. The fuel which is supplied to the inside of the common rail 16 is supplied through each fuel runner 15 to fuel injectors 3. In the first embodiment according to the present invention, this fuel is diesel oil. In another embodiment, the internal combustion engine is comprised of a spark ignition type internal combustion engine. In this case, the fuel is comprised of gasoline.

The exhaust post-treatment device 20 is provided with an exhaust pipe 21 which is connected to the outlet of the exhaust turbine 7t, a catalytic converter 22 which is connected to the exhaust pipe 21, and an exhaust pipe 23 which is connected to the catalytic converter 22. Inside of the catalytic converter 22, a wall flow type particulate filter 24 is arranged.

The catalytic converter 22 is provided with a temperature sensor 25 for detecting the temperature of the particulate filter 24. In another embodiment, a temperature sensor is arranged in the exhaust pipe 21 to detect the temperature of the exhaust gas which flows into the particulate filter 24. Furthermore, in another embodiment, a temperature sensor for detecting the temperature of the exhaust gas which flows out from the particulate filter 24 is arranged in the exhaust pipe 23. The temperatures of the exhaust gas express the temperature of the particulate filter 24.

The catalytic converter 22 is further provided with a pressure loss sensor 26 for detecting the pressure loss of the particulate filter 24. In the first embodiment according to the present invention, the pressure loss sensor 26 is comprised of a pressure difference sensor for detecting the pressure difference upstream and downstream of the particulate filter 24. In another embodiment, the pressure loss sensor 26 is comprised of a sensor which is attached to the exhaust pipe 21 and detects the engine exhaust pressure.

On the other hand, the exhaust manifold 5 is provided with a fuel addition valve 27. This fuel addition valve 27 is supplied with fuel from the common rail 16. From the fuel addition valve 27, fuel is added inside of the exhaust manifold 5. In another embodiment, the fuel addition valve 27 is arranged in the exhaust pipe 21.

An electronic control unit 30 is comprised of a digital computer which is provided with components which are connected with each other by a bidirectional bus 31 such as a ROM (read only memory) 32, RAM (random access memory) 33, CPU (microprocessor) 34, input port 35, and output port 36. The output signals of the air flowmeter 8, temperature sensor 25, and pressure difference sensor 26 are input through respectively corresponding AD converters 37 to the input port 35. Further, the accelerator pedal 39 is connected to a load sensor 40 which generates an output voltage which is proportional to the amount of depression L of the accelerator pedal 39. The output voltage of the load sensor 40 is input through a corresponding AD converter 37 to the input port 35. Furthermore, the input port 35 is connected to a crank angle sensor 41 which generates an output pulse each time the crankshaft rotates by for example 15°. At the CPU 34, the engine speed Ne is calculated on the basis of the output pulse from the crank angle sensor 41. On the other hand, the output port 36 is connected through corresponding drive circuits 38 to the fuel injectors 3, throttle valve 10 drive device, EGR control valve 13, fuel pump 17, and fuel addition valve 27.

Figure 2A:
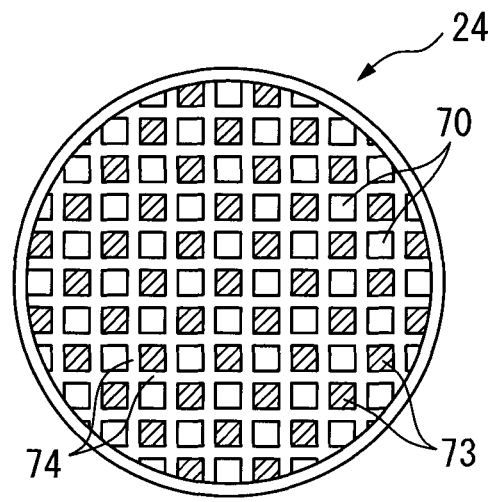
FIG. 2A is a front view of a particulate filter.
Figure 2B:
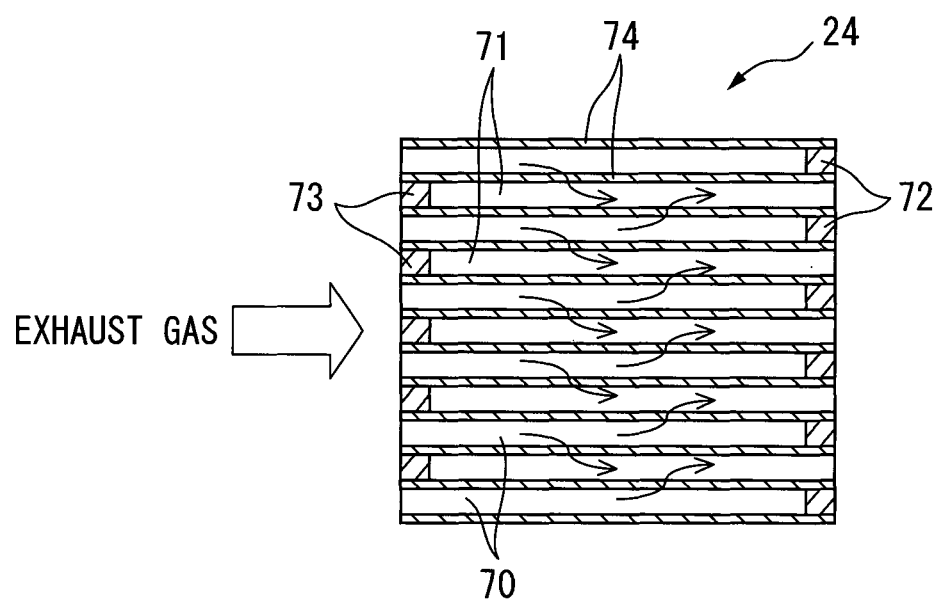
FIG. 2B is a side cross-sectional view of a particulate filter.

FIG. 2A and FIG. 2B show the structure of the wall flow type particulate filter 24. Note that, FIG. 2A shows a front view of the particulate filter 24, while FIG. 2B shows a side cross-sectional view of the particulate filter 24. As shown in FIG. 2A and FIG. 2B, the particulate filter 24 forms a honeycomb structure which is provided with a plurality of exhaust flow passages 70, 71 which extend in parallel with each other. These exhaust flow passages 70, 71 are comprised of exhaust gas inflow passages 70 which have upstream ends which are opened and have downstream ends which are closed by plugs 72 and exhaust gas outflow passages 71 which have upstream ends which are closed by plugs 73 and have downstream ends which are opened. Note that, in FIG. 2A, the hatched parts show plugs 73. Therefore, the exhaust gas inflow passages 70 and exhaust gas outflow passages 71 are alternately arranged through thin partition walls 74. In other words, the exhaust gas inflow passages 70 and exhaust gas outflow passages 71 are comprised of exhaust gas inflow passages 70 each of which are surrounded by four exhaust gas outflow passages 71 and of exhaust gas outflow passages 71 each of which are surrounded by four exhaust gas inflow passages 70. In another embodiment, the exhaust flow passages are comprised of exhaust gas inflow passages which have upstream ends and downstream ends which are opened and exhaust gas outflow passages which have upstream ends which are closed by plugs and downstream ends which are opened.

The particulate filter 24 is for example formed from a porous material such as cordierite. Therefore, the exhaust gas which flows into the exhaust gas inflow passages 70 flows out, as shown by the arrows in FIG. 2B, through the insides of the surrounding partition walls 74 to the insides of the adjoining exhaust gas outflow passages 71.

Figure 3A:
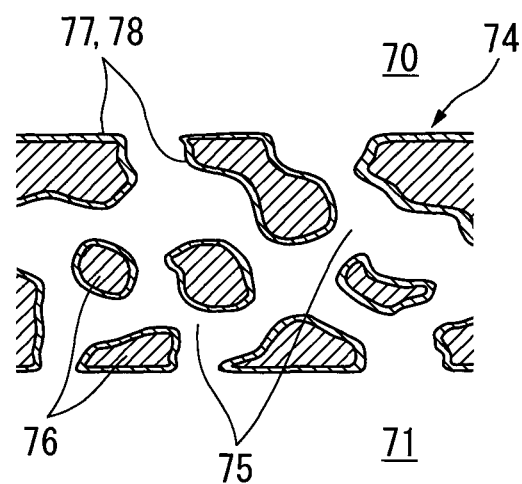
FIG. 3A is a partial enlarged cross-sectional view of a partition wall.

FIG. 3A shows an enlarged cross-sectional view of a partition wall 74. As shown in FIG. 3A, a partition wall 74 has a plurality of pores 75 which extend from the exhaust gas inflow passage 70 to the exhaust gas outflow passage 71. In the first embodiment according to the present invention, the average pore size of the particulate filter 24 is from 10 µm to 25 µm.

Furthermore, as shown in FIG. 3A, the surfaces of the particulate filter 24, that is, the two side surfaces of the partition wall 74 and the inside wall surfaces of the pores 75, carry a catalyst 77 which has an oxidation function and an ash atomization agent 78. That is, as shown in FIG. 3B, the base material 76 which forms the partition wall 74 is formed with a coating of the catalyst 77 and ash atomization agent 78.

The catalyst 77 which has the oxidation function, for example, is formed from a carrier which is formed from alumina $Al_2O_3$, ceria $CeO_2$, praseodymium oxide $Pr_6O_{11}$, neodymium oxide $Nd_2O_3$, lanthanum oxide $La_2O_3$, or other such base metal oxide and platinum Pt, palladium Pd, silver Ag, or other such precious metal which is carried on this carrier. In one embodiment, the catalyst 77 is formed from a carrier which is formed from ceria $CeO_2$ and silver Ag which is carried on the carrier. In another embodiment, the catalyst 77 is formed from a carrier which is formed from alumina $Al_2O_3$ and platinum Pt which is carried on the carrier.

On the other hand, the ash atomization agent 78 is formed from a solid acid which has an acid strength which is higher than the acid strength of sulfurous acid $H_2SO_3$ and lower than the acid strength of sulfuric acid $H_2SO_4$. In one embodiment, the ash atomization agent 78 is formed from amorphous silica $(SiO_2)$-alumina $(Al_2O_3)$.

Figure 3B:
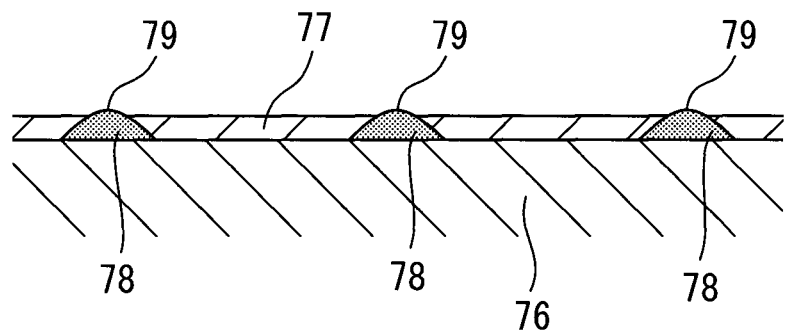
FIG. 3B is a partial enlarged cross-sectional view of a particulate filter which shows the surface of the particulate filter.

As shown in FIG. 3B, the ash atomization agent 78 and solid acid have a plurality of acid points 79. These acid points 79 are dispersed with each other.

In the combustion chambers 2, fuel is burned in an oxygen excess. Therefore, in so far as fuel is not secondarily supplied from the fuel injectors 3 and fuel addition valves 27, the particulate filter 24 is in an oxidizing atmosphere. In other words, the ratio of the air and fuel (hydrocarbons) which are fed into the engine intake passage, combustion chambers 2, and exhaust passage upstream of the catalytic converter 22, that is, the air-fuel ratio of the exhaust gas which flows into the catalytic converter 22, is usually maintained lean.

The exhaust gas contains particulate matter which is mainly comprised of solid carbon. This particulate matter is trapped on the particulate filter 24. Further, the particulate filter 24 is in an oxidizing atmosphere. The particulate filter 24 is provided with a catalyst 77 which has an oxidation function, so the particulate matter which is trapped at the particulate filter 24 is successively oxidized. However, if the amount of the trapped particulate matter becomes greater than the amount of particulate matter to be oxidized, the particulate matter gradually builds up on the particulate filter 24. If the amount of buildup of particulate matter increases, a drop in the engine output ends up being invited. Therefore, when the amount of buildup of particulate matter increases, the built-up particulate matter has to be removed. In this case, if raising the temperature of the particulate filter 24 under an oxygen atmosphere, the built-up particulate matter is oxidized and removed.

Therefore, in the first embodiment according to the present invention, when the amount of particulate matter which has built up on the particulate filter 24 exceeds the allowable upper limit amount, PM removal processing which renders the state of the particulate filter 24 a state where the temperature of the particulate filter 24 is raised to the PM removal temperature under an oxidizing atmosphere to remove the particulate matter on the particulate filter 24 by oxidation is temporarily performed. As a result, the particulate matter on the particulate filter 24 is removed and the pressure loss of the particulate filter 24 is reduced.

In this regard, exhaust gas also contains ash. This ash is also trapped by the particulate filter 24 along with the particulate matter. In this case, the particle size of the ash is 0.1 µm to 0.5 µm or so or considerably smaller than the average pore size of the particulate filter 24 (10 µm to 25 µm). However, the ash strikes the surfaces or inside wall surfaces of the pores of the particulate filter 24 or the particulate matter or ash which is trapped at the particulate filter 24 and is thereby trapped. The fact that this ash is mainly comprised of calcium sulfate $CaSO_4$, calcium zinc phosphate $Ca_{19}Zn_2(PO_4)_{14}$, or other such calcium salt is as confirmed by the present inventors. Calcium Ca, zinc Zn, and phosphorus P are derived from the engine lubrication oil, while sulfur S is derived from the fuel. That is, if explaining calcium sulfate $CaSO_4$ as an example, engine lubrication oil flows into the combustion chambers 2 where it is burned. The calcium Ca in the lubrication oil bonds with the sulfur S in the fuel whereby calcium sulfate $CaSO_4$ is produced.

Even if PM removal processing is performed, the ash will not burn or vaporize. Further, each time PM removal processing is performed, the particulate matter which was present between the ash particles is removed and the ash particles are exposed to a high temperature, so the ash particles easily aggregate. Therefore, the ash on the particulate filter 24 becomes larger in particle size, so it is difficult for the ash to pass through the pores of the particulate filter 24. In this way, ash remains on the particulate filter 24. As a result, as the engine operating time becomes longer, the amount of ash on the particulate filter 24 gradually increases and the pressure loss of the particulate filter 24 gradually becomes larger. For this reason, even if PM removal processing is repeatedly performed, the engine output is liable to fall.

Therefore, in the first embodiment according to the present invention, the particulate filter 24 carries an ash atomization agent 78. This ash atomization agent 78 has the property of atomizing and holding the ash on the particulate filter 24 in the state where the concentration of oxygen in the exhaust gas which flows into the particulate filter 24 is lowered and the temperature of the particulate filter 24 is raised and of releasing the held atomized ash in the state where the exhaust gas which flows into the particulate filter 24 contains SOx under an oxidizing atmosphere.

On top of this, ash atomization processing which renders the state of the particulate filter 24 a state where the concentration of oxygen in the exhaust gas which flows into the particulate filter 24 is lowered and the temperature of the particulate filter 24 is raised to remove the ash from the particulate filter 24 is temporarily performed.

As a result, the ash on the particulate filter 24 is removed from the particulate filter 24. Therefore, the increase in the pressure loss of the particulate filter 24 due to the ash is suppressed. This will be explained further with reference to FIG. 4A to FIG. 5B.

FIG. 4A shows the state where the particulate filter 24 traps the ash 80.

Figure 5A:
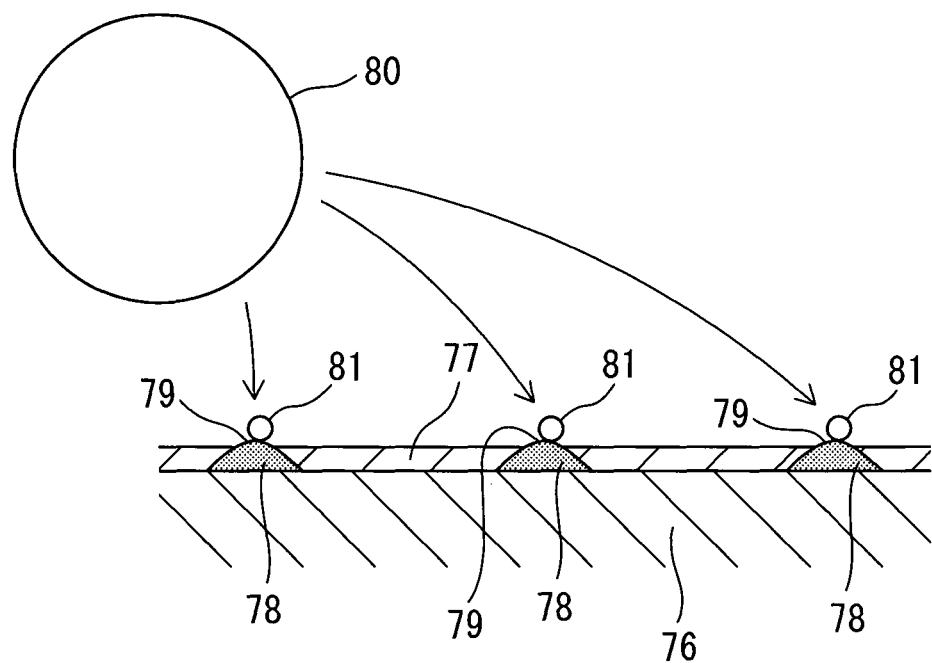
FIG. 5A is a view which explains an ash removal action of an ash atomization agent.

Next, if ash atomization processing is performed, as shown in FIG. 4B, the ash is atomized and the atomized ash 81 is held in a dispersed state by the ash atomization agent 78. In more detail, as shown in FIG. 5A, atomized ash 81 is formed from the large particle size ash 80. The atomized ash 81 is held at the acid points 79 of the ash atomization agent 78.

Figure 5B:
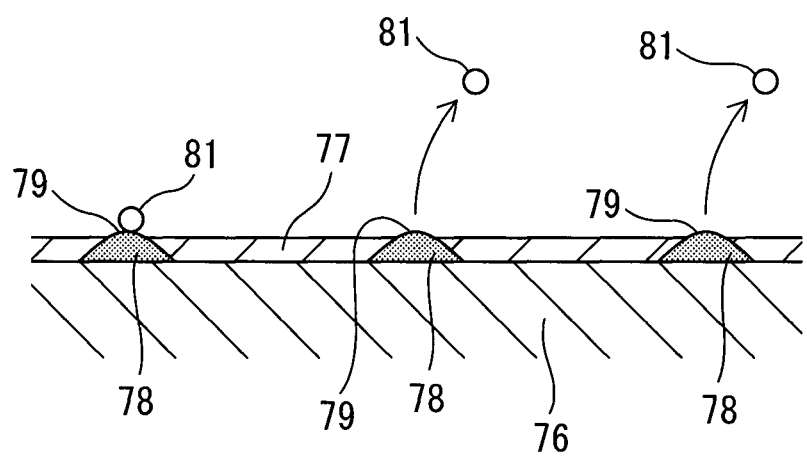
FIG. 5B is a view which explains an ash removal action of an ash atomization agent.

Next, the ash atomization processing is completed and the engine is returned to normal operation. That is, the exhaust gas which flows into the particulate filter 24 is returned to a lean air-fuel ratio. Further, at this time, the exhaust gas contains SOx. Therefore, the state of the particulate filter 24 is rendered a state in which the exhaust gas which flows into the particulate filter 24 under an oxidizing atmosphere contains SOx. As a result, the atomized ash 81 is released from the ash atomization agent 78. More particularly, as shown in FIG. 5B, the atomized ash 81 is released from the acid points of the ash atomization agent 78. The atomized ash 81 which is released from the ash atomization agent 78, as shown in FIG. 4C, riding the exhaust gas flow EGF, passes through the pores of the particulate filter 24 to flow out to the exhaust gas outflow passage 71.

Therefore, if the particulate filter 24 carries the ash atomization agent 78 and performs ash atomization processing temporarily, the ash can be removed from the particulate filter 24. The idea of atomizing the ash to remove it from the particulate filter in this way has never existed before this.

The ash removal action due to the ash atomization agent 78 is believed to be due to the following such mechanism. Below, the case of the ash being formed from calcium sulfate $CaSO_4$ will be explained as an example. However, the same is applicable to the case where the ash is formed from another substance.

Figure 6A:
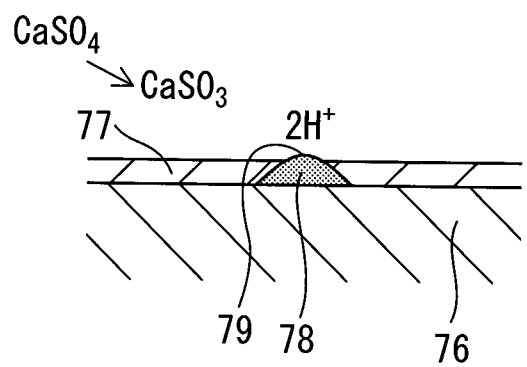
FIG. 6A is a view which explains the mechanism of an ash removal action.

If ash atomization processing is performed, that is, if the state of the particulate filter 24 is rendered a state where the concentration of oxygen in the exhaust gas which flows into the particulate filter 24 is lowered and the temperature of the particulate filter 24 is raised, as shown in FIG. 6A, the equilibrium between the calcium sulfate $CaSO_4$ which forms the ash and for example the calcium sulfite $CaSO_3$ slants in a direction where calcium sulfite $CaSO_3$ is produced ($CaSO_4 \rightarrow CaSO_3$). In other words, calcium sulfate $CaSO_4$ is destabilized. Note that at this time, the acid points 79 of the ash atomization agent 78 hold hydrogen ions H.

Figure 6B:
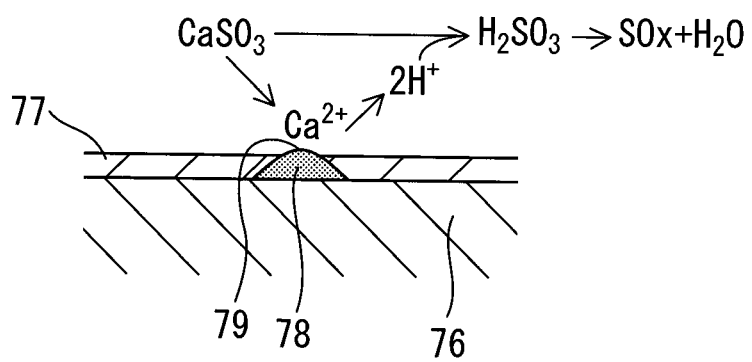
FIG. 6B is a view which explains the mechanism of an ash removal action.

As explained above, the acid strength of the ash atomization agent 78 is higher than the acid strength of sulfurous acid $H_2SO_3$. The fact of the acid strength being high means the hydrogen ions $H^+$ can be easily released. For this reason, as shown in FIG. 6B, the ash atomization agent 78 releases hydrogen ions $H^+$ and receives calcium ions $Ca^{2+}$ from calcium sulfite $CaSO_3$ at the acid points 79. In this way, the ash is atomized into the form of calcium ions $Ca^{2+}$ and held on the ash atomization agent 78. On the other hand, calcium sulfite $CaSO_3$ receives hydrogen ions $H^+$ from the ash atomization agent 78 and releases calcium ions $Ca^{2+}$, therefore sulfurous acid $H_2SO_3$ is formed. This sulfurous acid $H_2SO_3$ is next broken down into water $H_2O$ and sulfur dioxide $SO_2$ which flow out from the particulate filter 24.

Figure 6C:
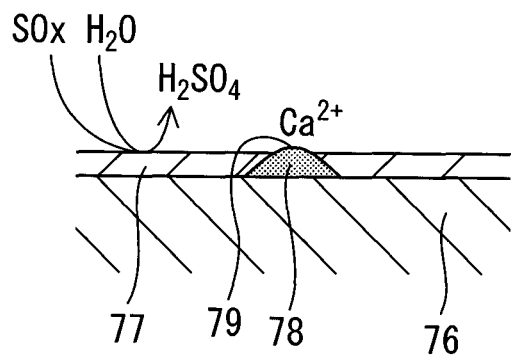
FIG. 6C is a view which explains the mechanism of an ash removal action.
Figure 6D:
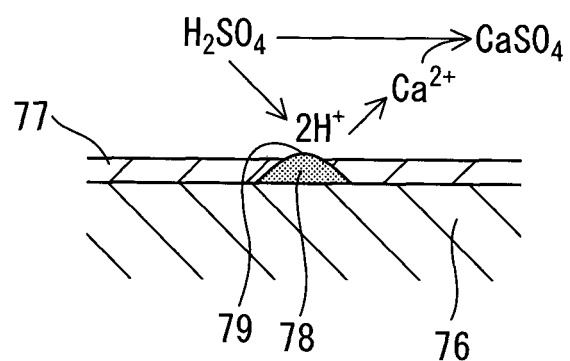
FIG. 6D is a view which explains the mechanism of an ash removal action.

Next, if the ash atomization processing is completed, that is, the state of the particulate filter 24 is returned to a state where the exhaust gas which flows into the particulate filter 24 in an oxidizing atmosphere contains SOx, as shown in FIG. 6C, sulfuric acid $H_2SO_4$ is produced from the SOx and water $H_2O$ which are contained in the exhaust gas ($SOx + H_2O \rightarrow H_2SO_4$). As explained above, the acid strength of the ash atomization agent 78 is lower than the acid strength of sulfuric acid $H_2SO_4$. For this reason, as shown in FIG. 6D, sulfuric acid $H_2SO_4$ releases hydrogen ions $H^+$ and receives calcium ions $Ca^{2+}$ from ash atomization agent 78. Therefore, calcium sulfate $CaSO_4$ is formed ($Ca^{2+} + SO_4^{2-} \rightarrow CaSO_4$). On the other hand, the ash atomization agent 78 receives hydrogen ions $H^+$ and releases calcium ions $Ca^{2+}$ at the acid points 79. In this way, the ash is disassociated from the acid points 79 and released from the ash atomization agent 78. In other words, the acid points 79 are regenerated or reactivated.

What should be noted here is that one acid point 79 holds one calcium ion $Ca^{2+}$ and one molecule of calcium sulfate $CaSO_4$ is produced from one calcium ion $Ca^{2+}$. This means that the ash is atomized to a size of single molecules. In this way, the particle size of the atomized ash 81 is 1 nm or less. Therefore, the ash can easily pass through the pores of the particulate filter 24. Further, even in the state where the atomized ash 81 is held at the ash atomization agent 78, the pressure loss of the particulate filter 24 can be sufficiently reduced.

Note that, the atomized ash is liable to reaggregate in the pores of the particulate filter 24. However, the atomized ash is extremely small, so even if reaggregating, it can easily pass through the particulate filter 24.

The above-mentioned mechanism is supported by the following test results.

Calcium sulfate particles and solid acid particles were mixed to prepare a first sample. As the solid acid particles, silica-alumina (N633HN made by JGC C&C (alumina content: 25 wt %, Si/Al ratio: 2.3, specific surface area: 380 m²/g) was used. The first sample was placed in a reaction tube and the reaction tube was supplied with nitrogen gas while heating the reaction tube so that the temperature TR of the reaction tube was raised to and held at about 600° C. At this time, the quantity QSOx of SOx in the gas which flowed out from the reaction tube was measured. Further, a comparative sample comprised of calcium sulfate particles and solid acid particles separated was placed in a reaction tube, similarly treated, and measured for the quantity QSOx of SOx outflow.

Figure 7A:
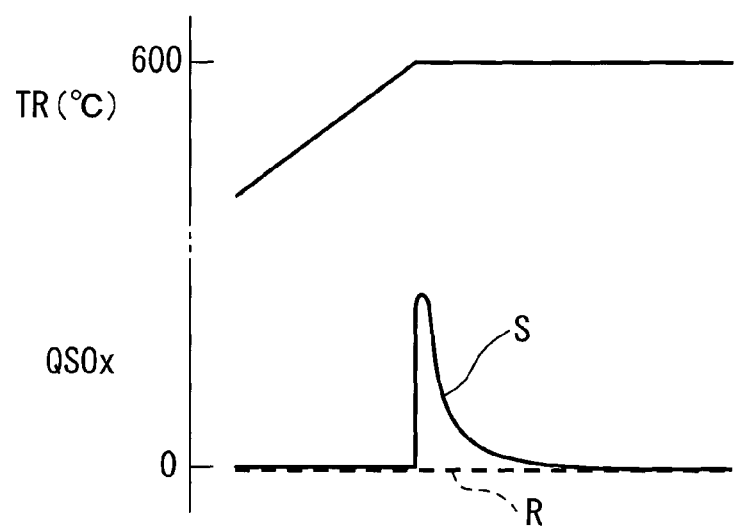
FIG. 7A is a time chart which shows test results.

The measurement results are shown in FIG. 7A. In FIG. 7A, TR shows the reaction tube temperature. As will be understood from FIG. 7A, if heated under an oxygen-free atmosphere until about 600° C., SOx is released from the first sample as shown by the solid line S. From this, it is learned that calcium sulfate $CaSO_4$ is broken down into calcium and SOx. As opposed to this, as shown by the broken line R, SOx was not released from the comparative sample.

Further, the quantities of acid QACD, that is, the numbers of acid points not holding calcium, i.e., the active acid points, of the first sample before and after the above treatment were measured.

Figure 7B:
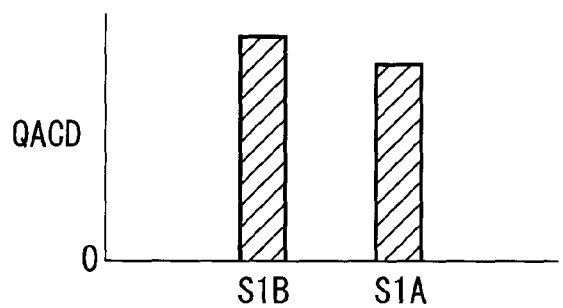
FIG. 7B is a graph which shows test results.

The measurement results are shown in FIG. 7B. As will be understood from FIG. 7B, compared with the quantity of acid QACD before treatment which is shown by S1B, the quantity of acid QACD after treatment which is shown by S1A decreased. From this, it is learned that calcium is held at the acid points of the solid acid.

Furthermore, a second sample which is formed from a solid acid which carries calcium was prepared. The solid acid particles were similar to the first sample. The second sample was arranged inside a reaction tube. Gas which includes an oxygen excess and contains SOx was supplied to the reaction tube while heating the temperature of the reaction tube to about 350° C. and holding it for a certain time. The quantities of acid of the second sample before and after treatment were measured.

Figure 7C:
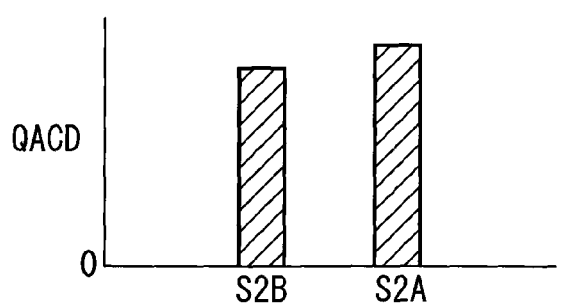
FIG. 7C is a graph which shows test results.

The measurement results are shown in FIG. 7C. As will be understood from FIG. 7C, compared with the quantity of acid QACD before the treatment which is shown in S2A, the quantity of acid QACD after treatment which is shown in S2B increased. From this, it is learned that calcium was released from the acid points of the solid acid.

In this way, if the particulate filter 24 carries an ash atomization agent 78 and temporarily performs ash atomization processing, ash can be removed from the particulate filter 24. For this reason, the increase of the pressure loss of the particulate filter 24 is suppressed and a drop in the engine output is suppressed. Further, a drop in the fuel consumption rate is suppressed.

Next, an ash atomization agent 78 will be further explained. As explained above, the ash atomization agent 78 is formed from a solid acid which has an acid strength which is higher than the acid strength of sulfurous acid $H_2SO_3$ and which is lower than the acid strength of sulfuric acid $H_2SO_4$.

The acid strength is, for example, expressed by one or more of the Hammett acidity function, hydrogen ion exponent, acid dissociation constant, and measurement value obtained by the temperature programmed desorption method using ammonia ($NH_3$-TPD).

When the acid strength is expressed by the Hammett acidity function $H_0$, the smaller the Hammett acidity function $H_0$, the higher the acid strength. At the standard state (25° C., 1 atmosphere ($10^5$ Pa)), the Hammett acidity function $H_0$ of 100% sulfurous acid $H_2SO_3$ is −0.83, while the Hammett acidity function $H_0$ of 100% sulfuric acid $H_2SO_4$ is −12.

This being so, there is also the viewpoint that the Hammett acidity function $H_0$ of the ash atomization agent 78 at the standard state is smaller than −0.83 and larger than −12.

Specifically, the ash atomization agent 78 is formed from one or more complex oxides which are selected from silica ($SiO_2$)-alumina ($Al_2O_3$)($H_0$=−8.2), silica ($SiO_2$)-titania ($TiO_2$)($H_0$=−8.2), titania ($TiO_2$)-zirconia ($ZrO_2$)($H_0$=−8.2), silica ($SiO_2$)-zirconia ($ZrO_2$)($H_0$=−8.2), silica ($SiO_2$)-gallium oxide ($Ga_2O_3$)($H_0$=−7.9), titania ($TiO_2$)-alumina ($Al_2O_3$)($H_0$=−5.8), silica ($SiO_2$)-yttrium oxide ($Y_2O_3$)($H_0$=−5.8), alumina ($Al_2O_3$)-zirconia ($ZrO_2$)($H_0$=−5.8), silica ($SiO_2$)-lanthanum oxide ($La_2O_3$)($H_0$=−4.6), titania ($TiO_2$)-cadmium oxide (CdO)($H_0$=−3.0), titania ($TiO_2$)-tin oxide ($SnO_2$)($H_0$=−3.0), titania ($TiO_2$)-zinc oxide (ZnO) ($H_0$=−3.0), zinc oxide (ZnO)-silica ($SiO_2$)($H_0$=−3.0), and zinc oxide (ZnO)-cadmium oxide (CdO) ($H_0$=−3.0). Note that, the Hammett acidity function ($H_0$) after the name of the complex material shows the Hammett acidity function ($H_0$) in the case of a molar ratio of metal of 1:1.

Figure 8:
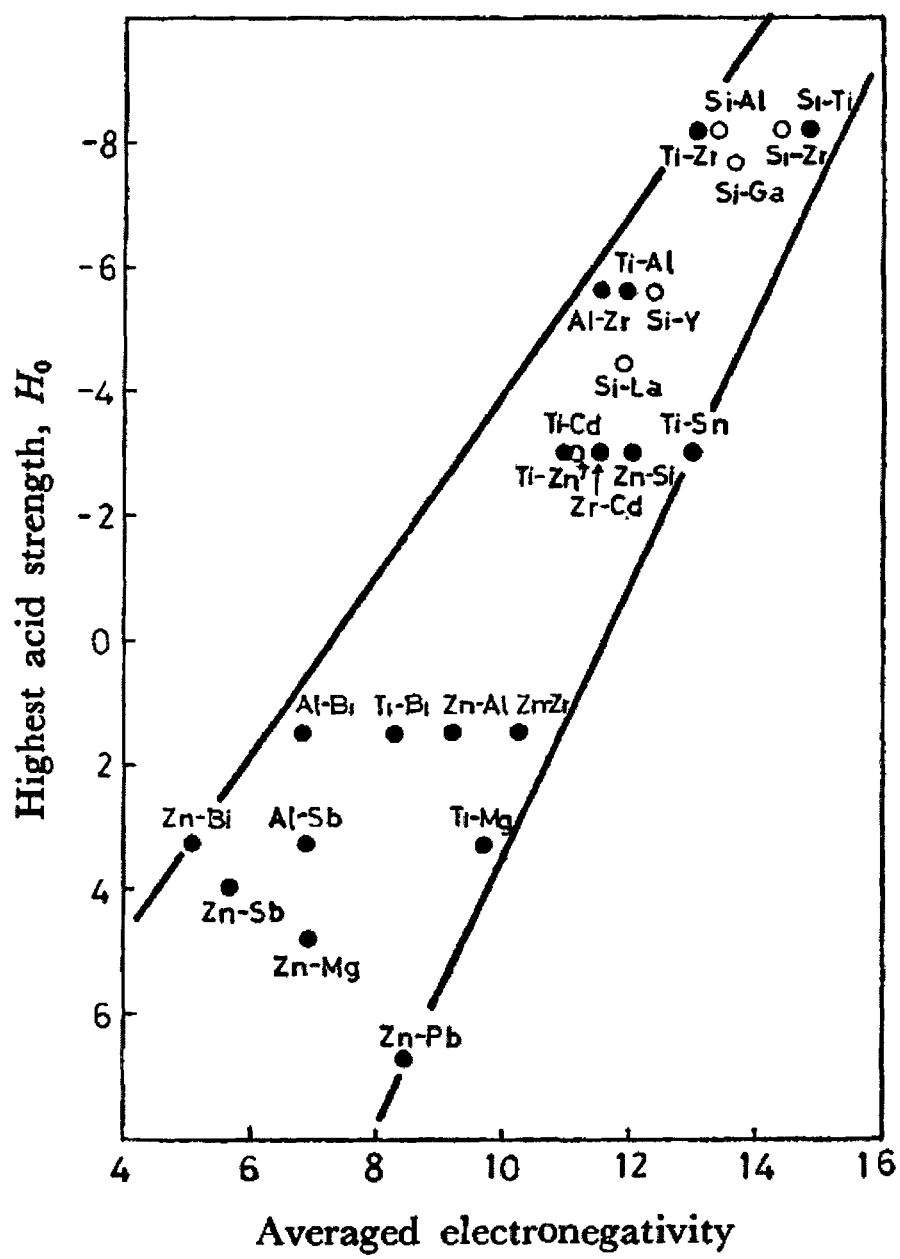
FIG. 8 is a graph which shows an acid strength.

Such an ash atomization agent, for example, as described in the following reference literature 1, can be selected with reference to the generally known electronegativity. FIG. 4 of reference literature 1 is attached to the Present Description as FIG. 8: Katsue Shibata, Tadamitsu Kiyoura, Jun Kitagawa, Takashi Sumiyoshi, Kozo Tanabe, "Acidic Properties of Binary Metal Oxides", Bulletin of the Chemical Society of Japan, Vol. 46 (1973) No. 10 P 2985-2988.

According to another aspect, a solid acid which has an acid strength higher than the acid strength of sulfurous acid $H_2SO_3$ and lower than the acid strength of sulfuric acid $H_2SO_4$ is carried on the particulate filter 24.

Furthermore, according to another aspect, a solid acid which has a Hammett acidity function $H_0$ in the standard state smaller than −0.83 and larger than −12 is carried on the particulate filter 24. The upper limit of this acidity function $H_0$ is, for example, −1, −2, −3, −4, −6, or −7. Further, the lower limit of this acidity function $H_0$ is, for example, −12, −11, −10, or −9. In another embodiment, a solid acid which has a Hammett acidity function $H_0$ in the standard state which satisfies the condition of for example $-2 < H_0 < -11$ or $-4 < H_0 < -10$ or $-6 H_0 < -9$ is carried on the particulate filter 24.

Note that, the Hammett acidity function $H_0$ of the 100% sulfurous acid $H_2SO_3$ is defined as follows. That is, assume that the degree of ionization of 100% sulfurous acid $H_2SO_3$ is equal to the degree of ionization of sulfurous acid $H_2SO_3$ at 0.1 mol/liter while the density of the 100% sulfurous acid $H_2SO_3$ is equal to 100% sulfuric acid $H_2SO_4$. The concentration of hydrogen ions in a 0.1 mol/liter sulfurous acid $H_2SO_3$ aqueous solution in the standard state is $3.1 \times 10^{-2}$ mol/liter, while the density of 100% sulfuric acid $H_2SO_4$ at the standard state is 1840 (g/liter). This being so, the molecular weight of sulfurous acid $H_2SO_3$ is 82, so the concentration of 100% sulfurous acid $H_2SO_3$ can be considered to be 22 mol/liters (=1840/82). Therefore, the Hammett acidity function $H_0$ of 100% sulfurous acid $H_2SO_3$ at the standard state is expressed by the following formula.

$$H_0 = -\log(0.031/0.1 \cdot 22) = -0.83$$

Figure 9:
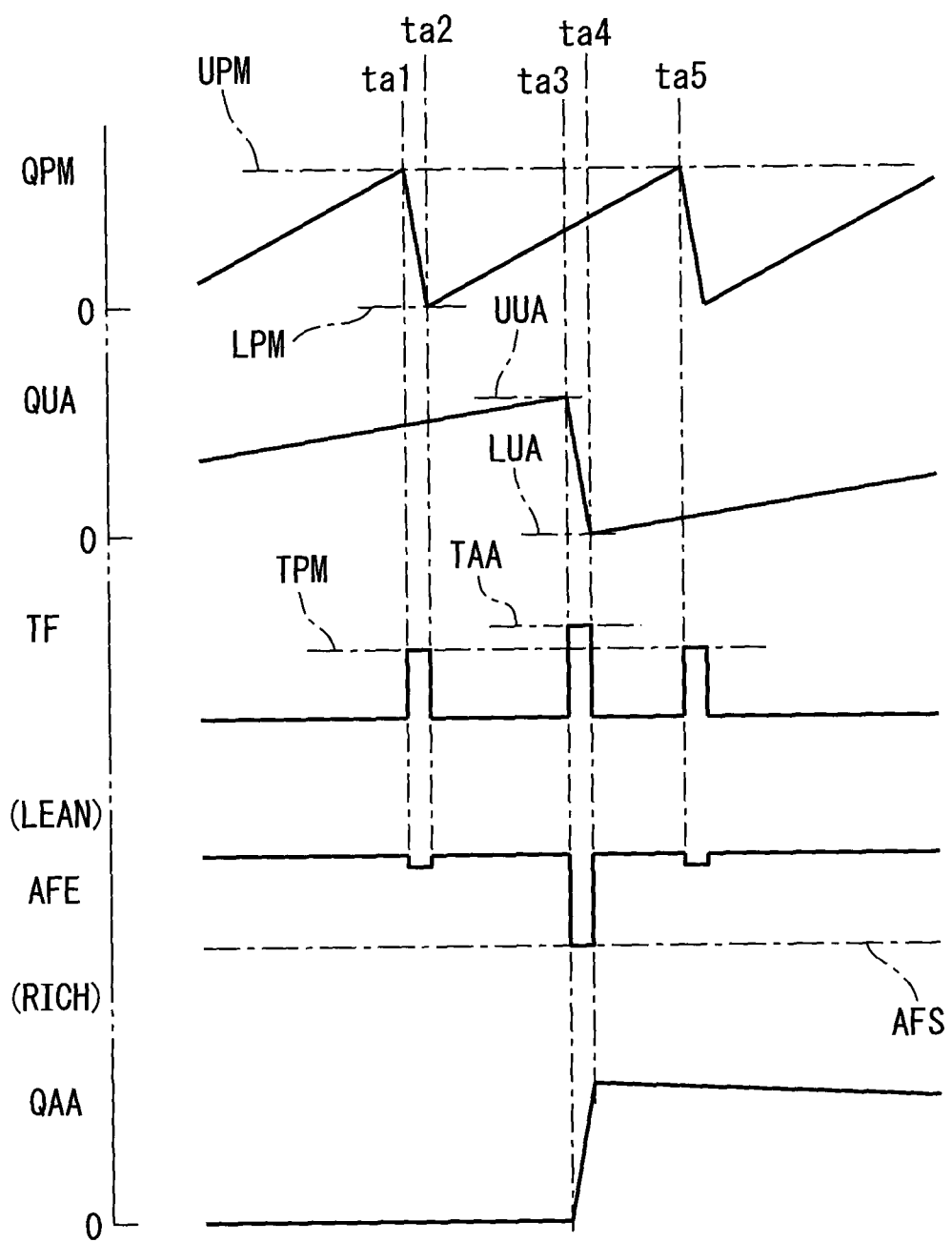
FIG. 9 is a time chart which explains exhaust purification control of a first embodiment according to the present invention.

FIG. 9 shows exhaust purification control of the first embodiment according to the present invention. If referring to FIG. 9, at the time ta1, if the amount of particulate matter QPM which is trapped at the particulate filter 24 exceeds the allowable upper limit amount UPM, the PM removal processing is started. That is, the air-fuel ratio AFE of the exhaust gas which flows into the particulate filter 24 is maintained lean while the temperature TF of the particulate filter 24 is raised to the PM removal temperature TPM. As a result, the quantity of particulate matter QPM is gradually decreased. Next, at the time ta2, if the quantity of particulate matter QPM is decreased to the allowable lower limit amount, the PM removal processing is ended. In the example which is shown in FIG. 9, the allowable lower limit amount LPM is set to substantially zero.

Next, at the time ta3, if the quantity of ash which is trapped on the particulate filter 24 and not atomized, that is, the quantity of untreated ash QUA, exceeds the allowable upper limit amount UUA, ash atomization processing is started. That is, the air-fuel ratio of the exhaust gas which flows into the particulate filter 24 is, for example, lowered to the stoichiometric air-fuel ratio AFS and the temperature TF of the particulate filter 24 is raised to the ash atomization temperature TAA. As a result, the ash on the particulate filter 24 is atomized and the quantity of untreated ash QUA is gradually decreased. Further, the quantity QAA of ash which is atomized and which is held on the particulate filter 24 gradually increases. Next, at the time ta4, if the ash atomization processing is performed for a set time determined in advance, the ash atomization processing is ended. In the example which is shown in FIG. 9, the set time is set so that the quantity of untreated ash QUA is reduced by the ash atomization processing to the allowable lower limit amount LUA., while the allowable lower limit amount LUA is set to substantially zero.

If the ash atomization processing ends, the state of the particulate filter 24 is rendered a state in which the exhaust gas which flows into the particulate filter 24 in an oxidizing atmosphere contains SOx. As a result, the atomized ash is released from the particulate filter 24, so the quantity of atomized ash QAA gradually decreases.

Next, if the quantity of particulate matter QPM exceeds the allowable upper limit value UPM at the time ta5, PM removal processing is again performed.

Note that, at the time of normal operation where the PM removal processing and ash atomization processing are not performed, the temperature TF of the particulate filter 24 is from 150° C. to 350° C. or so. The PM removal temperature and the ash atomization temperature TAA are set higher than the temperature TF of the particulate filter 24 at the time of normal operation.

To make the concentration of oxygen in the exhaust gas which flows into the particulate filter 24 drop, in one embodiment, fuel is added from the fuel addition valve 27 to the exhaust manifold 5. In another embodiment, the air-fuel ratio of the air-fuel mixture which is burned in the combustion chambers 2 is lowered. Furthermore, in another embodiment, fuel is secondarily injected from the fuel injector 3 in the expansion stroke or exhaust stroke.

On the other hand, to make the temperature of the particulate filter 24 rise, in one embodiment, the fuel which is added from the fuel addition valve 27 is burned in the exhaust passage or at the particulate filter 24. In another embodiment, the fuel which is injected secondarily from the fuel injector 3 is burned in the combustion chambers 2, the exhaust passage, or the particulate filter 24.

In the first embodiment according to the present invention, it is judged if PM removal processing should be performed, on the basis of the quantity of particulate matter QPM. The quantity of particulate matter QPM, in one embodiment, is expressed by the count value obtained by finding the quantity of particulate matter dQPMi which increases per unit time and the quantity of particulate matter dQPMd which decreases per unit time based on the engine operating state and cumulatively adding the totals of the increment dQPMi and the decrement dQPMd. In another embodiment, the pressure loss of the particulate filter 24 which is detected by the pressure loss sensor 26 (FIG. 1) is used to express the quantity of particulate matter QPM. Furthermore, in another embodiment, the quantity QPM of particulate matter is reset to zero when the PM removal processing is performed.

Further, in the first embodiment according to the present invention, it is judged if ash atomization processing should be performed, on the basis of the quantity of untreated ash QUA. The quantity of untreated ash QUA, in one embodiment, is expressed by the count value obtained by finding the quantity of untreated ash dQUAi which increases per unit time and the quantity of untreated ash dQUAd which decreases per unit time, based on the engine operating state, and cumulatively adding the total of the increment dQUAi and the decrement dQUAd. In another embodiment, the pressure loss of the particulate filter 24 at the time when the PM removal processing is completed is used to express the quantity of untreated ash QUA. If doing this, there is no effect due to the particulate matter. Furthermore, in another embodiment, the vehicle driving distance is used to express the quantity of untreated ash QUA. Furthermore, in another embodiment, the quantity QUA of untreated ash is reset to zero when the ash atomization processing is performed.

The ash atomization temperature TAA is determined in accordance with the type of the ash atomization agent 78. When the ash atomization agent 78 is formed from silica-alumina, the ash atomization temperature TAA is about 600° C.

The PM removal temperature TPM is determined in accordance with the type of the catalyst 77 which has the oxidation function. When the catalyst 77 is formed from ceria $CeO_2$ and silver Ag, the PM removal temperature is 300 to 500° C. or so. When the catalyst 77 is formed from alumina $Al_2O_3$ and platinum Pt, the PM removal temperature is 600° C. or so.

Figure 10:
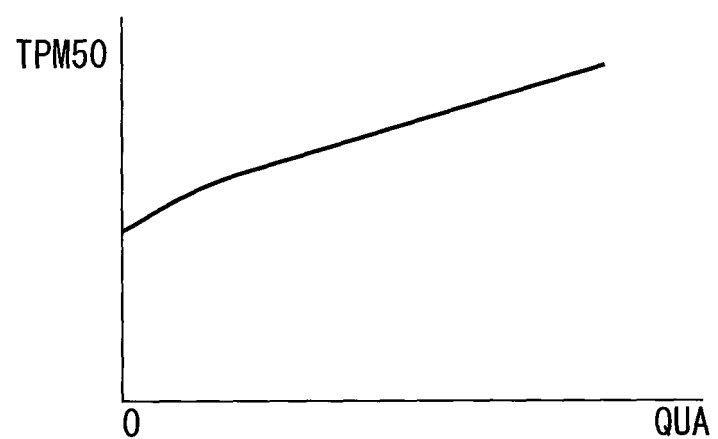
FIG. 10 is a graph which shows a 50% removal temperature TPM50.

In this connection, if calling the temperature of the particulate filter 24 which is required for removing 50% of the particulate matter which is trapped on the particulate filter 24 the "50% removal temperature TPM50", FIG. 10 shows the test results of the relationship between the quantity of untreated ash QUA and the 50% removal temperature TPM50 when PM removal processing is performed. As will be understood from FIG. 10, the 50% removal temperature TPM50 becomes lower as the quantity of untreated ash QUA becomes smaller.

As will be understood from the explanation up to here, if making the particulate filter carry an ash atomization agent and performing the ash atomization processing repeatedly, it is possible to maintain the amount of untreated ash on the particulate filter low. Therefore, in the first embodiment according to the present invention, it is possible to set the PM removal temperature TPM at a low temperature. In other words, it is possible to use a low PM removal temperature to perform PM removal processing. As a result, the energy which is required for PM removal processing can be reduced. In particular, when the catalyst 77 is formed from ceria $CeO_2$ and silver Ag, it is confirmed that the PM removal temperature TPM can be set to 300° C. to 500° C. or so. The PM removal temperature TPM in this case is lower than the ash atomization temperature TAA.

Figure 11:
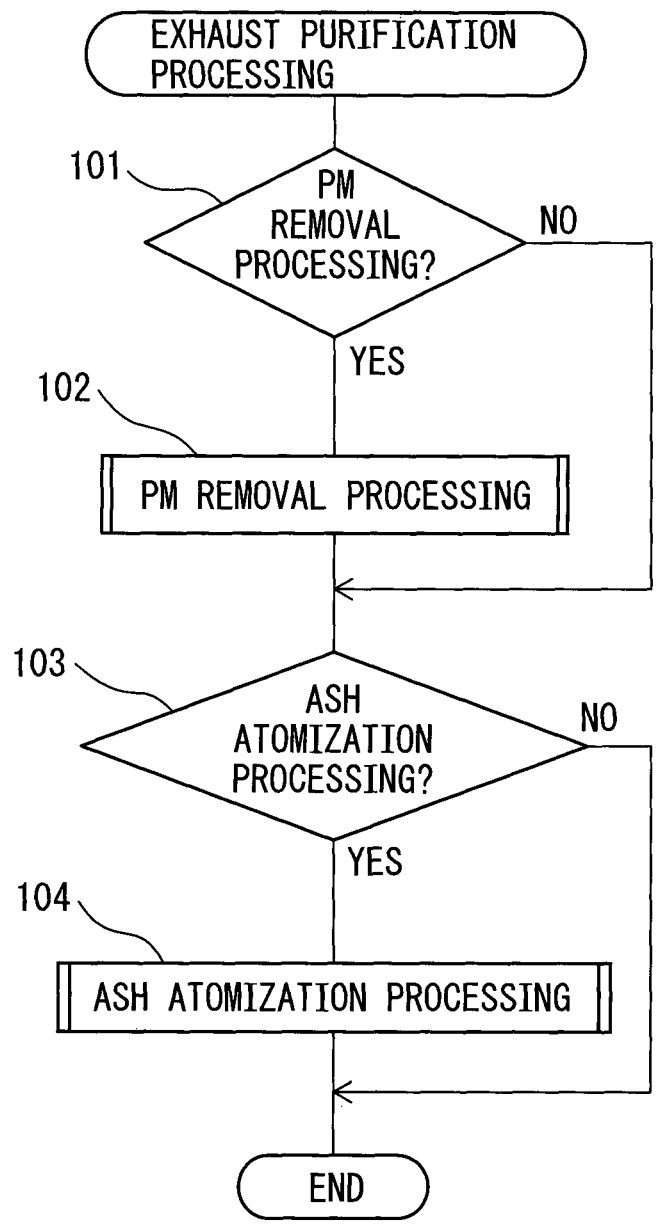
FIG. 11 is a flow chart which shows a routine for performing exhaust purification control of the first embodiment according to the present invention.

FIG. 11 shows the routine for executing the exhaust purification control of the first embodiment according to the present invention. Referring to FIG. 11, at step 101, it is judged if PM removal processing should be performed. In the first embodiment according to the present invention, when the quantity of particulate matter QPM exceeds an allowable upper limit amount UPM, it is judged that PM removal processing should be performed, while otherwise, it is not judged that PM removal processing should be performed. When it is judged that PM removal processing should be performed, the routine next proceeds to step 102 where PM removal processing is temporarily performed. Next, the routine proceeds to step 103. When it is not judged at step 101 that PM removal processing should be performed, the routine jumps to step 103. At step 103, it is judged if ash atomization processing should be performed. In the first embodiment according to the present invention, it is judged that ash atomization processing should be performed when the quantity of untreated ash exceeds an allowable upper limit amount UUA, while otherwise it is not judged that ash atomization processing should be performed. When it is judged that ash atomization processing should be performed, the routine next proceeds to step 104 where ash atomization processing is temporarily performed. Next, the processing cycle is ended. When it is not judged at step 103 that ash atomization processing should be performed, the processing cycle is ended. Note that the electronic control unit 30 (FIG. 1) is programmed to perform the PM removal processing. Further, the electronic control unit 30 is programmed to perform the ash removal processing.

According to another aspect, there is provided an exhaust purification system for an internal combustion engine which arranges a particulate filter in the exhaust system for the internal combustion engine, in which exhaust purification system for an internal combustion engine, the particulate filter is a particulate filter which is coated with a solid acid on its surface, and an acid strength of the solid acid is larger than the acid strength of sulfurous acid $H_2SO_3$ and smaller than the acid strength of sulfuric acid $H_2SO_4$. Further, this exhaust purification system is provided with a control for an ash removal operation for removing the ash deposited in the particulate filter, the control for the ash removal operation is provided with a control for raising the temperature of the particulate filter and a control of the air-fuel ratio of the atmosphere inside the particulate filter, and the control of the air-fuel ratio of the atmosphere, inside the particulate filter is a control which first makes the atmosphere the stoichiometric air-fuel ratio or the air-fuel ratio rich atmosphere, then changes it to an air-fuel ratio lean atmosphere during the control for raising the temperature of the particulate filter.

According to still another aspect, there is provided a wall flow type particulate filter adapted to be arranged in an exhaust passage of an internal combustion engine in which combustion is performed in an excess of oxygen, for trapping particulate matter in exhaust gas, the particulate filter trapping ash together with the particulate matter, the particulate filter characterized in that the particulate filter carries a solid acid and the solid acid has an acid strength which is higher than the acid strength of sulfurous acid and lower than the acid strength of sulfuric acid.

According to still another aspect, there is provided a method of removing ash from a wall flow type particulate filter which is arranged in an exhaust passage of an internal combustion engine in which combustion is performed in an excess of oxygen for trapping particulate matter in exhaust gas, using a solid acid which is carried on the particulate filter, the method characterized in that the method renders the state of the particulate filter a state where the exhaust gas which flows into the particulate filter is lowered in concentration of oxygen and the particulate filter is raised in temperature to thereby atomize the ash and hold the atomized ash in the solid acid in a dispersed state, then renders the state of the particulate filter a state where the exhaust gas which flows into the particulate filter in an oxidizing atmosphere contains SOx to thereby release the atomized ash which is held at the solid acid from the solid acid and make it be released from the particulate filter.

In this regard, in the past, even if ash builds up on the particulate filter, the capacity of the particulate filter was set large so that the pressure loss of the particulate filter did not greatly increase. However, in the first embodiment according to the present invention, the ash is removed from the particulate filter, so the volume of the particulate filter can be set small. As a result, the manufacturing cost of the particulate filter can be reduced and the energy which is required for PM removal processing can be reduced. Further, the space which is required for mounting the particulate filter can be reduced and the vehicle weight can be reduced.

Next, a second embodiment according to the present invention will be explained. Below, mainly the points of difference between the second embodiment and the first embodiment will be explained.

Figure 12A:
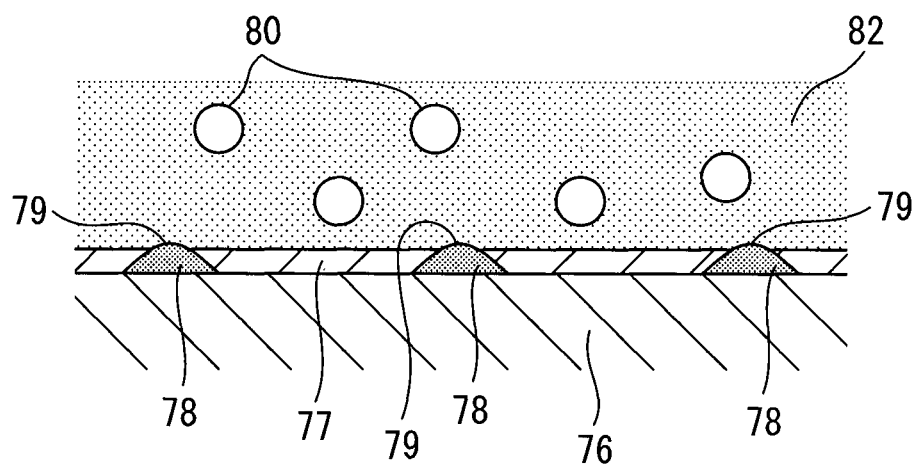
FIG. 12A is a partial enlarged view of a particulate filter.

In the first embodiment according to the present invention, the ash atomization processing is performed independently from the PM removal processing or without regard to the quantity QPM of particulate matter on the particulate filter 24. For this reason, when the ash atomization processing is performed, sometimes the particulate filter 24 has particulate matter present on it. In this regard, in this case, as shown in FIG. 12A, the acid points 79 of the ash atomization agent 78 or the ash 80 are liable to be covered by the particulate matter 82. As a result, the ash 80 is liable not to reach the acid points 79 and even if the ash atomization processing is performed, the ash 80 is liable not to be atomized.

Figure 12B:
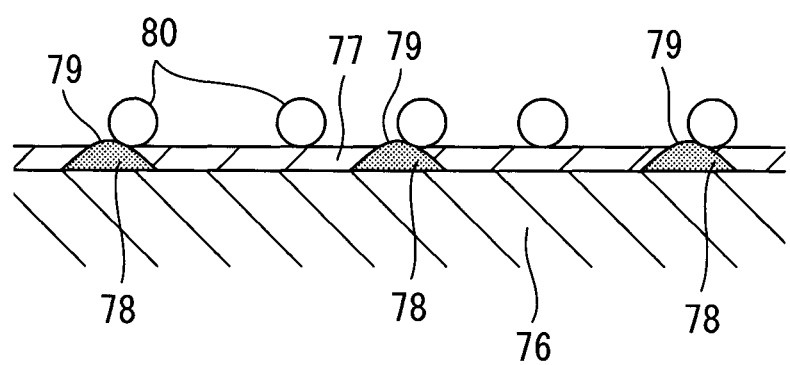
FIG. 12B is a partial enlarged view of a particulate filter.

Thus, in the second embodiment according to the present invention, the ash atomization processing is performed following the PM removal processing. As a result, as shown in FIG. 12B, when the ash atomization processing should be started, there is no longer particulate matter between the acid points 79 and the ash 80. Therefore, the ash 80 can be reliably atomized.

Further, when ash atomization processing should be started, the temperature TF of the particulate filter 24 is raised up to the PM removal temperature TPM. Therefore, the temperature TF of the particulate filter 24 need only be raised from the PM removal temperature TPM to the ash atomization temperature TAA. Alternatively, when the ash atomization temperature TAA is substantially the same as the PM removal temperature TPM, the temperature TF of the particulate filter 24 is substantially maintained. As a result, the energy which is required for performing the ash atomization processing can be decreased. In other words, the ash atomization processing can be efficiently performed.

Figure 13:
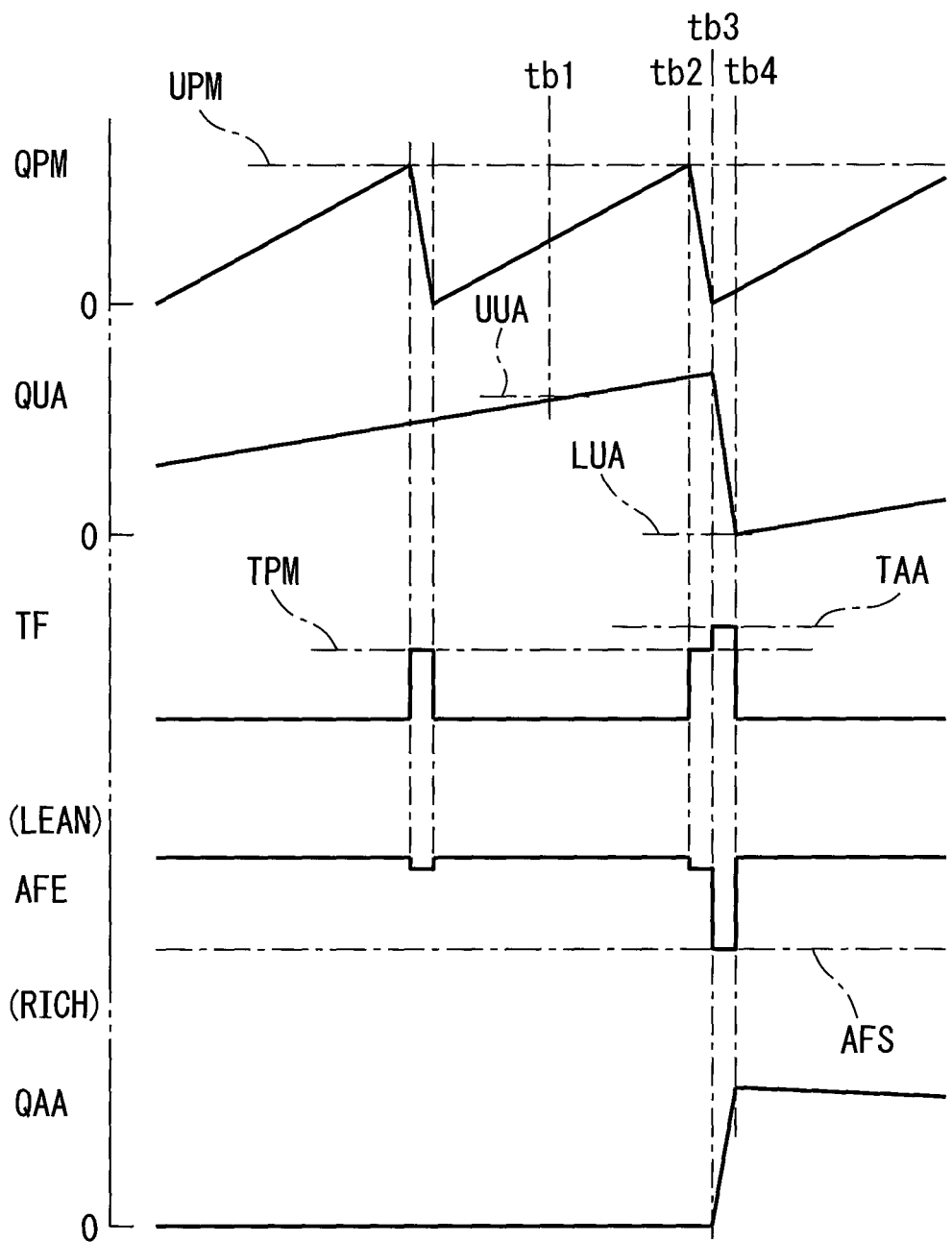
FIG. 13 is a time chart which explains exhaust purification control of a second embodiment according to the present invention.

That is, at the time tb1 of FIG. 13, even if the quantity QUA of untreated ash exceeds the allowable upper quantity UUA, the ash atomization processing is not started. Next, at the time tb2, if the quantity QPM of particulate matter exceeds the allowable upper quantity UPM, the PM removal processing is started. Next, at the time tb3, if the quantity QPM of particulate matter is decreased down to the allowable lower limit quantity, the PM removal processing is ended, and the ash atomization processing is started following the PM removal processing. That is, the ash atomization processing is performed following the PM removal processing which is firstly performed after it is judged that the ash atomization processing should be performed. Next, at the time tb4, if the ash atomization processing is performed for a predetermined set time period, the ash atomization processing is ended.

Note that the frequency by which the PM removal processing is performed is considered to be higher than the frequency by which the ash atomization processing is performed. Therefore, even if not performing the ash atomization processing immediately when it is judged that the ash atomization processing should be performed, the quantity QUA of untreated ash on the particulate filter 24 will never become excessively great.

FIG. 13 shows the case where the catalyst 77 which has the oxidation function is formed from ceria $CeO_2$ and silver Ag. In this case, as explained above, the PM removal temperature TPM is 450° C. to 500° C. or so, and the ash atomization temperature TAA is 600° C. or so. When the catalyst 77 which has the oxidation function is formed from alumina $Al_2O_3$ and platinum Pt, the PM removal temperature TPM and the ash atomization temperature TAA are both 600° C. or so. Therefore, in this case, the temperature of the particulate filter 24 is maintained at 600° C. or so from when the PM removal processing is started to when the ash atomization processing is ended.

Figure 14:
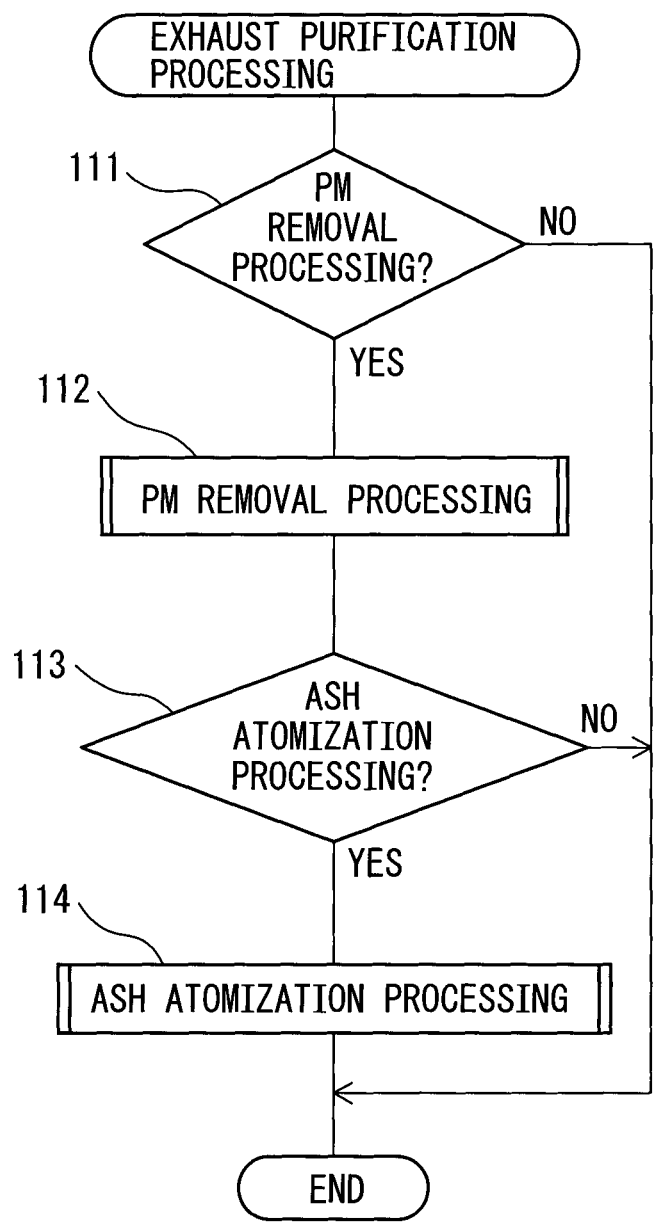
FIG. 14 is a flow chart which shows a routine for performing exhaust purification control of the second embodiment according to the present invention.

FIG. 14 shows the routine for performing the exhaust purification control of the second embodiment according to the present invention. Referring to FIG. 14, at step 111, it is judged if the PM removal processing should be performed. When it is judged that the PM removal processing should be performed, next, the routine proceeds to step 112 where the PM removal processing is performed. At the next step 113, it is judged if the ash atomization processing should be performed. When it is judged that the ash atomization processing should be performed, next, the routine proceeds to step 114 where the ash atomization processing is performed. Next, the processing cycle is ended. When it is not judged at step 111 that the PM removal processing should be performed and it is not judged at step 113 that the ash atomization processing should be performed, the processing cycle is ended.

Next, a third embodiment according to the present invention will be explained. Below, mainly the points of difference between the third embodiment and the second embodiment will be explained.

Figure 15:
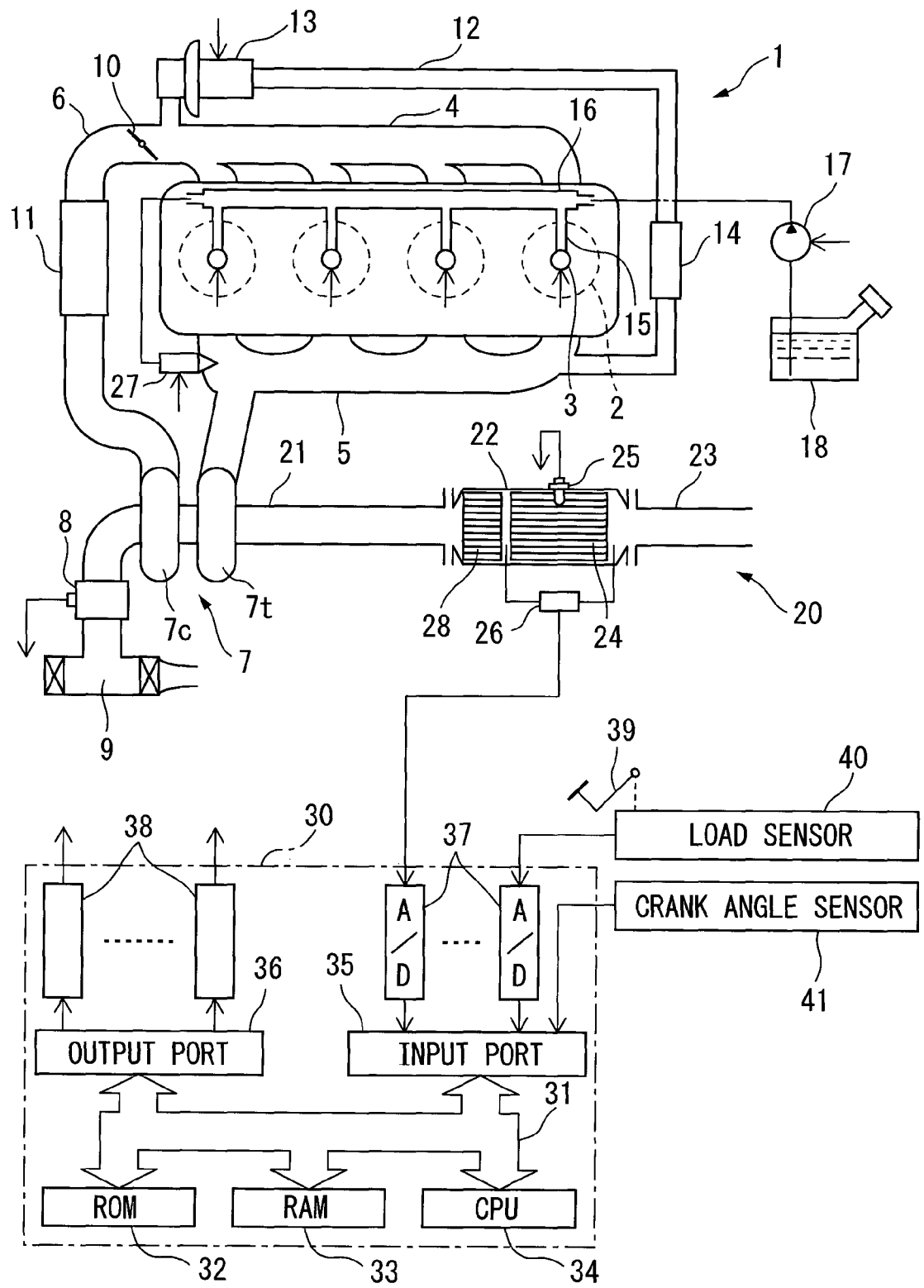
FIG. 15 is an overall view of an internal combustion engine according to a third embodiment according to the present invention.

Referring to FIG. 15, the catalytic converter 22 contains an NOx storage reduction catalyst 28 upstream of the particulate filter 24. In another embodiment, the NOx storage reduction catalyst 28 is provided downstream of the particulate filter 24.

The NOx storage reduction catalyst 28 forms a honeycomb structure provided with a plurality of exhaust flow passages which are separated from each other by thin partition walls. These exhaust flow passages are alternately opened at their upstream ends and downstream ends. On the two side surfaces of the partition wall, a catalyst carrier comprised of for example alumina $Al_2O_3$ is carried, while on the surface of the catalyst carrier, a precious metal catalyst and $NO_X$ absorbent are formed. In the third embodiment according to the present invention, as the precious metal catalyst, platinum Pt is used. As the component forming the $NO_X$ absorbent, for example, at least one element selected from potassium K, sodium Na, cesium Cs, and other such alkali metals, barium Ba, calcium Ca, and other such alkali earths, and lanthanum La, yttrium Y, and other such rare earths is used.

An NOx absorbent absorbs the NOx when the exhaust gas which flows into the NOx storage reduction catalyst 28 is lean in air-fuel ratio and releases the absorbed NOx when the concentration of oxygen in the inflowing exhaust gas falls, that is, performs an NOx absorption and release action.

That is, explaining the case of using barium Ba as the ingredient forming the NOx absorbent as an example, when the air-fuel ratio of the exhaust gas is lean, that is, when the oxygen concentration in the exhaust gas is high, the NO contained in the exhaust gas is oxidized on the platinum Pt and becomes $NO_2$, next this is absorbed in the NOx absorbent and, while bonding with the barium oxide BaO, diffuses in the form of nitric acid ions $NO_3^-$ inside the NOx absorbent. In this way, the NOx is stored in the NOx absorbent. So long as the oxygen concentration in the inflowing exhaust gas is high, $NO_2$ is produced on the surface of the platinum Pt. So long as the NOx absorption ability of the NOx absorbent is not saturated, the $NO_2$ is absorbed in the NOx absorbent and nitric acid ions $NO_3^-$ are produced.

As opposed to this, if the air-fuel ratio of the inflowing exhaust gas is made rich or the stoichiometric air-fuel ratio, the oxygen concentration in the exhaust gas falls, so the reaction proceeds in the opposite direction ($NO_3^- \rightarrow NO_2$) and therefore the nitric acid ions $NO_3^-$ in the NOx absorbent are released in the form of $NO_2$ from the NOx absorbent. Next, the released NOx is reduced by the unburned HC and CO contained in the exhaust gas.

In the third embodiment according to the present invention as well, in the same way as the first embodiment and second embodiment according to the present invention, combustion is performed in the internal combustion engine under an excess of oxygen. Therefore, so long as fuel is not secondarily fed from the fuel injectors 3 and fuel addition valves 27, the exhaust gas which flows into the NOx storage reduction catalyst 28 is maintained at a lean air-fuel ratio. The NOx in the exhaust gas which flows in at this time is stored in the NOx storage reduction catalyst 28. However, if the engine operating time period becomes long, the quantity of NOx which is stored in the NOx storage reduction catalyst 28 becomes greater and finally the NOx storage reduction catalyst 28 ends up becoming unable to store NOx.

Thus, in the third embodiment according to the present invention, to cause the NOx storage reduction catalyst 28 to release and reduce NOx, NOx release and reduction processing which makes the air-fuel ratio of the inflowing exhaust gas rich or the stoichiometric air-fuel ratio is made to be temporarily performed. As a result, the quantity of NOx which is stored inside the NOx storage reduction catalyst 28 is decreased.

In this regard, the exhaust gas contains a sulfur ingredient in the form of SOx. The NOx storage reduction catalyst 28 absorbs inside it not only NOx, but also SOx. The mechanism of absorption of SOx to the inside of the NOx storage reduction catalyst 28 is believed to be the same as the mechanism of absorption of NOx. That is, explaining this briefly taking as an example the case of using barium Ba as the ingredient which forms the NOx absorbent, when the inflowing exhaust gas is lean in air-fuel ratio, as explained above, oxygen $O_2$ deposits on the surface of the platinum Pt in the form of $O_2^-$ or $O_2^-$. The $SO_2$ in the exhaust gas deposits on the surface of the platinum Pt and reacts with the $O_2^-$ or $O^{2-}$ on the surface of the platinum Pt to become $SO_3$. Next, the produced $SO_3$ is further oxidized on the platinum Pt while being absorbed at the NOx storage reduction catalyst 28 and bonds with the barium oxide BaO while dispersing in the form of sulfuric acid ions $SO_4^{2-}$ inside of the NOx storage reduction catalyst 28. The sulfuric acid ions $SO_4^{2-}$ next bond with the barium ions $Ba^{2+}$ to produce the sulfate $BaSO_4$. In this regard, this sulfate $BaSO_4$ is hard to break down. Even if just making the air-fuel ratio of the exhaust gas rich, the quantity of the sulfate $BaSO_4$ inside of the NOx storage reduction catalyst 28 will not decrease. For this reason, along with the elapse of time, the quantity of the sulfate $BaSO_4$ inside of the NOx absorbent will increase and, as a result, the quantity of NOx which the NOx storage reduction catalyst 28 can absorb will decrease.

On the other hand, if maintaining the temperature of the NOx storage reduction catalyst 28 at the SOx release temperature (for example 600° C.) or more while making the average air-fuel ratio of the exhaust gas the stoichiometric air-fuel ratio or rich, the sulfate $BaSO_4$ inside of the NOx storage reduction catalyst 28 breaks down and is released in the form of $SO_3$ from the NOx storage reduction catalyst 28. This released $SO_3$ is made to react with the HC and CO in the exhaust gas to be reduced to $SO_2$. In this way, the quantity of SOx which is absorbed inside of the NOx storage reduction catalyst 28 in the form of the sulfate $BaSO_4$ decreases.

Thus, in the third embodiment according to the present invention, to cause the NOx storage reduction catalyst 28 to release the SOx, SOx release processing which renders the state of the NOx storage reduction catalyst 28 a state where the exhaust gas which flows into the NOx storage reduction catalyst 28 is rich in air-fuel ratio and the temperature of the NOx storage reduction catalyst 28 is made to rise to the SOx release temperature, is temporarily performed. As a result, the quantity of SOx which is stored inside of the NOx storage reduction catalyst 28 is decreased.

Figure 16:
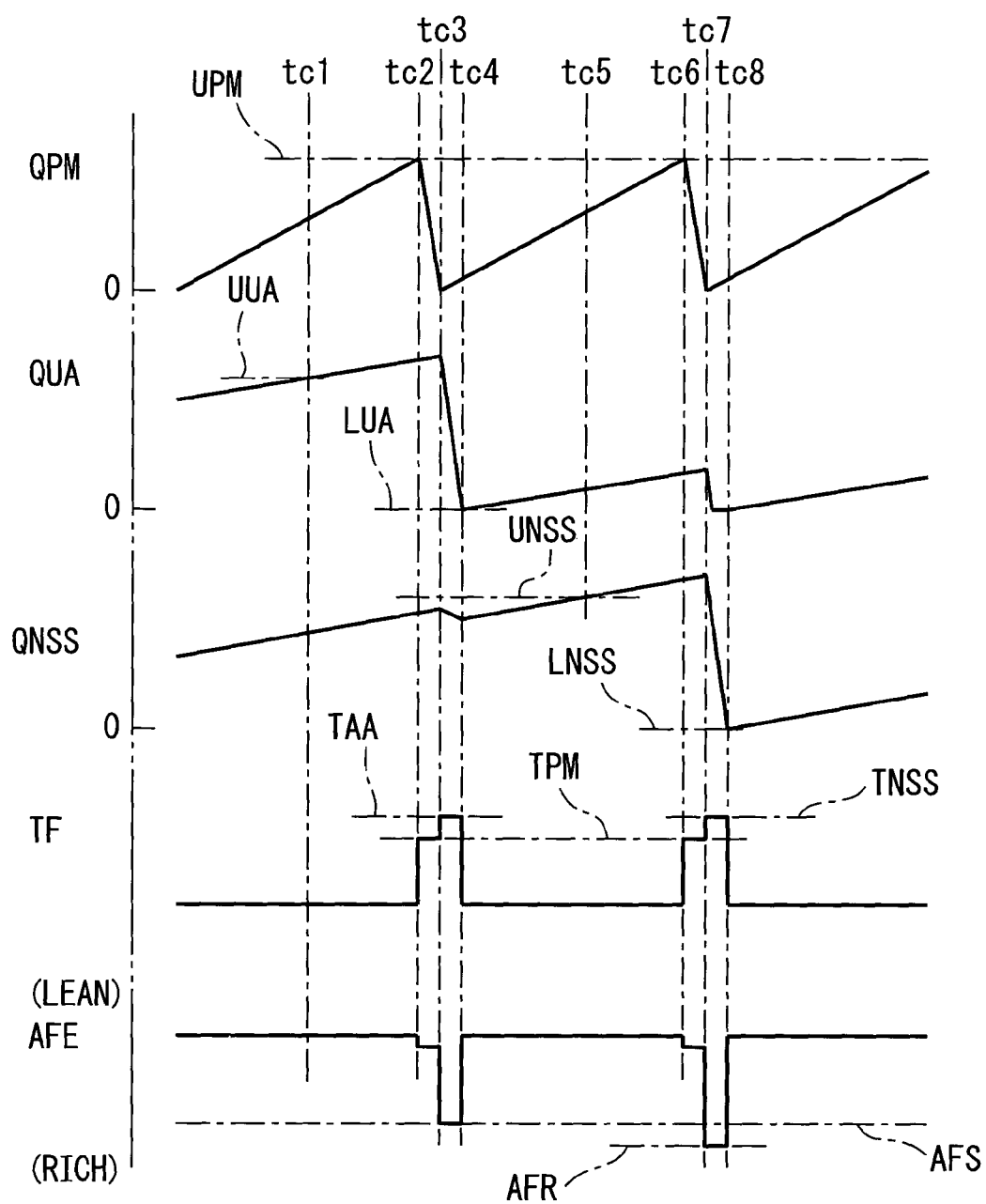
FIG. 16 is a time chart which explains exhaust purification control of the third embodiment according to the present invention.

FIG. 16 shows an example of the exhaust purification control of the third embodiment according to the present invention. Referring to FIG. 16, at the time tc1, even if the quantity QUA of untreated ash on the particulate filter 24 exceeds the allowable upper quantity UUA, ash atomization processing is not started. Next, at the time tc2, if the quantity QPM of particulate matter exceeds the allowable upper quantity UPM, PM removal processing is started. Next, at the time tc3, if the quantity QPM of particulate matter is decreased down to the allowable lower limit quantity, the PM removal processing is ended, then the ash atomization processing is started following the PM removal processing. As a result, the quantity QUA of untreated ash decreases.

The temperature of the NOx storage reduction catalyst 28 can be considered to be substantially equal to the temperature of the particulate filter 24 and the air-fuel ratio of the exhaust gas which flows into the NOx storage reduction catalyst 28 can be considered to be equal to the air-fuel ratio AFE of the exhaust gas which flows into the particulate filter 24. Therefore, if ash atomization processing is performed, the quantity QNSS of SOx which is stored in the NOx storage reduction catalyst 28 decreases. Next, at the time tc4, if the ash atomization processing is performed for a predetermined set time period, the ash atomization processing is ended.

Next, at the time tc5, even if the quantity QNSS of SOx storage of the NOx storage reduction catalyst 28 exceeds the allowable upper quantity UNSS, the SOx release processing is not started. Next, at the time tc6, if the quantity QPM of particulate matter exceeds the allowable upper quantity UPM, the PM removal processing is started. Next, at the time tc7, the PM removal processing is ended, then the SOx release processing is started following the PM removal processing. That is, the exhaust gas which flows into the NOx storage reduction catalyst 28 is made the rich AFR in air-fuel ratio and the temperature of the NOx storage reduction catalyst 28 is raised to the SOx release temperature TNSS. As a result, the quantity QNSS of SOx storage decreases. Further, at this time, the quantity QUA of untreated ash of the particulate filter 24 decreases. Next, at the time tc8, if the SOx release processing is performed for the predetermined set time period, the SOx release processing is ended. In the example which is shown in FIG. 16, the set time period is set so that the SOx release processing causes the quantity QNSS of SOx storage to be decreased down to the allowable lower limit quantity LNSS, while the allowable lower limit quantity LNSS is set to substantially zero.

In this way, the PM removal processing is followed by the SOx release processing and ash atomization processing. As a result, the energy which is required for performing the SOx release processing and ash atomization processing can be decreased.

Figure 17:
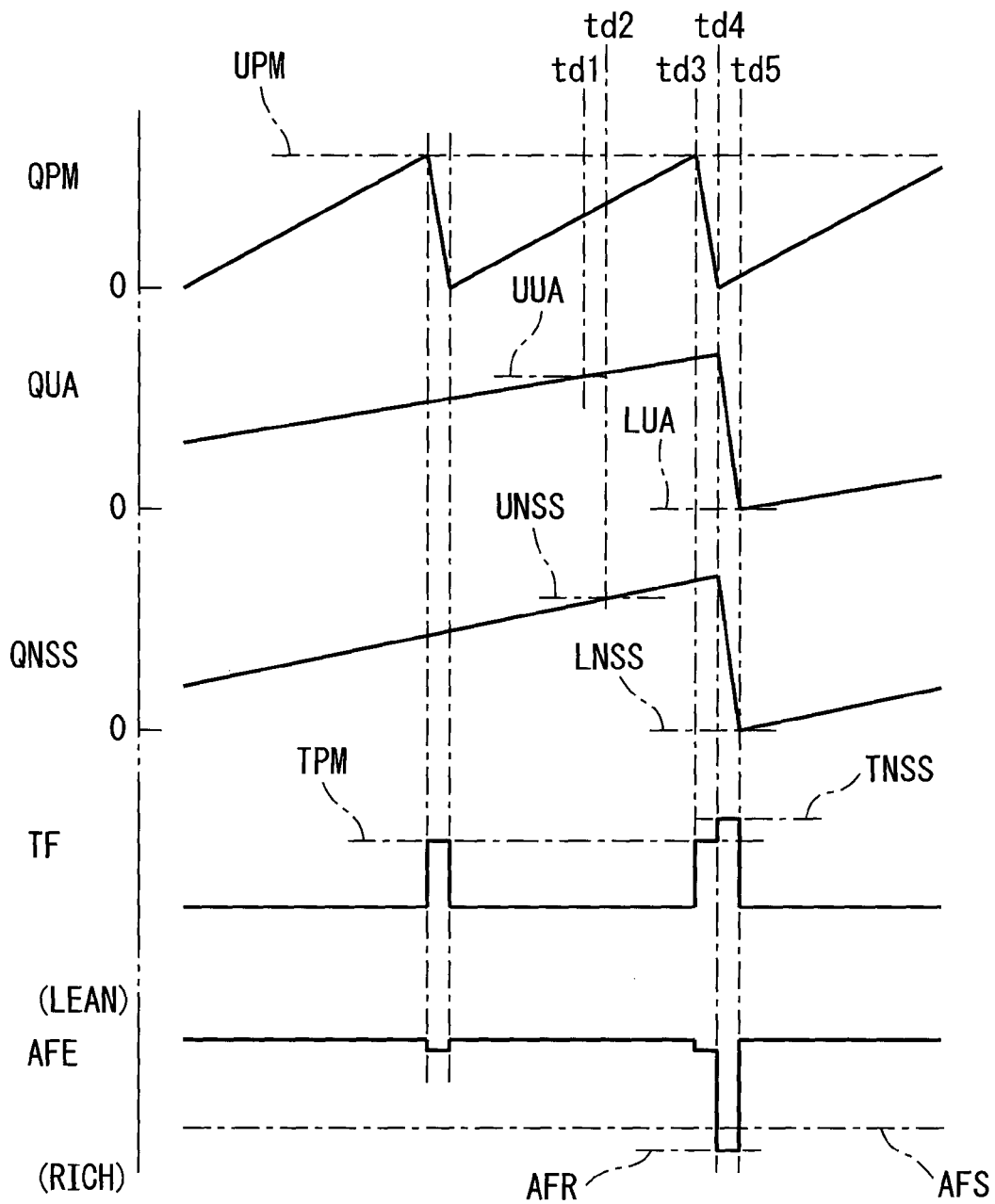
FIG. 17 is another time chart which explains exhaust purification control of the third embodiment according to the present invention.

FIG. 17 shows another example of the exhaust purification control of the third embodiment according to the present invention. Referring to FIG. 17, at the time td1, even if the quantity QUA of untreated ash exceeds the allowable upper quantity UUA, the ash atomization processing is not started. Next, at the time td2, even if the quantity QNSS of SOx storage exceeds the allowable upper quantity UNSS, the SOx release processing is not started. Next, at the time td3, if the quantity QPM of particulate matter exceeds the allowable upper quantity UPM, the PM removal processing is started. Next, at the time td4, if the quantity QPM of particulate matter is decreased down to the allowable lower limit quantity, the PM removal processing is ended, then the SOx release processing is started following the PM removal processing. That is, after it is judged that SOx release processing and ash atomization processing should be performed, when the PM removal processing is first completed, the SOx release processing is performed after this PM removal processing. The ash atomization processing is not performed. If the SOx release processing is performed, the quantity QNSS of SOx storage decreases.

Further, in the third embodiment according to the present invention, the SOx release temperature TNSS is substantially the same as the ash atomization temperature TAA. Therefore, if the SOx release processing is performed, the state of the particulate filter 24 is rendered a state where the exhaust gas which flows into the particulate filter 24 is the stoichiometric air-fuel ratio or rich in the air-fuel ratio and the temperature of the particulate filter 24 is the ash atomization temperature TAA. As a result, the quantity QUA of untreated ash also decreases. Next, at the time td5, if the ash atomization processing is performed for a predetermined set time period, the SOx release processing is ended. In the example which is shown in FIG. 17, the quantity QNSS of SOx storage is decreased down to the allowable lower limit quantity LNSS and the quantity QUA of untreated ash is decreased down to the allowable lower limit quantity LUA.

In this way, when the SOx release processing and ash atomization processing should be simultaneously performed, SOx release processing is performed and the ash atomization processing is omitted. As a result, the energy which is required for performing the ash removal action can be decreased.

In the third embodiment according to the present invention, it is judged if the SOx release processing should be performed on the basis of the quantity QNSS of SOx storage. The quantity QNSS of SOx storage, in one embodiment, is expressed by a counter value which is obtained by finding the quantity dQNSSi of SOx storage which increases per unit time and the quantity dQNSSd of SOx storage which decreases per unit time based on the engine operating state and cumulatively adding the totals of the increment dQNSSi and the decrement dQNSSd. In another embodiment, the vehicle driving distance is used to express the quantity QNSS of SOx storage. In still another embodiment, the quantity QNSS of SOx storage and the quantity QUA of untreated ash are respectively reset to zero when the SOx release processing is performed.

Note that, when the NOx release and reduction processing is performed, the exhaust gas is temporarily made rich in the air-fuel ratio AFE. In FIG. 16 and FIG. 17, illustration of the changes in the air-fuel ratio AFE of the exhaust gas due to such NOx release and reduction processing is omitted.

Figure 18:
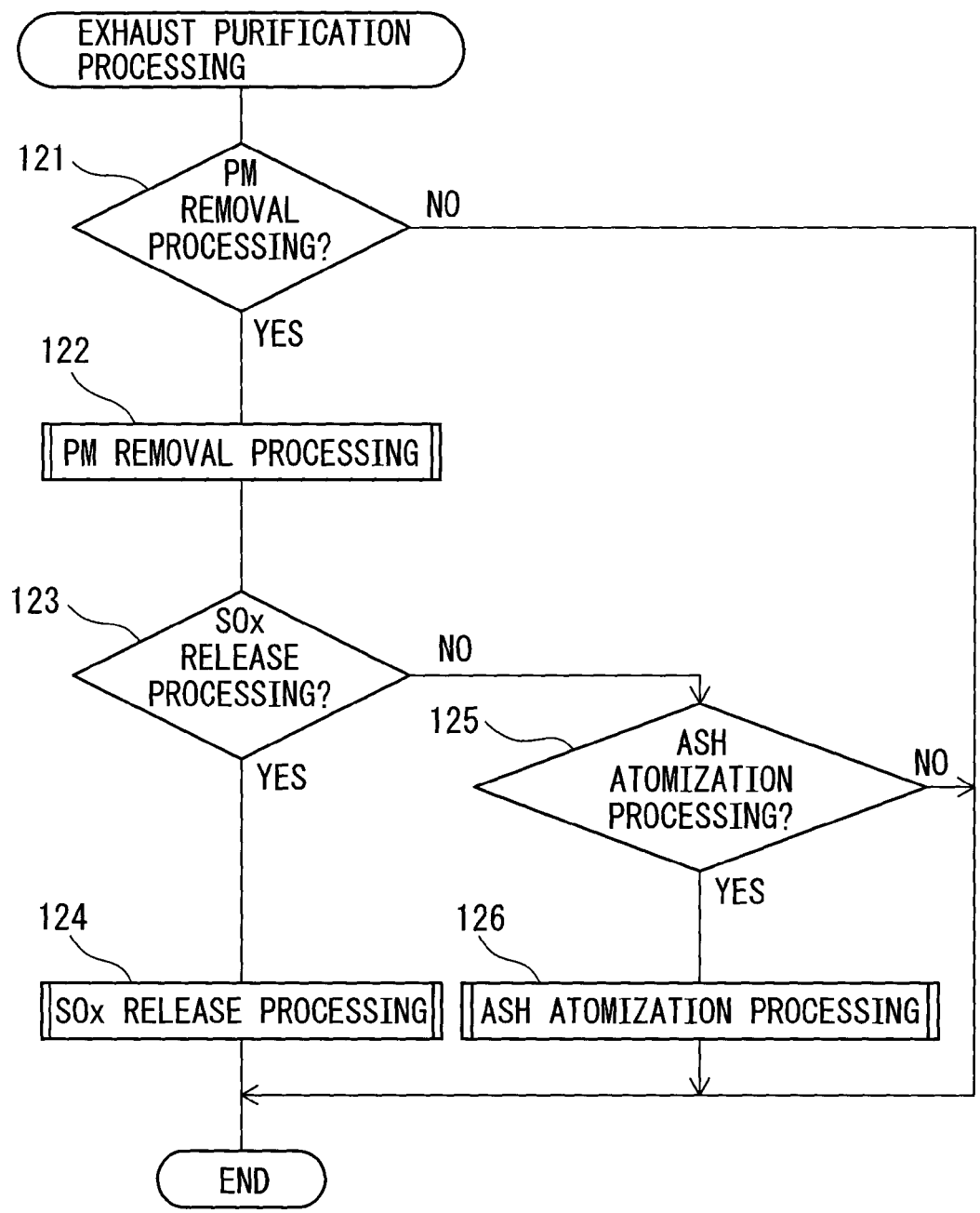
FIG. 18 is a flow chart which shows a routine for performing exhaust purification control of the third embodiment according to the present invention.

FIG. 18 shows the routine which performs the exhaust purification control of the third embodiment according to the present invention. Referring to FIG. 18, at step 121, it is judged if the PM removal processing should be performed. When it is judged that PM removal processing should be performed, next, the routine proceeds to step 122 where the PM removal processing is performed. Next, the routine proceeds to step 123. When it is not judged at step 121 that PM removal processing should be performed, the processing cycle is ended. At step 123, it is judged if the SOx release processing should be performed. In the third embodiment according to the present invention, when the quantity QNSS of SOx storage exceeds the allowable upper quantity UNSS, it is judged that the SOx release processing should be performed, while otherwise, it is not judged that SOx release processing should be performed. When it is judged that SOx release processing should be performed, next, the routine proceeds to step 124 where the SOx release processing is performed. When it is not judged at step 123 that SOx release processing should be performed, the routine proceeds to step 125 where it is judged if the ash atomization processing should be performed. In the third embodiment according to the present invention, when the quantity QUA of untreated ash exceeds the allowable upper quantity UUA, it is judged that the ash atomization processing should be performed, while otherwise, it is not judged that the ash atomization processing should be performed. When it is judged that the ash atomization processing should be performed, next, the routine proceeds to step 126 where the ash atomization processing is performed. Next, the processing cycle is ended. Even when it is not judged at step 125 that the ash atomization processing should be performed, the processing cycle is ended. Note that the electronic control unit 30 is programmed to perform the NOx release and reduction processing. Further, the electronic control unit 30 is programmed to perform the SOx release processing.

Next, a fourth embodiment according to the present invention will be explained. Below, mainly the points of difference between the fourth embodiment and the second embodiment will be explained.

In the fourth embodiment according to the present invention, the catalyst 77 which has the oxidation function is comprised of ceria $CeO_2$ and silver Ag. Ceria $CeO_2$ stores oxygen $O_2$ in an oxidizing atmosphere and releases the stored oxygen $O_2$ if the concentration of oxygen in the inflowing exhaust gas falls, that is, has an oxygen storage ability. Therefore, in the fourth embodiment according to the present invention, the particulate filter 24 carries a catalyst which has an oxygen storage ability or the catalyst 77 which has an oxidation function and oxygen storage ability.

In this case, if the ash atomization processing is started and the concentration of oxygen in the exhaust gas which flows into the particulate filter 24 falls, the catalyst 77 which has the oxygen storage ability releases oxygen $O_2$. As a result, at the surface of the particulate filter 24, the oxygen concentration is maintained locally high. For this reason, even if the ash atomization processing is started, the atomization action of the untreated ash is liable to not be started. Therefore, if the ash atomization processing is performed for a certain time period, a sufficient quantity of ash is liable not to be atomized and a sufficient quantity of ash is liable not to be removed from the particulate filter 24. For this reason, the pressure loss of the particulate filter 24 is liable not to be sufficiently decreased.

On the other hand, if, at the time of start of the ash atomization processing, the particulate filter 24 has particulate matter present on it, the oxygen $O_2$ which the catalyst 77 which has the oxygen storage ability releases causes the particulate matter to be oxidized. That is, the oxygen $O_2$ which is released from the catalyst 77 is consumed by the particulate matter.

On the other hand, in the fourth embodiment according to the present invention as well, in the same way as in the second embodiment according to the present invention, if the quantity QPM of particulate matter becomes the allowable lower limit quantity LPM, the PM removal processing is ended, then the ash atomization processing is performed following the PM removal processing. The allowable lower limit quantity LPM expresses the quantity of the particulate matter which remains in the particulate filter 24 when the PM removal processing is ended.

Thus, in the fourth embodiment according to the present invention, the allowable lower limit quantity LPM is set to at least the quantity QPMOX (>0) which is required for consuming substantially all of the oxygen which is stored in the catalyst 77 at the time of start of the ash atomization processing. As a result, if the ash atomization processing is started and the catalyst 77 releases oxygen $O_2$, substantially all of this oxygen $O_2$ is consumed by the particulate matter which remains in the particulate filter 24. For this reason, the concentration of oxygen at the surface of the particulate filter 24 quickly is lowered and the ash atomization action is quickly started. Further, compared to when the allowable lower limit quantity LPM is set to substantially zero, the time period which is required for the PM removal processing becomes shorter. Therefore, the energy which is required for PM removal processing can be decreased.

Figure 19:
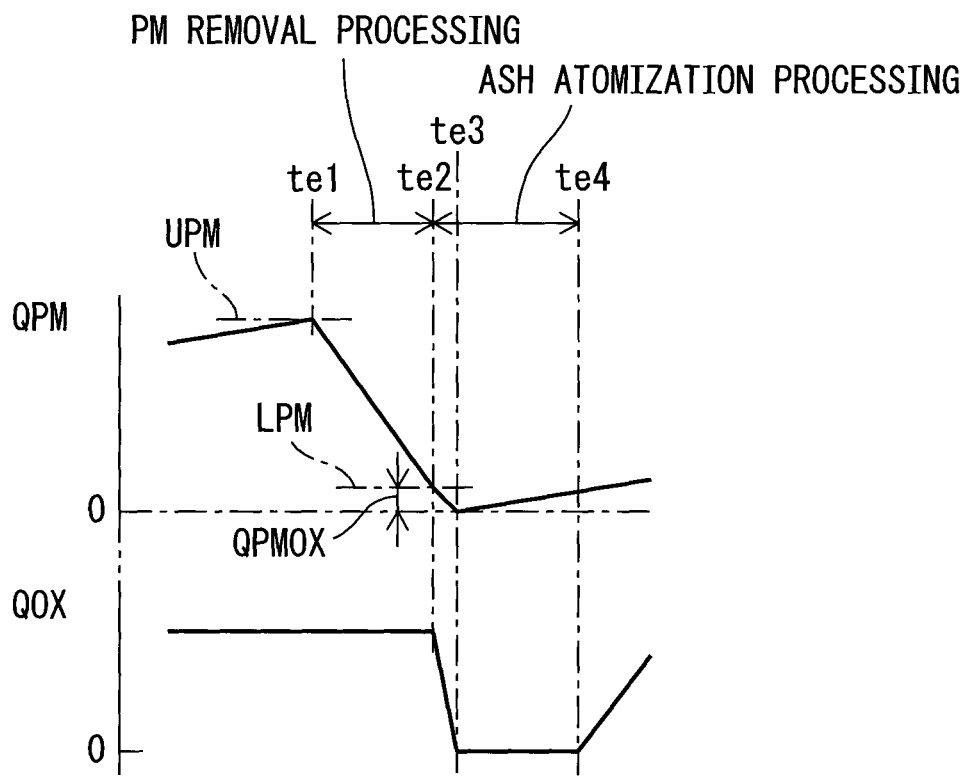
FIG. 19 is a time chart which explains a fourth embodiment according to the present invention.

That is, as shown in FIG. 19, at the time te1, if the quantity QPM of particulate matter on the particulate filter 24 exceeds the allowable upper quantity UPM, PM removal processing is started. As a result, the quantity QPM of particulate matter gradually decreases. Next, at the time te2, if the quantity QPM of particulate matter is decreased down to the allowable lower limit quantity LPM, the PM removal processing is ended, then the ash atomization processing is started following the PM removal processing. In the example which is shown in FIG. 19, the allowable lower limit quantity LPM is set to the above-mentioned quantity QPMOX. Therefore, at the time of start of the ash atomization processing, the particulate filter 24 has the quantity QPMOX of particulate matter remaining on it.

If the ash atomization processing is started, the exhaust gas which flows into the particulate filter 24 is lowered in air-fuel ratio down to, for example, the stoichiometric air-fuel ratio. As a result, the catalyst 77 which has the oxygen storage ability releases oxygen $O_2$, so the quantity QOX of oxygen which is stored in the catalyst 77 decreases. On the other hand, the particulate matter which remains in the particulate filter 24 is oxidized by this oxygen $O_2$, so the quantity QPM of particulate matter also decreases.

Next, at the time te3, the quantity QOX of storage of oxygen becomes substantially zero. As a result, the concentration of oxygen at the surface of the particulate filter 24 is sufficiently lowered. Further, in the example which is shown in FIG. 19, at this time, the quantity QPM of particulate matter becomes substantially zero.

While the ash atomization processing is being performed, the exhaust gas which flows into the particulate filter 24 has an air-fuel ratio of substantially the stoichiometric air-fuel ratio, so the quantity QOX of storage of oxygen is maintained at substantially zero. On the other hand, at this time, the exhaust gas which flows into the particulate filter 24 contains particulate matter, so the quantity QPM of particulate matter gradually increases. Next, at the time te4, the ash atomization processing is ended. As a result, the exhaust gas which flows into the particulate filter 24 is returned to a lean air-fuel ratio, so the quantity QOX of storage of oxygen gradually increases.

Figure 20:
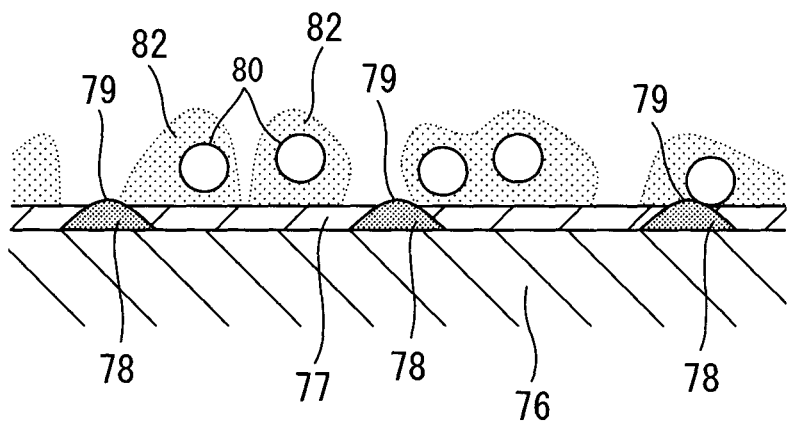
FIG. 20 is a partial enlarged view of a particulate filter which explains the fourth embodiment according to the present invention.

FIG. 20 shows the surface of the particulate filter 24 at the time of the end of the PM removal processing. As shown in FIG. 20, the untreated ash 80 on the particulate filter 24 is covered by the particulate matter 82. As a result, the untreated ash is kept from aggregating.

FIG. 21 shows the routine for performing the PM removal processing of the fourth embodiment according to the present invention. This routine is for example executed at step 112 of FIG. 14. Referring to FIG. 21, at step 131, the target filter temperature TTF is set to the PM removal temperature TPM. At the next step 132, the temperature of the particulate filter 24 is made to rise to the target filter temperature TTF by temperature raising control. At the next step 133, the quantity QPM of particulate matter is updated. At the next step 134, it is judged if the quantity QPM of particulate matter is less than the allowable lower limit quantity LPM. When QPM>LPM, the routine returns to step 131. When QPM≤LPM, next, the routine proceeds to step 135 where the temperature raising control is ended. That is, the PM removal processing is ended.

Figure 22A:
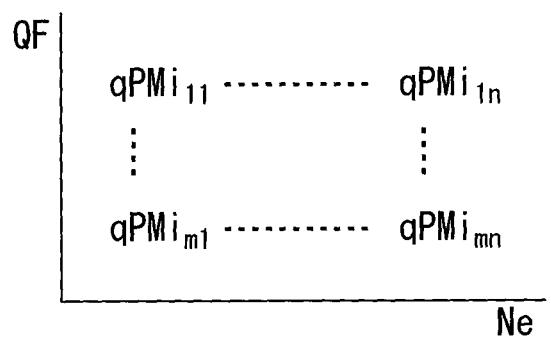
FIG. 22A is a map which shows an increment of the quantity of particulate matter.
Figure 22B:
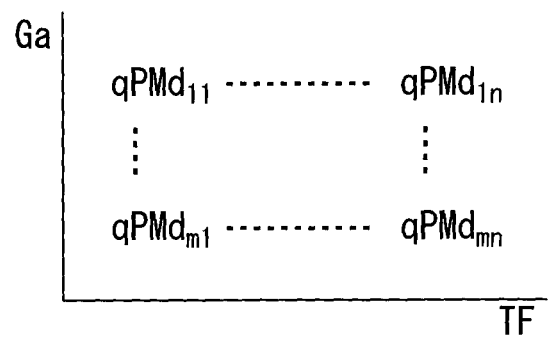
FIG. 22B is a map which shows a decrement of the quantity of particulate matter.

As explained above, the quantity QPM of particulate matter, in one embodiment, is expressed by a counter value which is obtained by cumulatively adding the totals of the increment dQPMi and the decrement dQPMd. The increment dQPMi is for example found in advance by experiments as a function of the fuel injection quantity QF and the engine speed Ne and is stored in the form of the map which is shown in FIG. 22A in the ROM 32 (FIG. 1). Further, the decrement dQPMd is for example found in advance by experiments as a function of the quantity of intake air Ga and the temperature TF of the particulate filter 24 and is stored in the form of the map which is shown in FIG. 22B in the ROM 32. In this connection, the fuel injection quantity QF expresses the engine load, while the quantity of intake air Ga expresses the amount of the exhaust gas which flows into the particulate filter 24.

Next, a fifth embodiment according to the present invention will be explained. Below, mainly the points of difference between the fifth embodiment and the fourth embodiment will be explained.

In the second embodiment according to the present invention, the allowable lower limit LPM is set to substantially zero. Therefore, at the time of the end of the PM removal processing, the particulate filter 24 has almost no particulate matter present on it (see FIG. 12B).

However, if viewed from the perspective of removal of ash, it is sufficient if the untreated ash can reach the acid points 79 of the ash atomization agent 78. It is not necessary to remove substantially all of the particulate matter on the particulate filter 24.

Figure 23:
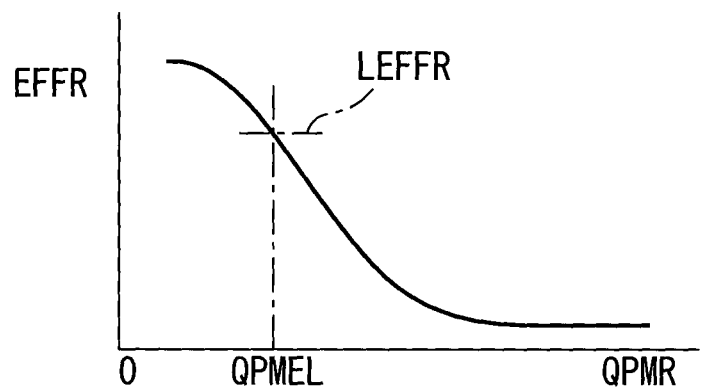
FIG. 23 is a graph which shows a relationship between a residual quantity of particulate matter and an ash removal efficiency.

FIG. 23 shows the relationship, at the time of the end of the PM removal processing, that is, at the time of start of the ash atomization processing, between the quantity QPMR of the particulate matter which remains in the particulate filter 24 and the ash removal efficiency EFFR. The ash removal efficiency EFFR is expressed by the ratio of the quantity of ash which was removed from the particulate filter 24 to the quantity of ash which flowed to the particulate filter 24. As will be understood from FIG. 23, when the quantity QPMR of residual particulate matter is large, the untreated ash has difficulty reaching the acid points of the ash atomization agent 78, so the ash removal efficiency EFFR becomes lower. If the quantity QPMR of residual particulate matter becomes smaller, the quantity of particulate matter which is interposed between the untreated ash and the acid points becomes smaller, therefore, the ash removal efficiency EFFR becomes higher. In the example which is shown in FIG. 23, when the quantity QPMR of residual particulate matter is QPMEL, the ash removal efficiency EFFR becomes the allowable lower limit efficiency LEFFR, while when the quantity QPMR of residual particulate matter is smaller than QPMEL, the ash removal efficiency EFFR becomes higher than the allowable lower limit efficiency LEFFR.

Thus, in the fifth embodiment according to the present invention, the allowable lower limit quantity LPM is set to not more than the quantity QPMEL which is required for making the ash removal efficiency EFFR the allowable lower limit efficiency LEFFR. As a result, the ash removal efficiency EFFR is maintained at the allowable lower limit efficiency LEFFR or more.

Figure 24:
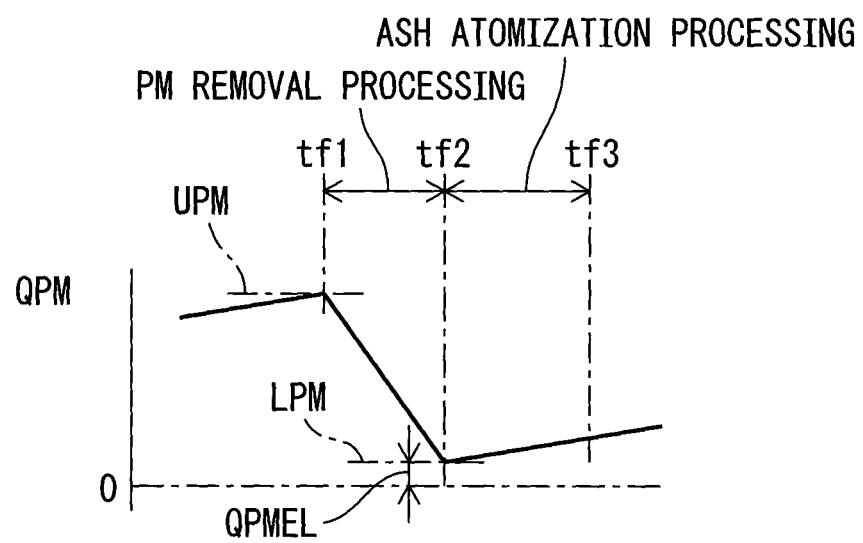
FIG. 24 is a time chart which explains a fifth embodiment according to the present invention.

That is, as shown in FIG. 24, at the time tf1, if PM removal processing is started, the quantity QPM of particulate matter gradually decreases. Next, at the time tf2, if the quantity QPM of particulate matter is decreased down to the allowable lower limit quantity LPM, the PM removal processing is ended, and the ash atomization processing is started following the PM removal processing. In the example which is shown in FIG. 24, the allowable lower limit quantity LPM is set to the above-mentioned quantity QPMEL. In other words, at the time of start of the ash atomization processing, the particulate filter 24 has the quantity QPMEL of the particulate matter remaining on it.

Figure 25:
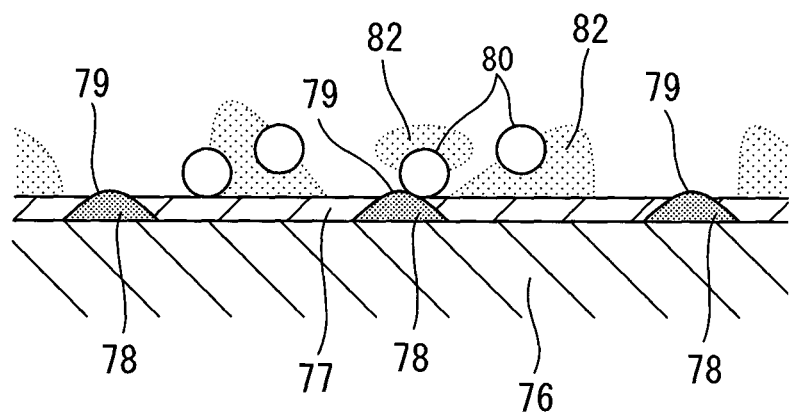
FIG. 25 is a partial enlarged view of a particulate filter which explains the fifth embodiment according to the present invention.

In this case, as shown in FIG. 25, the particulate filter 24 has the particulate matter 82 remaining on it, but there is almost no particulate matter 82 interposed between the untreated ash 80 and the acid points 79 of the ash atomization agent 78. In other words, the untreated ash 80 and acid points 79 are not covered by the particulate matter 82. Therefore, the untreated ash 80 can be reliably atomized.

Referring again to FIG. 24, even during the ash atomization processing, the exhaust gas which flows into the particulate filter 24 contains particulate matter, so the quantity QPM of particulate matter gradually increases. Next, at the time tf3, the ash atomization processing is ended. Note that, in the example which is shown in FIG. 24, the catalyst 77 does not have an oxygen storage ability.

Next, a sixth embodiment according to the present invention will be explained. Below, mainly the points of difference between the sixth embodiment and the fourth embodiment will be explained.

In the sixth embodiment according to the present invention, the particulate filter 24 carries the catalyst 77 which has the oxygen storage ability. Further, the allowable lower limit quantity LPM is set to the total of the above-mentioned quantity QPMOX and quantity QPMEL (LPM=QPMMOX+QPMEL).

Figure 26:
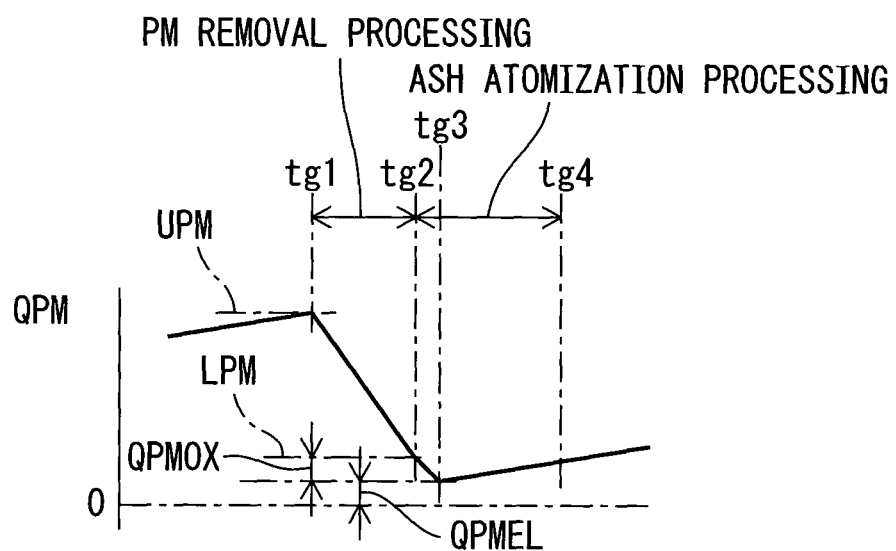
FIG. 26 is a time chart which explains a sixth embodiment according to the present invention.

As shown in FIG. 26, at the time tg1, if the PM removal processing is started, the quantity QPM of particulate matter gradually decreases. Next, at the time tg2, if the quantity QPM of particulate matter is decreased down to the allowable lower limit quantity LPM, the PM removal processing is ended, and the ash atomization processing is started following the PM removal processing. At the time of start of the ash atomization processing, the particulate filter 24 has the quantity QPMEL+QPMEL of the particulate matter remaining on it. If the ash atomization processing is started, the catalyst 77 which has the oxygen storage ability releases oxygen $O_2$ and the particulate matter which remains in the particulate filter 24 is oxidized by this oxygen $O_2$, so the quantity QPM of particulate matter decreases.

Next, when the time tg3 is reached, the quantity QOX of storage of oxygen becomes substantially zero and the quantity QPM of particulate matter is decreased down to the quantity QPMEL. That is, the quantity QPM of particulate matter is decreased by QPMOX. At this point of time, the particulate filter 24 has the quantity QPMEL of the particulate matter remaining on it. In this case, there is almost no particulate matter 82 interposed between the untreated ash 80 and the acid points 79 of the ash atomization agent 78. Therefore, the untreated ash 80 can be reliably atomized.

Even during the ash atomization processing, the exhaust gas which flows into the particulate filter 24 contains particulate matter, so the quantity QPM of particulate matter gradually increases. Next, at the time tg4, the ash atomization processing is ended.

Note that, at the point of time when the PM removal processing ends, sometimes particulate matter slightly remains on the particulate filter 24. This residual part will not burn and cannot be removed from the particulate filter 24 even if extending the duration of the PM removal processing or raising the PM removal temperature TPM. Therefore, it is possible to consider this as the incombustibles of the particulate matter. On the other hand, as explained above, the particulate matter which was intentionally left on the particulate filter 24 is removed from the particulate filter 24 if the PM removal processing is performed. Therefore, the particulate matter which remains on the particulate filter 24 differs in property from the incombustibles of the particulate matter.

Summarizing the fourth embodiment to the sixth embodiment according to the present invention, PM removal processing which renders the state of the particulate filter a state where the temperature of the particulate filter is raised in an oxidizing atmosphere to remove the particulate matter which was trapped at the particulate filter 24 is temporarily performed. The PM removal processing is ended so that a predetermined set residual quantity of the particulate matter remains on the particulate filter 24 and the ash atomization processing is performed following the PM removal processing.

On top of this, in the fourth embodiment and the sixth embodiment according to the present invention, the set residual quantity is set to at least the quantity QPMOX which is required for consuming substantially all of the oxygen which is stored in the catalyst 77 at the time of start of the ash atomization processing. Further, in the fifth embodiment and the sixth embodiment according to the present invention, the set residual quantity is set to not more than the quantity QPMEL which is required for making the ash removal efficiency the allowable lower limit efficiency. The quantities QPMOX and QPMEL can for example be found in advance by experiments.

Next, a seventh embodiment according to the present invention will be explained. Below, mainly the points of difference between the seventh embodiment and the second embodiment will be explained.

Figure 27:
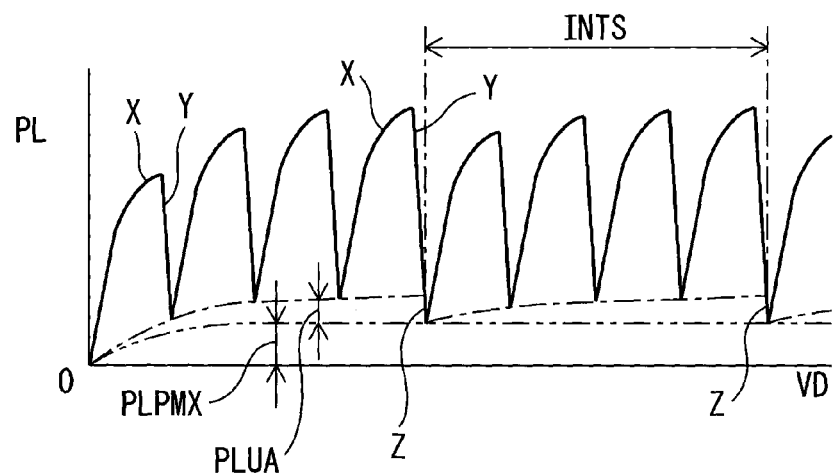
FIG. 27 is a graph which shows changes in pressure loss of a particulate filter.

FIG. 27 shows the changes in the pressure loss PL of the particulate filter 24 in the case of performing the ash atomization processing following the PM removal processing as in the second embodiment according to the present invention. As explained above, the pressure loss PL of the particulate filter 24 is expressed by, for example, the pressure difference upstream and downstream of the particulate filter 24. Note that, in FIG. 27, VD indicates the vehicle driving distance.

Referring to FIG. 27, as the engine operation is started and the vehicle driving distance VD becomes longer, the quantity of the particulate matter on the particulate filter 24 increases, so, as shown by X, the pressure loss PL increases. Next, if the PM removal processing is performed, as shown by Y, the pressure loss PL decreases. Next, if normal operation is returned to, the pressure loss PL again increases. Next, if the PM removal processing is again performed, the pressure loss PL again decreases. In this way, the pressure loss PL repeatedly increases and decreases.

As explained above, after the PM removal processing is performed, the particulate filter 24 has incombustibles of the particulate matter and ash remaining on it. For this reason, as shown in FIG. 27, there is a pressure loss part PLPMX due to the particulate matter incombustibles and a pressure loss part PLUA due to the ash. That is, the pressure loss PL does not return to zero. The pressure loss part PLUA due to the ash increases as the vehicle driving distance VD becomes longer. On the other hand, the pressure loss part PLPMX due to the particulate matter incombustibles becomes larger the longer the vehicle driving distance VD becomes when the vehicle driving distance VD is short. When the vehicle driving distance VD becomes longer by a certain degree, it converges to a substantially constant value.

Next, if the ash atomization processing is performed following the PM removal processing, as shown in FIG. 27 by Z, the part PLUA of the pressure loss due to the ash becomes substantially zero. Therefore, the pressure loss PL is further decreased.

In the embodiments according to the present invention which have been explained up to here, roughly speaking, each time the quantity QUA of untreated ash becomes the allowable upper quantity UUA, the ash atomization processing is performed. Therefore, it is also possible to see this as the ash atomization processing being repeatedly performed separated by a set interval INTS which is determined according to the allowable upper quantity UUA. In the embodiments according to the present invention which have been explained up to here, the allowable upper quantity UUA or the set interval INTS is for example set to a constant value.

As explained above, if the ash atomization processing ends, that is, the state of the particulate filter 24 is rendered a state where the exhaust gas which flows into the particulate filter 24 in an oxidizing atmosphere contains SOx, the atomized ash which is held at the ash atomization agent 78 is gradually released from the ash atomization agent 78. As a result, the acid points of the ash atomization agent 78 are regenerated. The regenerated acid points 79, that is, the active acid points 79, can be used to atomize the untreated ash at the time of the next ash atomization processing. In other words, if the acid points 79 are not sufficiently regenerated, even if performing the ash atomization processing, the untreated ash cannot be sufficiently atomized.

If considering keeping the pressure loss of the particulate filter 24 due to the untreated ash small, it is preferable to set the allowable upper quantity UUA small, that is, to set the set interval INTS short.

However, if setting the allowable upper quantity UUA small, that is, if setting the set interval INTS short, at the point of time when the subsequent ash atomization processing should be started, the ash atomization agent 78 may hold a large amount of atomized ash and the acid points 79 of the ash atomization agent 78 may be insufficiently regenerated. In this case, even if performing the ash atomization processing, a sufficient quantity of untreated ash is hard to atomize. Further, if setting the set interval INTS short, the ash atomization processing is frequently performed, so the energy which is required for the ash atomization processing increases.

Therefore, the allowable upper quantity UUA or the set interval INTS has to be set to the optimal value for maintaining the particulate filter 24 small in pressure loss while sufficiently atomizing the untreated ash.

On the other hand, the speed of release of the atomized ash fluctuates in accordance with the quantity of SOx in the inflowing exhaust gas, while the quantity of SOx in the inflowing exhaust gas fluctuates in accordance with the engine operating state, the concentration of sulfur in the fuel, etc. That is, when the quantity of SOx in the inflowing exhaust gas is large, the atomized ash is released in a short time period, while when the quantity of SOx in the inflowing exhaust gas is small, a long time period is required for the atomized ash to be released. For this reason, even if finding and setting the optimal values of the allowable upper quantity UUA or the set interval INTS in advance by experiments etc., if the engine operation time becomes long, the allowable upper quantity UUA or set interval INTS which is set is liable to no longer be optimal.

Thus, in the seventh embodiment according to the present invention, the quantity of untreated ash which was treated by the ash atomization processing is found and the allowable upper quantity UUA or the set interval INTS is updated on the basis of the found quantity of ash.

Next, the action of updating the allowable upper quantity UUA or the set interval INTS in the case, like in the second embodiment according to the present invention, where the ash atomization processing is performed following the PM removal processing will be explained while referring to FIG. 28. The same is applicable to the action of updating the allowable upper quantity UUA or the set interval INTS in the case, like in the first embodiment according to the present invention, where the ash atomization processing is performed independently from the PM removal processing.

Figure 28:
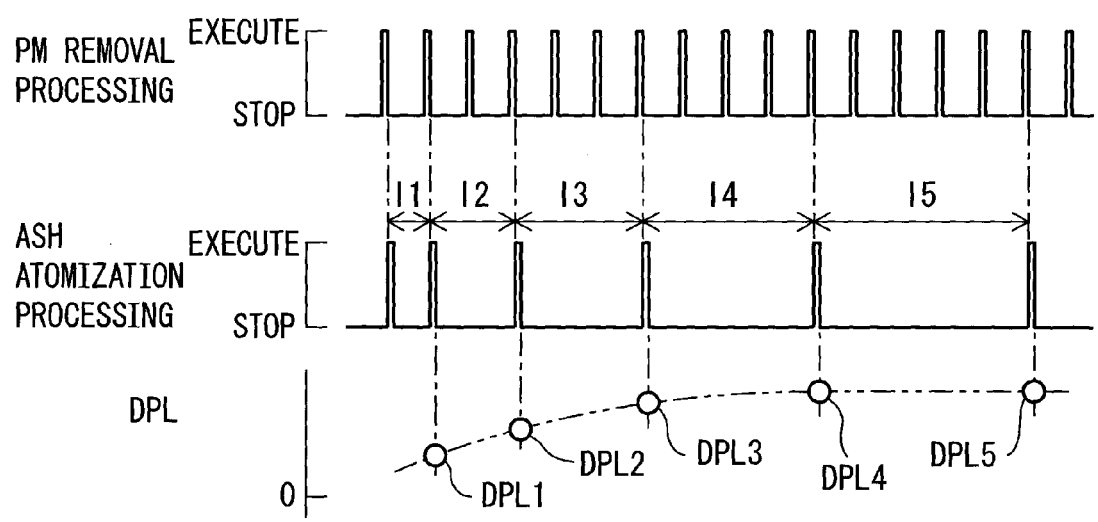
FIG. 28 is a time chart which explains a seventh embodiment according to the present invention.

Referring to FIG. 28, the interval INT from a previous ash atomization processing to a next ash atomization processing is set to a plurality of mutually different intervals I1, I2 (>I1), I3 (>I2), I4 (>I3), and I5 (>I4) and the ash atomization processing is repeatedly performed. In the example which is shown in FIG. 28, the intervals I1, I2, I3, I4, and I5 respectively correspond to one cycle, two cycles', three cycles', four cycles', and five cycles' worth of the PM removal processing.

On top of this, the quantity of untreated ash which was treated by each ash atomization processing is found. This treated quantity of ash is expressed by the pressure loss of the particulate filter 24 which was decreased by the ash atomization processing (Z in FIG. 27). This decreased pressure loss DPL is found by the difference (PLS-PLE) between the pressure loss PLS at the time of start of the ash atomization processing and the pressure loss PLE at the time of end of the ash atomization processing. The DPL1, DPL2, DPL3, DP4, and DPL5 which are shown in FIG. 28 respectively express the pressure loss difference DPL which is found when the interval INT is set to I1, I2, I3, I4, and I5.

Figure 29:
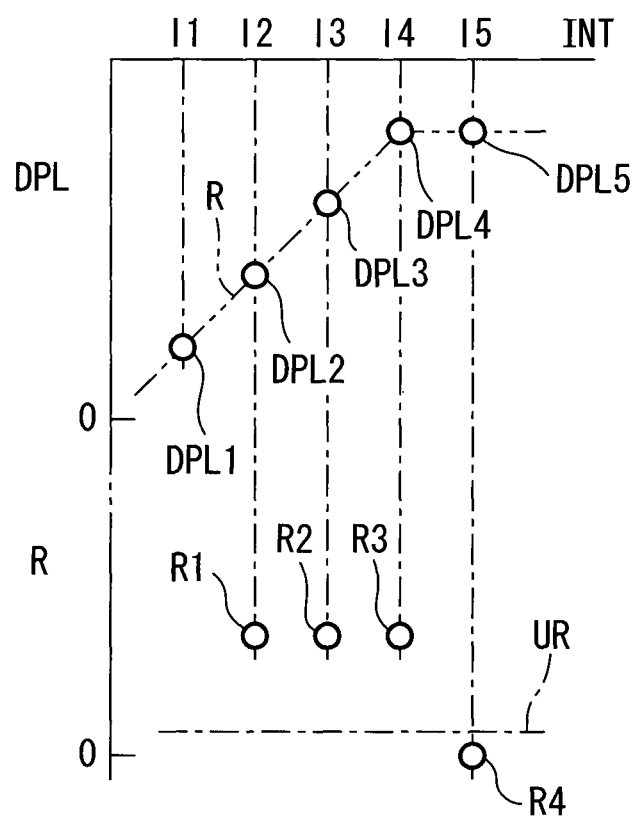
FIG. 29 is a graph which shows the pressure loss and its rate of change.

If expressing the pressure loss difference DPL as a function of the interval INT, the result becomes like in FIG. 29. FIG. 29 further shows the rate of change R of the pressure loss difference DPL. The rate of change R is expressed by the ratio of the amount of change DDPL of the pressure loss difference DPL to the amount of change DINT of the interval INT (R=DDPL/DINT). That is, the rate of change R1 is the ratio of the amount of change of the pressure loss difference DPL (DPL2−DPL1) to the amount of change of the interval INT (I2−I1) (=(DPL2−DPL1)/(I2−I1)). Similarly, R2=(DPL3−DPL2)/(I3−I2), R3= (DPL4−DPL3)/(I4−I3), and R4=(DPL5−DPL4)/(I5−I4).

As will be understood from FIG. 29, when the interval INT is shorter than I4, as the interval INT becomes longer, the pressure loss difference DPL becomes larger. If the interval INT becomes longer than I4, the pressure loss difference DPL converges to a constant value. In other words, when the interval INT is shorter than I4, the rate of change R of the pressure loss difference DPL is a relatively large positive value, while when the interval INT becomes longer than I4, the rate of change R becomes substantially zero. Therefore, if setting the interval INT shorter than I4, the ash atomization processing will be performed in a state where the acid points 79 are not sufficiently regenerated. As a result, the untreated ash cannot be sufficiently atomized. On the other hand, even if setting the interval INT longer than I4, the pressure loss difference DPL will not increase, that is, the quantity of ash which is atomized by the ash atomization processing will not increase. Rather, the quantity of untreated ash on the particulate filter 24 will end up increasing.

Thus, in the seventh embodiment according to the present invention, the new set interval INTS is set at the interval I4. That is, when increasing the interval INT from I1, it is set to the one previous interval I4 from the interval I5 where the rate of change R became smaller than the upper limit value UR. In this way, the set interval INTS is updated. As a result, the allowable upper quantity UUA or the set interval INTS can be maintained optimal. In other words, the ash can continue to be sufficiently and efficiently removed.

Figure 30:
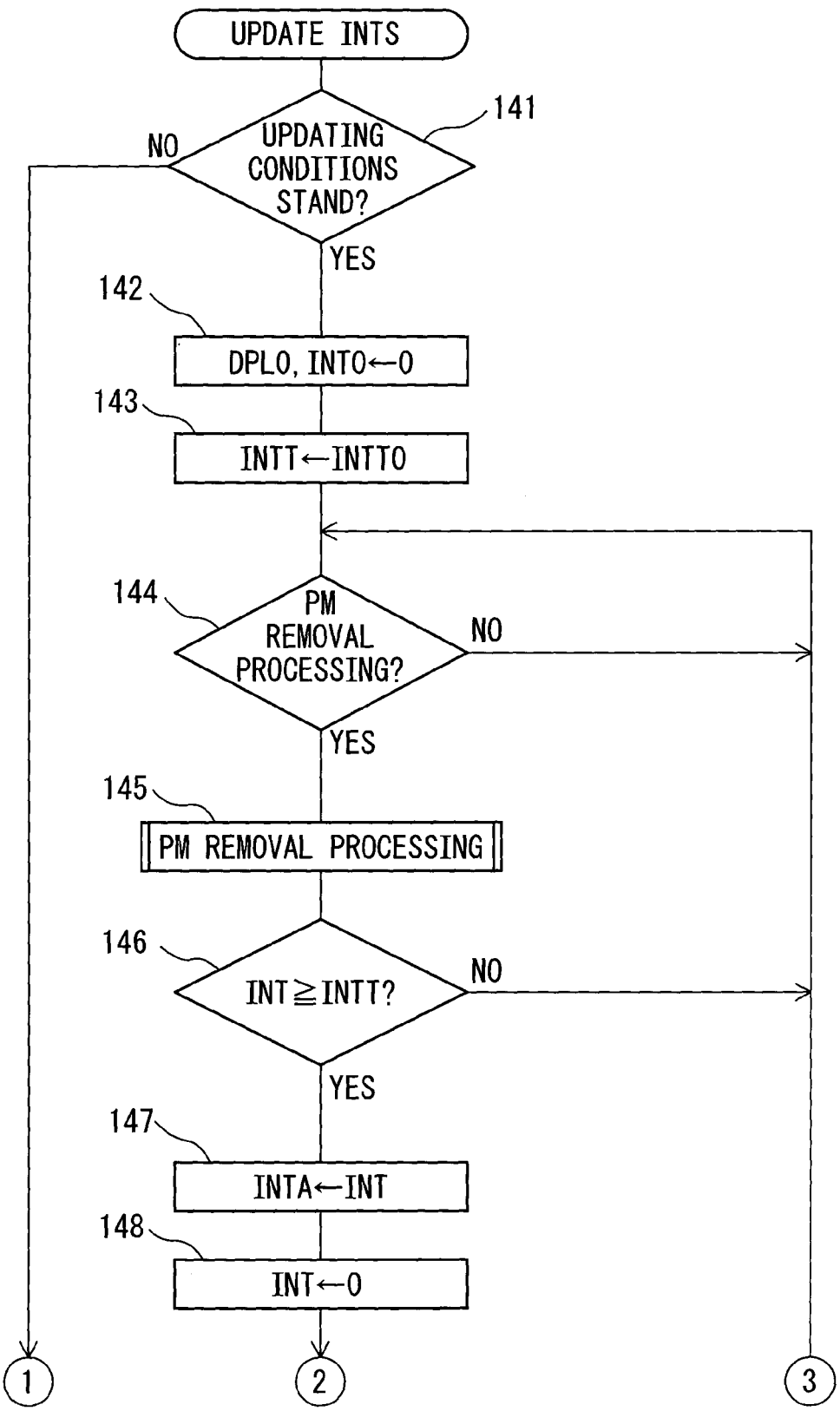
FIG. 30 is a flow chart which shows a routine for performing control for updating a set interval of, the seventh embodiment according to the present invention.
Figure 31:
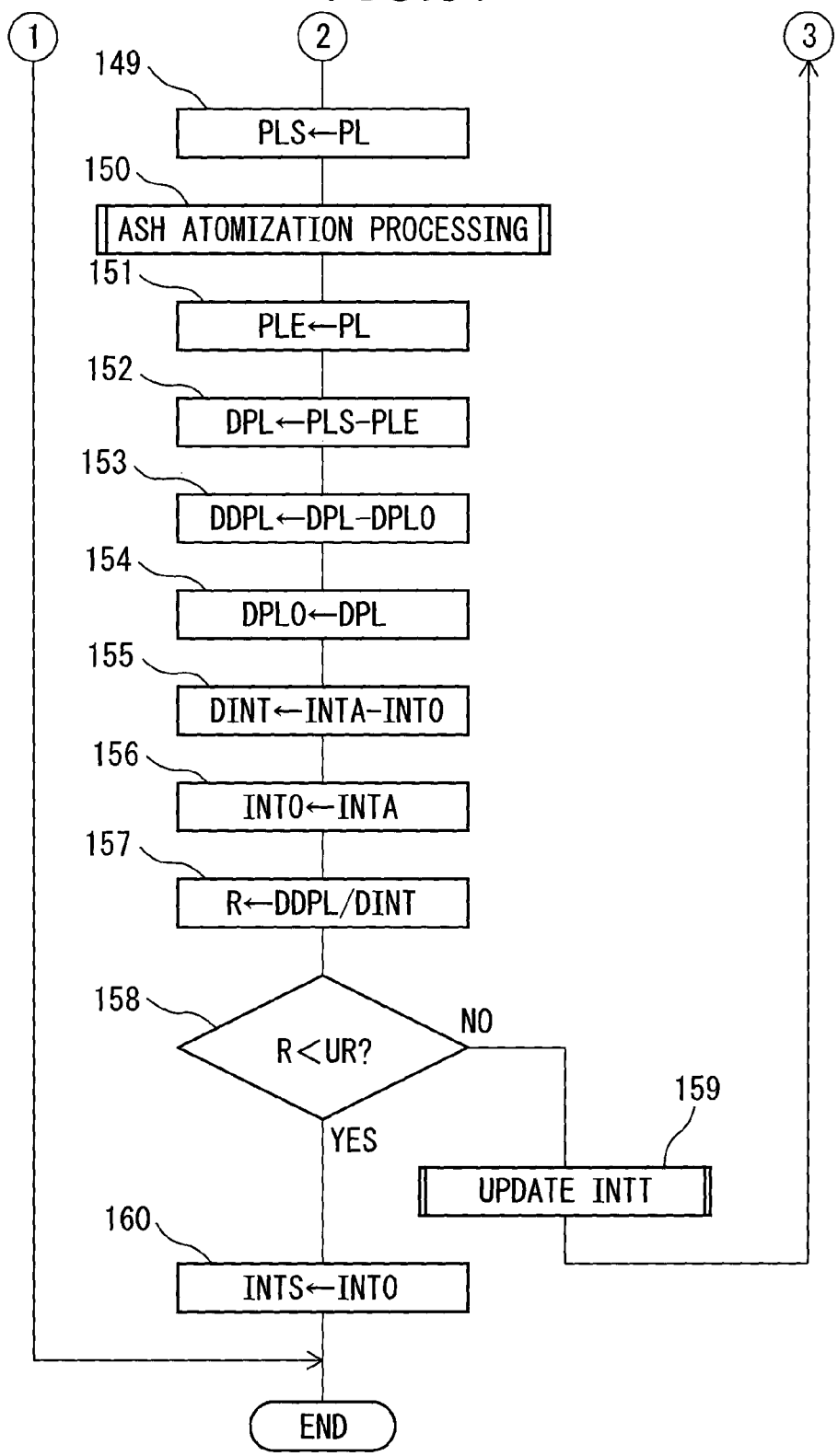
FIG. 31 is a flow chart which shows a routine for performing control for updating a set interval of the seventh embodiment according to the present invention.

FIG. 30 and FIG. 31 show the routine for performing control for updating the set interval INTS. Referring to FIG. 30 and FIG. 31, at step 141, it is judged if the conditions for updating the set interval INTS stand. For example, it is judged that the conditions for updating stand when the vehicle driving distance VD from when the set interval INTS is updated increased by a predetermined constant value, while it is judged that the conditions for updating do not stand when otherwise. When it is judged that the conditions for updating do not stand, the processing cycle is ended. When it is judged that the conditions for updating stand, the routine proceeds to step 142 where the pressure loss difference DPL0 and the interval INT0 at the previous processing cycle are respectively set to zero. At the next step 143, the target value INTT of the interval INT is set to the initial value INTT0. In the example which is shown in FIG. 28 and FIG. 29, INTT0 is equal to I1.

Figure 32:
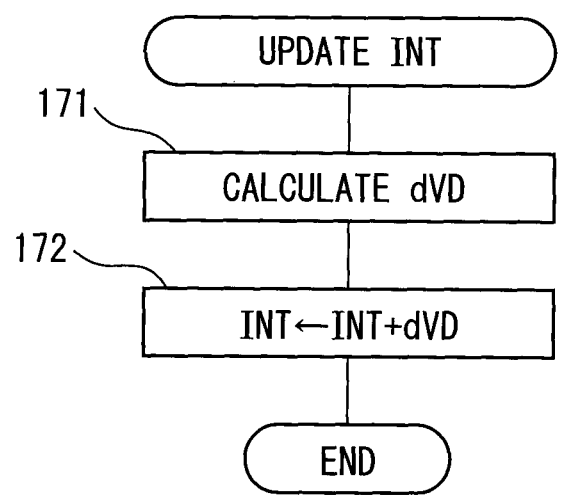
FIG. 32 is a flow chart which shows a routine for updating an interval.

At the next step 144, it is judged if the PM removal processing should be performed. When it is not judged that the PM removal processing should be performed, the routine returns to step 144. When it is judged that the PM removal processing should be performed, next, the routine proceeds to step 145 where the PM removal processing is performed. At the next step 146, it is judged if the interval INT from the previous ash atomization processing is the target interval INTT or more. The interval INT is updated by the routine, which is shown in FIG. 32. When INT<INTT, the routine returns to step 144. When INT≥INTT, next, the routine proceeds to step 147 where the interval INT at this point of time, that is, at the time of start of the ash atomization processing, is stored as INTA. At the next step 148, the interval INT is reset to zero.

At the next step 149, the pressure loss DL of the particulate filter 24 at this point of time, that is, at the time of start of the ash atomization processing, is stored as PLS. At the next step 150, the ash atomization processing is performed. At the next step 151, the pressure loss DL at this point of time, that is, at the time of end of the ash atomization processing, is stored as PLE. At the next step 152, the pressure loss difference DPL is calculated (DPL=PLS−PLE). At the next step 153, the amount of change DDPL of the pressure loss difference DPL is calculated (DDPL=DPL−DPL0). At the next step 154, the pressure loss difference DPL at the current processing cycle is stored as the pressure loss difference DPL0 at the previous processing cycle. At the next step 155, the amount of change DINT of the interval INT is calculated (DINT=INTA−INT0). At the next step 156, the interval INTA at the current processing cycle is stored as the interval INT0 at the previous processing cycle. At the next step 157, the rate of change R of the pressure loss difference DPL is calculated (R=DDPL/DINT).

At the next step 158, it is judged if the rate of change R is smaller than the upper limit value UR. When R≥UR, next, the routine proceeds to step 159 where the target interval INTT is changed. In the example which is shown in FIG. 28 and FIG. 29, the target interval INTT is for example extended from I1 to I2. Next, the routine returns to step 144. When R<UR, the routine proceeds to step 160 where the interval INT0 at the previous processing cycle is set as the set interval INTS. In this way, the set interval INTS is updated.

FIG. 32 shows the routine for updating the interval INT. Referring to FIG. 32, at step 171, the vehicle driving distance from the previous processing cycle to the current processing cycle is calculated. At the next step 172, the vehicle driving distance dVD is added to the interval INT. That is, in the example which is shown in FIG. 32, the vehicle driving distance is used to express the interval INT.

Next, an eighth embodiment according to the present invention will be explained. Below, mainly the points of difference between the eighth embodiment and the first embodiment will be explained.

Figure 33:
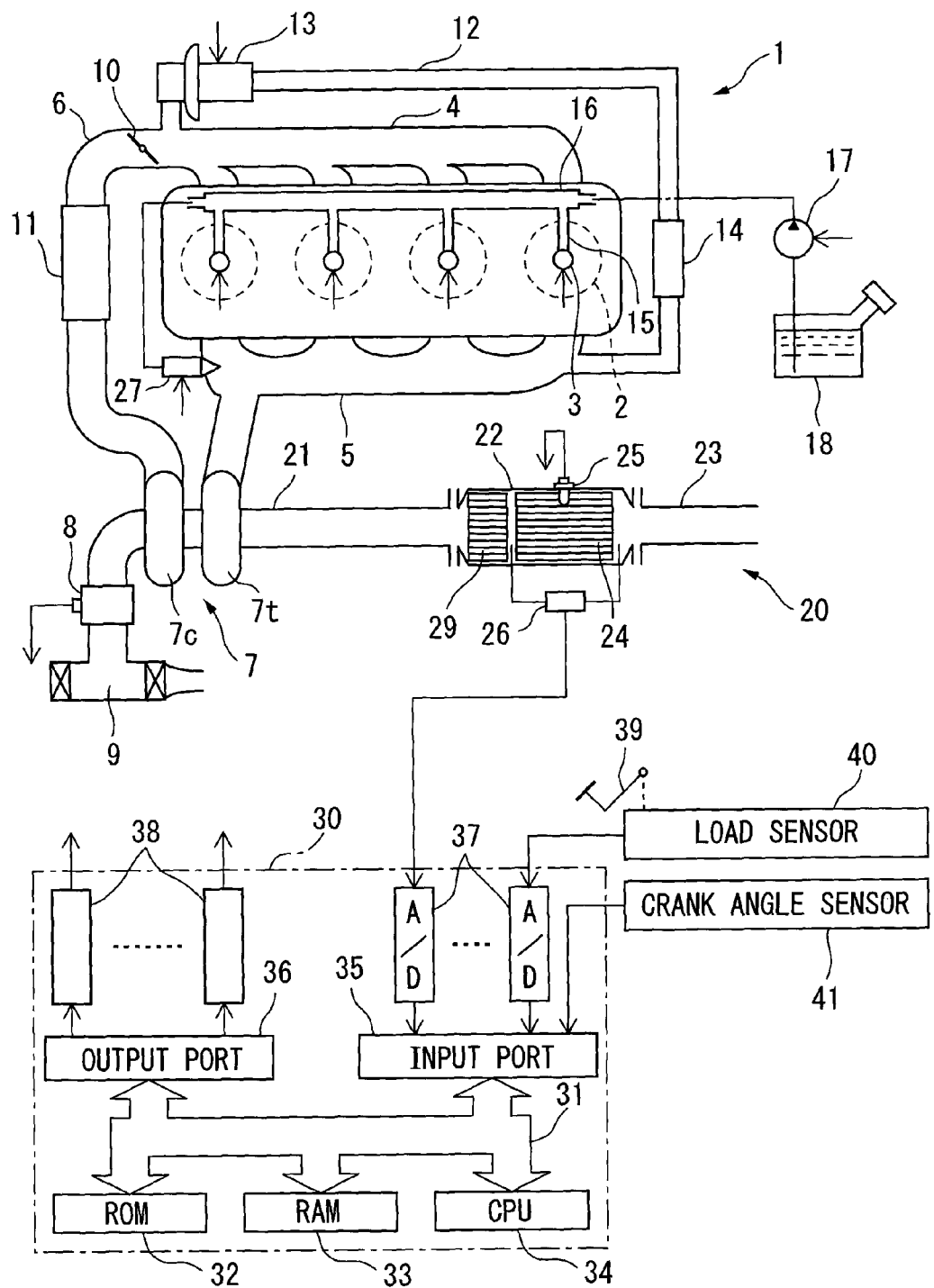
FIG. 33 is an overall view of an internal combustion engine which shows an eighth embodiment according to the present invention.

Referring to FIG. 33, inside the catalytic converter 22 upstream of particulate filter 24, an SOx storage agent 29 is contained. Note that the temperature of the SOx storage agent 29 may be considered to be substantially equal to the temperature of the particulate filter 24 and the air-fuel ratio of the exhaust gas which flows to the SOx storage agent 29 may be considered to be equal to the air-fuel ratio AFE of the exhaust gas which flows into the particulate filter 24.

The SOx storage agent 29 forms a honeycomb structure which is provided with a plurality of exhaust flow passages which are separated from each other by thin partition walls. These exhaust flow passages are alternately opened at their upstream ends and downstream ends. On the two side surfaces of the partition walls are carried, for example, alumina $Al_2O_3$, ceria $CeO_2$, praseodymium oxide $Pr_6O_{11}$, neodymium oxide $Nd_2O_3$, lanthanum oxide $La_2O_3$, or other such base metal oxide and platinum Pt, palladium Pd, silver Ag, or other such precious metal.

The SOx storage agent 29 has the property of storing the SOx, for example, the $SO_2$, in the exhaust gas which flows in when the SOx storage agent 29 is low in temperature or the exhaust gas which flows to the SOx storage agent 29 is high in concentration of oxygen and of releasing the stored SOx when the SOx storage agent 29 becomes high in temperature or the exhaust gas which flows to the SOx storage agent 29 becomes low in concentration of oxygen. In the eighth embodiment according to the present invention, when the temperature of the SOx storage agent 29 or the particulate filter 24 is 200° C. to 250° C. or so, SOx is stored in the SOx storage agent 29. On the other hand, when the temperature of the SOx storage agent 29 or the particulate filter 24 becomes for example 300° C. or more, the SOx storage agent 29 releases the stored SOx. The SOx storage action at the SOx storage agent 29 is believed to be due to the SOx being adsorbed at the carrier or precious metal particles.

Figure 34:
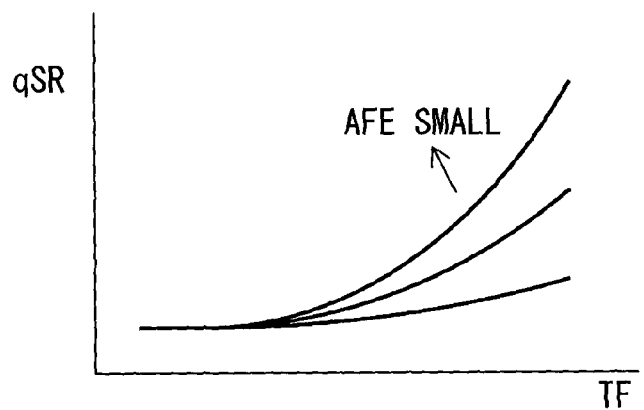
FIG. 34 is a graph which shows an SOx release speed of an SOx storage agent.

FIG. 34 shows the quantity of SOx which is released per unit time from the SOx storage agent 29, that is, the SOx release speed qSR. As will be understood from FIG. 34, the SOx release speed qSR becomes greater the higher the temperature TF of the particulate filter 24 and becomes greater the smaller the air-fuel ratio AFE of the inflowing exhaust gas, that is, the smaller the leanness.

In the above-mentioned first embodiment, if the ash atomization processing ends and normal operation is returned to, the particulate filter 24 is fed with SOx in an oxidizing atmosphere. As a result, the held atomized ash is released from the ash atomization agent 78 and is removed from the particulate filter 24. In this case, the release speed of the atomized ash is determined in accordance with the concentration of SOx in the exhaust gas which flows into the particulate filter 24. That is, when the concentration of SOx in the exhaust gas which flows into the particulate filter 24 is high, the release speed of the atomized ash becomes high, while when the concentration of SOx is low, the release speed of the atomized ash becomes low.

In this regard, in normal operation, the concentration of SOx in the exhaust gas which is discharged from the engine is not always high. As a result, in normal operation after the ash atomization processing ends, the atomized ash is liable not to be quickly released from the ash atomization agent 78. In other words, a long time period is liable to be required until the acid points of the ash atomization agent 78 are sufficiently regenerated. If the acid points of the ash atomization agent 78 are not sufficiently regenerated, even if performing the ash atomization processing, the untreated ash cannot be sufficiently atomized. As a result, the quantity of untreated ash on the particulate filter 24 will increase and the particulate filter 24 will be liable to increase in pressure loss.

Thus, in the eighth embodiment according to the present invention, an SOx storage agent 29 is arranged upstream of the particulate filter 24 and the concentration of SOx in the exhaust gas which flows into the particulate filter 24 is temporarily raised. This will be explained with reference to FIG. 35.

Figure 35:
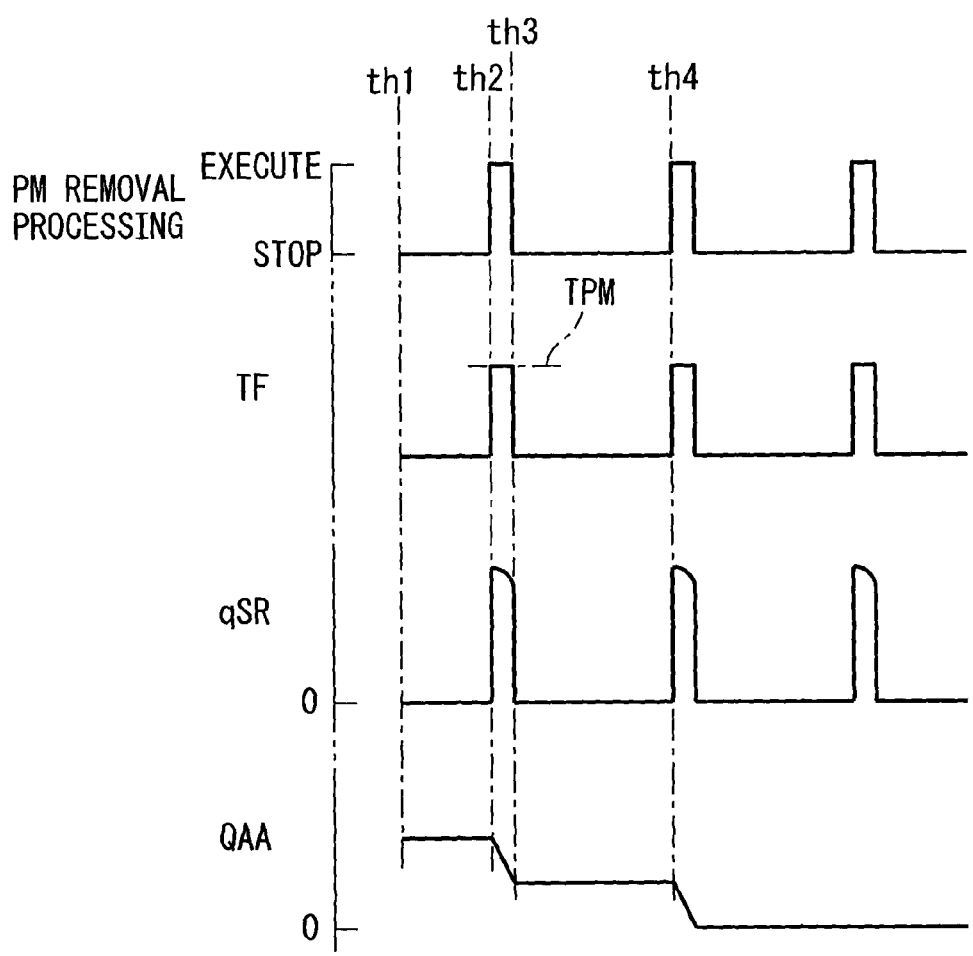
FIG. 35 is a time chart which explains exhaust purification control of the eighth embodiment according to the present invention.

In FIG. 35, the time th1 shows the point of time when the ash atomization processing ends. At the time of normal operation where the PM removal processing and ash atomization processing are not performed, the SOx storage agent 29 is relatively low in temperature and the exhaust gas which flows to the SOx storage agent 29 is relatively high in oxygen concentration. As a result, the SOx in the exhaust gas which flows to the SOx storage agent 29 at this time is stored in the SOx storage agent 29.

Next, at the time th2, if the PM removal processing is performed, the temperature TF of the particulate filter 24 or SOx storage agent 29 is raised to the PM removal temperature TPM in an oxidizing atmosphere. The PM removal temperature TPM, as explained above, is 300 to 500° C. or so when the catalyst 77 is formed from ceria $CeO_2$ and silver Ag and is 600° C. or so when the catalyst 77 is formed from alumina $Al_2O_3$ and platinum Pt. As a result, the SOx storage agent 29 greatly rises in SOx release speed qSR. That is, the exhaust gas which flows into the particulate filter 24 is raised in concentration of SOx and the quantity of SOx which is fed to the ash atomization agent 78 is increased. As a result, the quantity QAA of the atomized ash on the ash atomization agent 78 decreases. That is, the ash atomization agent 78 releases the atomized ash. Next, at the time th3, the PM removal processing is ended. As a result, the SOx storage agent 29 no longer releases almost any SOx.

Next, at the time th4, if the PM removal processing is again performed, the SOx storage agent 29 again releases SOx and the quantity QAA of the atomized ash on the ash atomization agent 78 is further decreased. In the example which is shown in FIG. 35, the quantity QAA of the atomized ash is decreased to substantially zero.

As a result, the atomized ash can be made to be quickly released from the particulate filter 24. In other words, the action of removal of the atomized ash from the particulate filter 24 is promoted. Therefore, the interval from when a previous ash atomization processing is performed to when a next ash atomization processing is performed can be set short. This means that the quantity of untreated ash on the particulate filter 24 can be maintained small.

Next, a ninth embodiment according to the present invention will be explained. Below, mainly the points of difference between the ninth embodiment and the eighth embodiment will be explained.

As explained referring to FIG. 35, if the PM removal processing is performed, the SOx storage agent 29 releases SOx. In this regard, In this case, the temperature TF of the SOx storage agent 29 or the particulate filter 24 is made to greatly rise to the PM removal temperature TPM. As a result, as will be understood from FIG. 34, a large amount of SOx may be released from the SOx storage agent 29 in a short time period. In this case, the SOx becomes excessive for the quantity of atomized ash which should be released from the particulate filter 24 and the excess SOx is liable to flow out from the particulate filter 24.

Thus, in the ninth embodiment according to the present invention, SOx increasing processing for making the SOx storage agent 29 release SOx to increase the quantity of SOx which is fed to the ash atomization agent 78 is made to be performed temporarily in advance of the PM removal processing. In particular, in the ninth embodiment according to the present invention, SOx increasing temperature processing for making the SOx storage agent 29 release SOx by raising the temperature TF of the SOx storage agent 29 is performed temporarily in advance of the PM removal processing. In other words, when the PM removal processing should be performed, first, the SOx increasing temperature processing is performed, then the PM removal processing is performed following the SOx increasing temperature processing. This will be explained with reference to FIG. 36.

Figure 36:
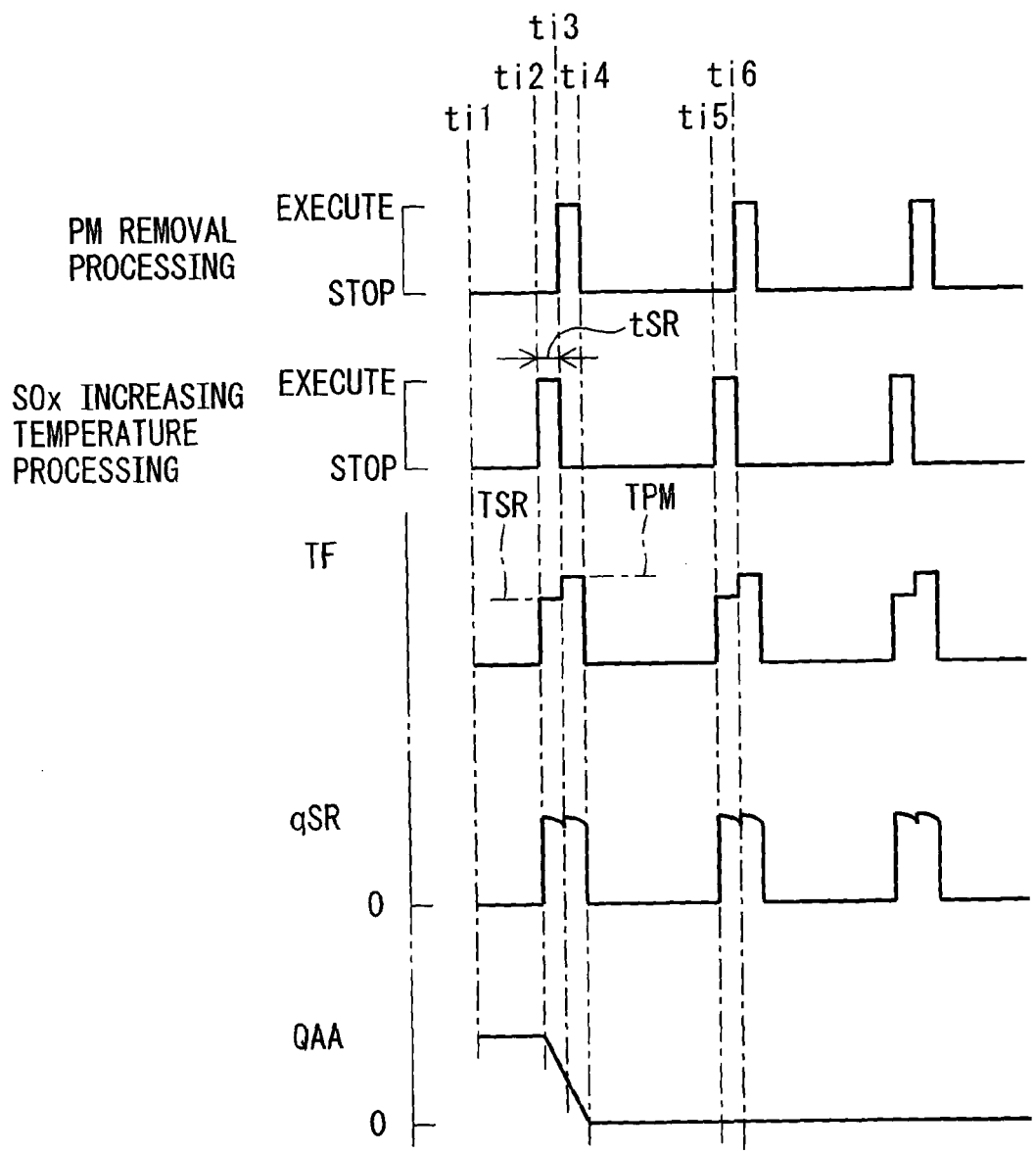
FIG. 36 is a time chart which explains exhaust purification control of a ninth embodiment according to the present invention.

In FIG. 36, the time ti1 shows the point of time when the ash atomization processing ends. Next, at the time ti2, the SOx increasing temperature processing is started. Specifically, the temperature TF of the SOx storage agent 29 or the particulate filter 24 is raised up to the SOx release temperature TSR under an oxidizing atmosphere. As a result, the SOx storage agent 29 releases SOx and the quantity of feed of SOx to the particulate filter 24 is increased. Therefore, release of the atomized ash from the particulate filter 24 is promoted. The SOx release temperature TSR is set to a temperature which is lower than the PM removal temperature TPM, for example 300° C. to 450° C. In another embodiment, the SOx release temperature TSR is set substantially the same or higher than the PM removal temperature TPM.

Next, when the time ti3 is reached, that is, if the SOx increasing temperature processing is performed for the time period tSR, the SOx increasing temperature processing is ended, then the PM removal processing is started. That is, the temperature TF of the SOx storage agent 29 or the particulate filter 24 is raised to the PM removal temperature TPM under an oxidizing atmosphere. As a result, the release of SOx from the SOx storage agent 29 is continued.

Next, at the time ti4, the PM removal processing is ended. As a result, control for raising the temperature TF of the SOx storage agent 29 or the particulate filter 24 is ended, and the release of SOx from the SOx storage agent 29 is ended. In the example which is shown in FIG. 36, at this time, the quantity QAA of the atomized ash which is held on the particulate filter 24 becomes substantially zero.

Next, at the time ti5, the SOx increasing temperature processing is again started and, at the time ti6, the PM removal processing is again started. In this way, the ninth embodiment according to the present invention performs the SOx increasing temperature processing even if the quantity QAA of the atomized ash on the particulate filter 24 is substantially zero. In another embodiment, the SOx increasing temperature processing is not performed when the quantity QAA of the atomized ash on the particulate filter 24 becomes substantially zero.

Figure 37:
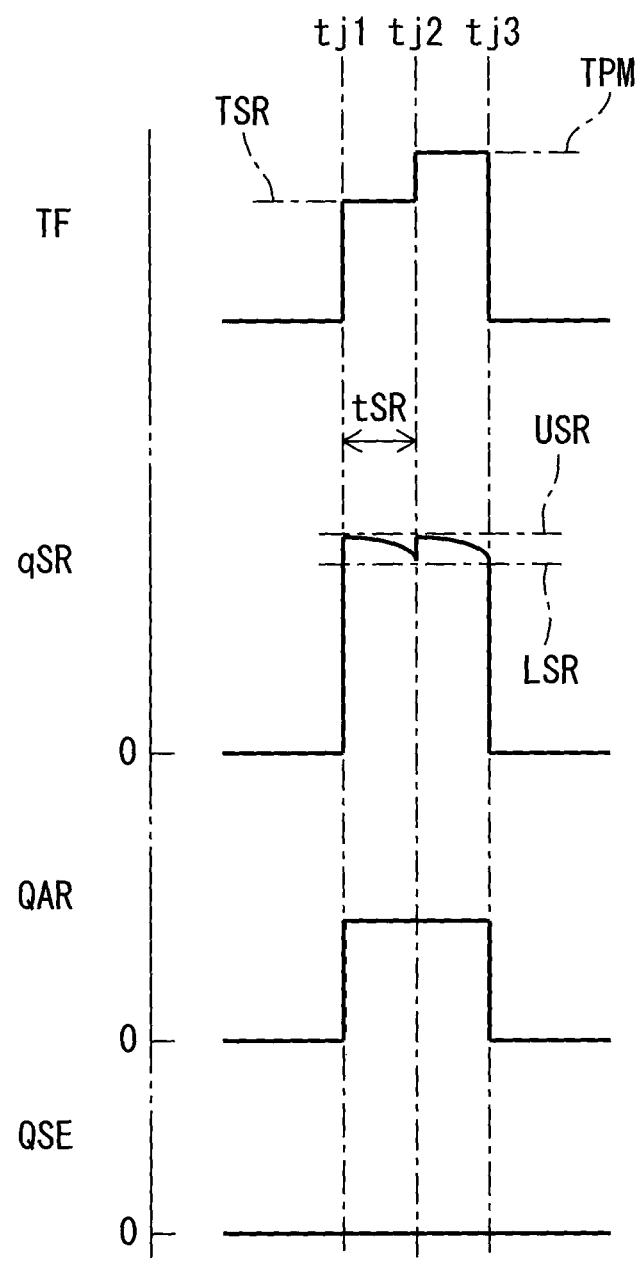
FIG. 37 is a time chart which shows changes in an SOx release speed of an SOx storage agent in the ninth embodiment according to the present invention.

FIG. 37 shows in detail the changes in the SOx release speed of the SOx storage agent 29 in the ninth embodiment according to the present invention. Referring to FIG. 37, at the time tj1, if the SOx increasing temperature processing is started, the temperature TF of the SOx storage agent 29 or the particulate filter 24 is raised to the SOx release temperature TSR. As a result, the SOx release speed qSR of the SOx storage agent 29 rapidly rises. Next, if the temperature TF of the SOx storage agent 29 or the particulate filter 24 is maintained at the SOx release temperature TSR, the SOx release speed qSR decreases along with the elapse of time.

Next, at the time tj2, if the SOx increasing temperature processing is performed for the SOx release time tSR, the SOx increasing temperature processing is ended, then the PM removal processing is started. That is, the temperature TF of the SOx storage agent 29 or the particulate filter 24 is raised to the PM removal temperature TPM. As a result, the SOx release speed qSR again rises. Next, if the temperature TF of the SOx storage agent 29 or the particulate filter 24 is maintained at the PM removal temperature TPM, the SOx release speed qSR decreases along with the elapse of time. Next, at the time td3, the PM removal processing is ended.

The behavior of the SOx release speed qSR is determined by the SOx release temperature TSR and the SOx release time tSR. In the ninth embodiment according to the present invention, one or both of the SOx release temperature TSR and SOx release time tSR are set so that the SOx release speed qSR of the SOx storage agent 29 from when the SOx increasing temperature processing is started to when the PM removal processing is ended is substantially maintained in the allowable range which is defined by the allowable lower limit value LSR and allowable upper limit value USR.

If the SOx release speed qSR is higher than the allowable upper limit value USR, the SOx becomes excessive for the atomized ash on the particulate filter 24. If the SOx release speed qSR is lower than the allowable lower limit value LSR, the atomized ash cannot be made to be quickly released from the particulate filter 24. As a result, as shown in FIG. 37, the quantity QAR of the atomized ash which is released from the particulate filter 24 can be maintained substantially constant at a high level while the quantity QSR of the SOx which flows out from the particulate filter 24 can be maintained at substantially zero. Further, since the SOx increasing temperature processing is followed by the PM removal processing, the energy which is required for PM removal processing can be decreased.

Figure 38:
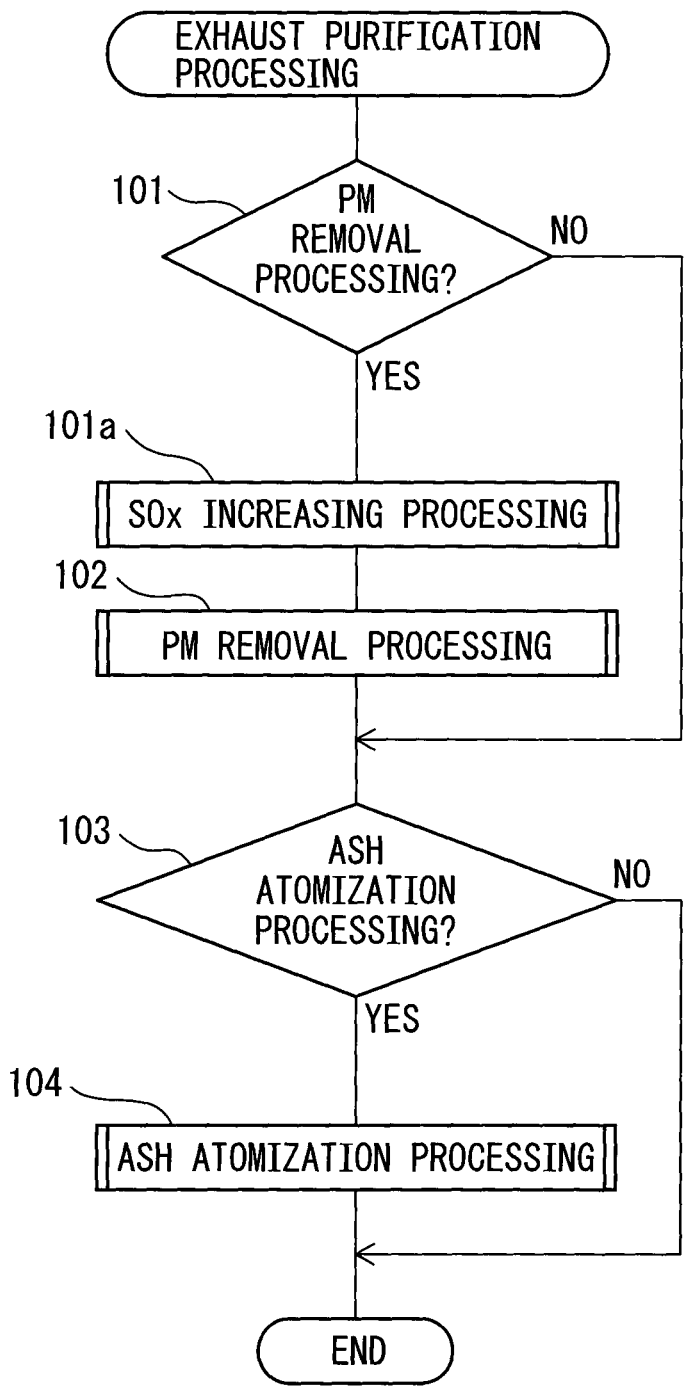
FIG. 38 is a flow chart of performance of a routine which performs exhaust purification control of the ninth embodiment according to the present invention.

FIG. 38 shows the routine for performing exhaust purification control of a ninth embodiment according to the present invention. Referring to FIG. 38, at step 101, it is judged if the PM removal processing should be performed. When it is judged that the PM removal processing should be performed, next the routine proceeds to step 101a where the SOx increasing processing, for example, SOx increasing temperature processing, is performed. Next, the routine proceeds to step 102 where the PM removal processing is performed. Next, the routine proceeds to step 103. When it is not judged at step 101 that PM removal processing should be performed, the routine jumps to step 103. At step 103, it is judged if ash atomization processing should be performed. When it is judged that ash atomization processing should be performed, next, the routine proceeds to step 104 where the ash atomization processing is performed. Next, the processing cycle is ended. When it is not judged at step 103 that the ash atomization processing should be performed, the processing cycle is ended. Note that the electronic control unit is programmed to perform the SOx increasing processing or the SOx increasing temperature processing.

Next, a 10th embodiment according to the present invention will be explained. Below, mainly the points of difference between the 10th embodiment and the ninth embodiment will be explained.

Even assuming the atomized ash is released from the ash atomization agent 78, the atomized ash may remain on the particulate filter 24. If the atomized ash which remains on the particulate filter 24 in this way reaggregates, it is liable to no longer be able to be removed from the particulate filter 24.

On the other hand, when the quantity of the exhaust gas which flows into the particulate filter 24 is large, the atomized ash rides the flow of the exhaust gas and thereby easily proceeds to the insides of the pores of the particulate filter 24, that is, is easily removed from the particulate filter 24.

Thus, in the 10th embodiment according to the present invention, it is judged if the quantity QEX of the exhaust gas which flows into the particulate filter 24 is greater than a predetermined set quantity QEXS. When it is judged that the quantity QEX of the inflowing exhaust gas is greater than the set quantity QEXS, SOx increasing processing is performed. In particular, in the 10th embodiment according to the present invention, when it is judged that the quantity QEX of the inflowing exhaust gas is greater than the set quantity QEXS, SOx increasing oxygen concentration processing for making the SOx storage agent 29 release SOx by maintaining the particulate filter 24 in an oxidizing atmosphere while lowering the concentration of oxygen in the exhaust gas which flows to the SOx storage agent 29 is performed. As a result, the feed of the SOx from the SOx storage agent 29 to the ash atomization agent 78 is increased, so the atomized ash is easily released from the ash atomization agent 78. At this time, the quantity QEX of the exhaust gas which flows into the particulate filter 24 is great, so the atomized ash which is released from the ash atomization agent 78 is quickly removed from the particulate filter 24.

Figure 39:
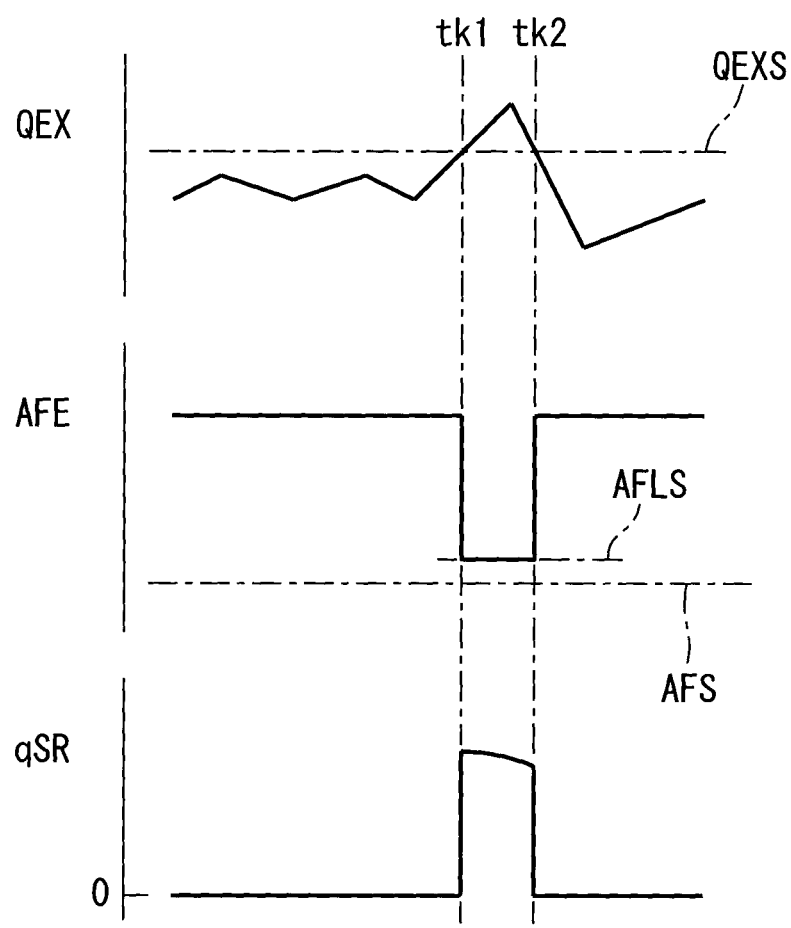
FIG. 39 is a time chart which explains exhaust purification control of a 10th embodiment according to the present invention.

That is, at the time tk1 in FIG. 39, if the quantity QEX of the exhaust gas which flows into the particulate filter 24 exceeds the set quantity QEXS, the exhaust gas which flows into the SOx storage agent 29 or the particulate filter 24 is decreased in the air-fuel ratio AFE to the slightly lean air-fuel ratio AFLS and held there. As a result, the SOx storage agent 29 increases in SOx release speed qSR, that is, the SOx storage agent 29 releases SOx. Next, at the time tk2, if the quantity QEX of the inflowing exhaust gas becomes smaller than the set quantity QEXS, the inflowing exhaust gas is returned to the original air-fuel ratio AFE.

Note that, in the ash atomization processing, the inflowing exhaust gas has to be maintained at the stoichiometric air-fuel ratio AFS or rich in the air-fuel ratio AFE. Therefore, during the ash atomization processing, the above-mentioned SOx increasing processing is prohibited.

The quantity QEX of the inflowing exhaust gas is expressed by the engine acceleration degree. In the 10th embodiment according to the present invention, when an engine acceleration operation has been performed, it is judged if the quantity QEX of the inflowing exhaust gas is greater than the set quantity QEXS. In this case, it is judged that an engine acceleration operation has been performed when the amount of depression of the accelerator pedal 39 exceeds a corresponding threshold value. In another embodiment, it is judged that an engine acceleration operation has been performed when the fuel injection quantity exceeds a corresponding threshold value. Furthermore, in another embodiment, it is judged that an engine acceleration operation has been performed when the quantity of intake air exceeds a corresponding threshold value.

Figure 40:
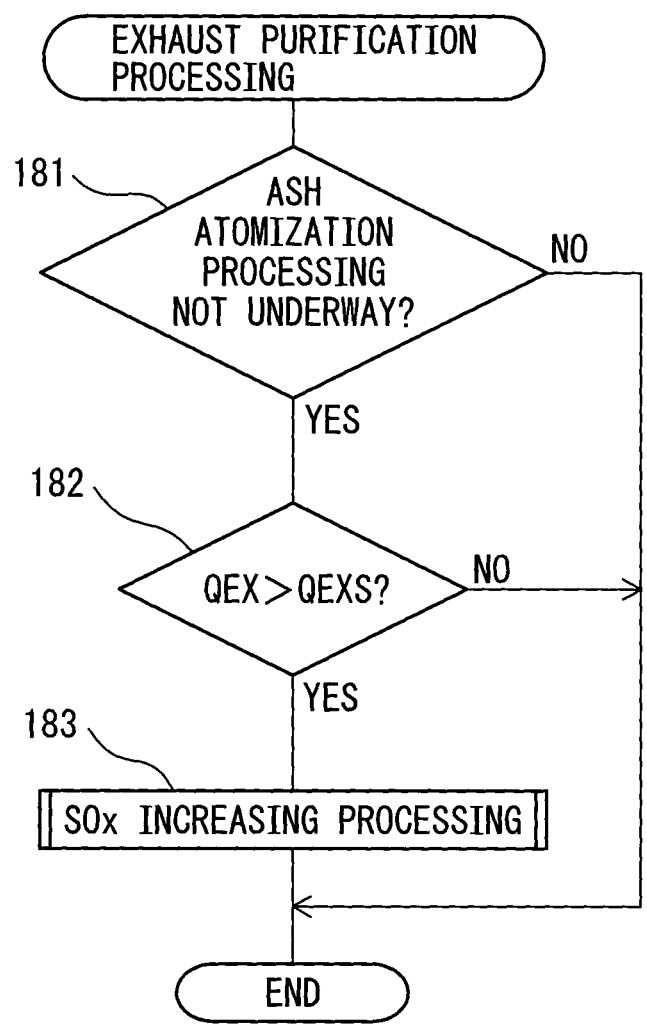
FIG. 40 is a flow chart of performance of a routine which performs exhaust purification control of a 10th embodiment according to the present invention.

FIG. 40 shows the routine for performing exhaust purification control of the 10th embodiment according to the present invention. Referring to FIG. 40, at step 181, it is judged if ash atomization processing isn't being performed. When the ash atomization processing isn't being performed, next, the routine proceeds to step 182 where it is judged if the quantity QEX of the inflowing exhaust gas is greater than the set quantity QEXS. When QEX>QEXS, next, the routine proceeds to step 183 where SOx increasing processing, for example, SOx increasing oxygen concentration processing is performed. That is, the inflowing exhaust gas is switched in the air-fuel ratio AFE to the slightly leaner air-fuel ratio AFLS. When QEX≤QEXS, the processing cycle is ended. When, at step 121, the ash atomization processing is being performed, the processing cycle is ended. That is, during the ash atomization processing, the SOx increasing processing is not performed. Note that the electronic control unit is programmed to perform the SOx increasing processing or the SOx increasing oxygen concentration processing.

Note that, in another embodiment, instead of the SOx increasing temperature processing of the ninth embodiment according to the present invention, SOx increasing oxygen concentration processing is performed.

Furthermore, in another embodiment, instead of the SOx increasing oxygen concentration processing of the 10th embodiment according to the present invention, SOx increasing temperature processing is performed. However, a certain time period is required for raising the temperature of the SOx storage agent to the temperature where SOx is released. As opposed to this, the inflowing exhaust gas can be quickly switched in the air-fuel ratio AFE. Therefore, if performing the SOx increasing oxygen concentration processing, the SOx storage agent 29 can be quickly made to release SOx. As a result, the atomized ash can be quickly and reliably removed from the particulate filter 24.

Next, an 11th embodiment according to the present invention will be explained. Below, mainly the points of difference between the 11th embodiment and the 10th embodiment will be explained.

In the 11th embodiment according to the present invention, it is judged if the quantity QEX of the exhaust gas which flows in when the PM removal processing is being performed is greater than the set quantity QEXS. When it is judged that the quantity QEX of the exhaust gas which flows in when the PM removal processing is being performed is greater than the set quantity QEXS, SOx increasing processing, for example, SOx increasing oxygen concentration processing, is performed.

Figure 41:
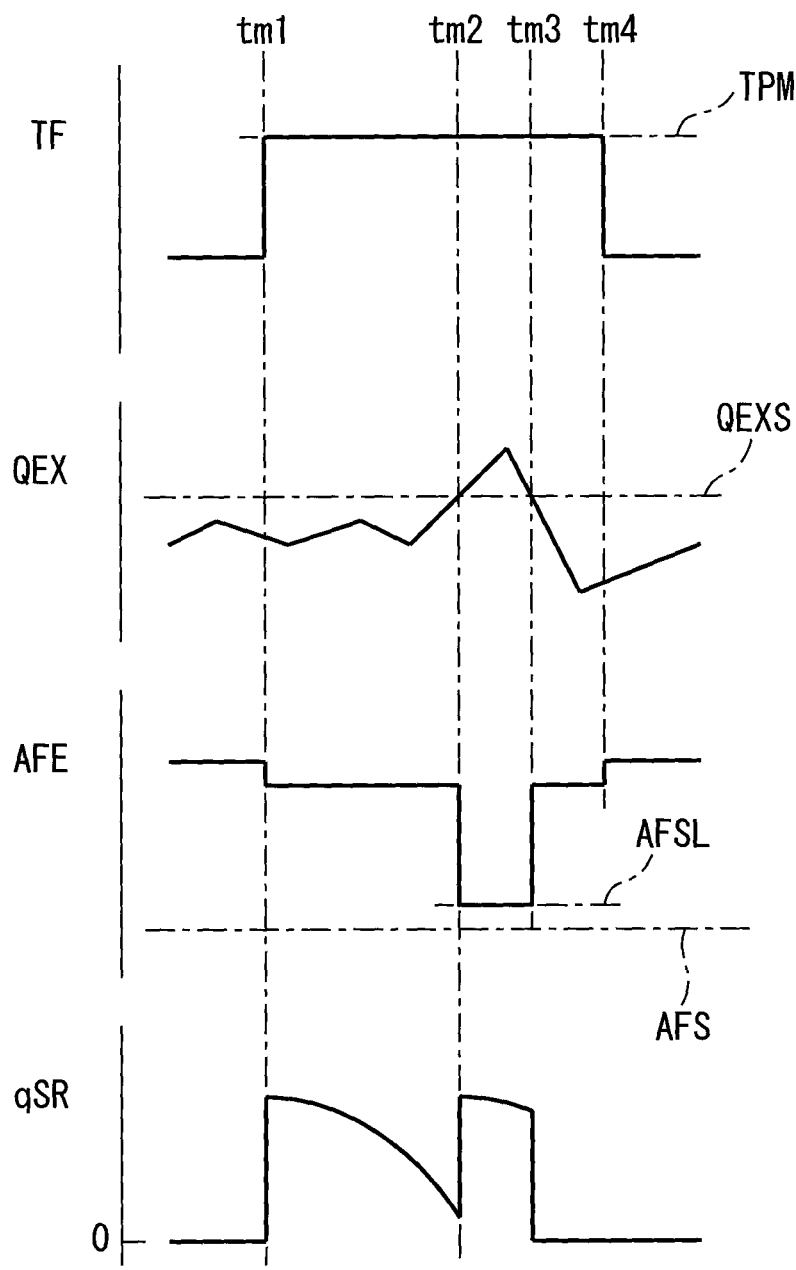
FIG. 41 is a time chart which explains exhaust purification control of an 11th embodiment according to the present invention.

That is, as shown in FIG. 41, at the time tm1, if the PM removal processing is started, the temperature TF of the particulate filter 24 or SOx storage agent 29 is raised. As a result, the SOx storage agent 29 increases in SOx release speed qSR. That is, the SOx storage agent 29 releases SOx. This SOx is next fed to the ash atomization agent 78, therefore the ash atomization agent 78 releases the atomized ash.

Next, at the time tm2, if the quantity QEX of the inflowing exhaust gas exceeds the set quantity QEXS, the SOx increasing oxygen concentration processing is performed. That is, the exhaust gas which flows into the SOx storage agent 29 or the particulate filter 24 is decreased in the air-fuel ratio AFE to the just slightly lean air-fuel ratio AFLS. As a result, the SOx storage agent 29 again increases in SOx release speed qSR. That is, the longer the elapsed time from when the PM removal processing is started, the more the decreased SOx release speed qSR again increases. As a result, the ash atomization agent 78 further releases the atomized ash and the ash is further removed from the particulate filter 24.

Next, at the time tm3, if the quantity QEX of the inflowing exhaust gas becomes smaller than the set quantity QEXS, the inflowing exhaust gas is returned to the original air-fuel ratio AFE. Next, at the time tm4, the PM removal processing is ended.

Figure 42:
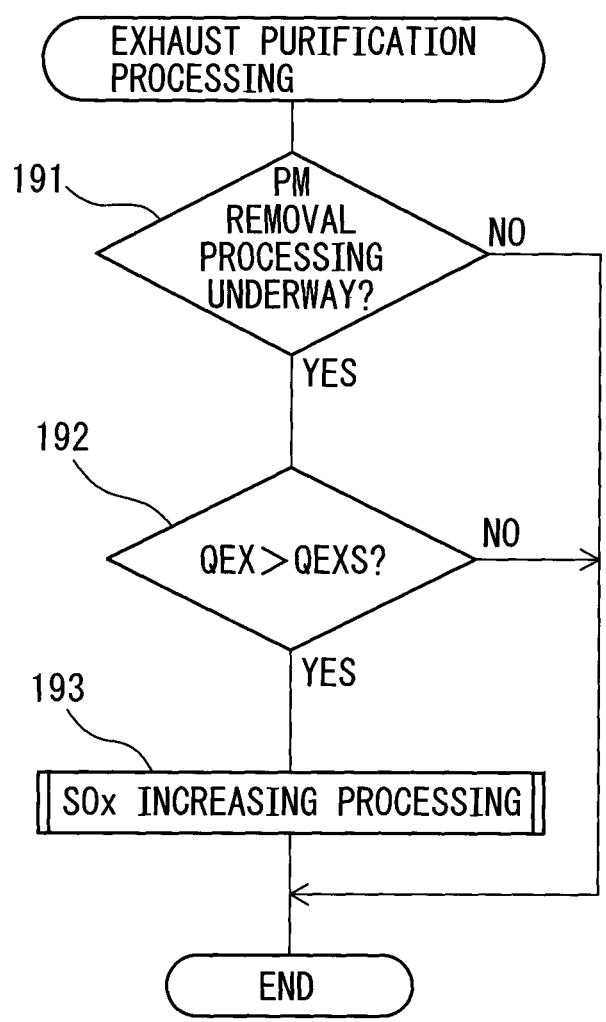
FIG. 42 is a flow chart which performs exhaust purification control of the 11th embodiment according to the present invention.

FIG. 42 shows the routine for performing exhaust purification control of the 11th embodiment according to the present invention. Referring to FIG. 42, at step 191, it is judged if PM removal processing is being performed. When PM removal processing is being performed, next, the routine proceeds to step 192 where it is judged if the quantity QEX of the inflowing exhaust gas is greater than the set quantity QEXS. When QEX>QEXS, next, the routine proceeds to step 193 where SOx increasing processing, for example, SOx increasing oxygen concentration processing, is performed. When QEX≤QEXS, the processing cycle is ended. When, at step 191, the PM removal processing is not performed, the processing cycle is ended.

In another embodiment, when the PM removal processing is being performed and it is judged that the quantity QEX of the inflowing exhaust gas is greater than the set quantity QEXS, the SOx increasing temperature processing is performed. In this case, the temperature TF of the SOx storage agent 29 or the particulate filter 24 is raised higher than the PM removal temperature TPM.

Next, a 12th embodiment according to the present invention will be explained. Below, mainly the points of difference between the 12th embodiment and the first embodiment will be explained.

Figure 43:
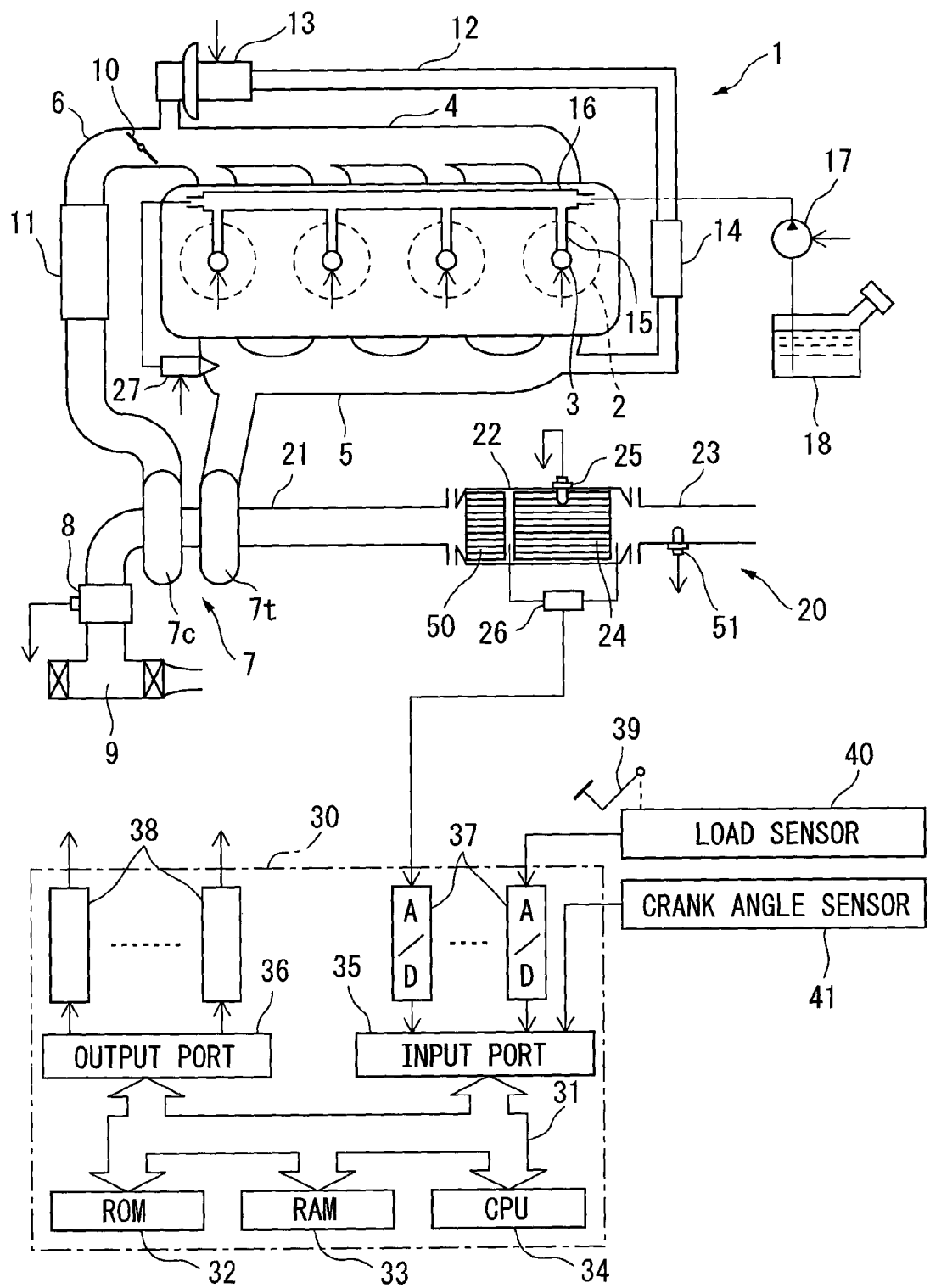
FIG. 43 is an overall view of an internal combustion engine of a 12th embodiment according to the present invention.

Referring to FIG. 43, the catalytic converter 22 holds inside it upstream of the particulate filter 24 an ammonia producing catalyst 50. Note that the temperature of the ammonia producing catalyst 50 can be considered to be substantially equal to the temperature of the particulate filter 24 and the air-fuel ratio of the exhaust gas which flows into the ammonia producing catalyst 50 can be considered to be equal to the air-fuel ratio AFE of the exhaust gas which flows into the particulate filter 24. Furthermore, downstream of the particulate filter 24 in the exhaust pipe 23, a NOx sensor 51 is attached for detecting the quantity of NOx in the exhaust gas which flows out from the particulate filter 24.

The ammonia producing catalyst 50 forms a honeycomb structure provided with a plurality of exhaust flow passages which are separated from each other by thin partition walls. These exhaust flow passages are alternately opened at their upstream ends and downstream ends. Further, the ammonia producing catalyst 50 is provided with a carrier which is carried on the two side surfaces of the partition walls and for example is formed from a base metal oxide such as alumina $Al_2O_3$ and a precious metal catalyst such as platinum Pt and palladium Pd which is carried on the carrier.

The ammonia producing catalyst 50 produces ammonia $NH_3$ from the NOx in the exhaust gas which flows in when the inflowing exhaust gas is rich in air-fuel ratio AFE. That is, when the inflowing exhaust gas is rich in the air-fuel ratio AFE, at this time, hydrogen $H_2$ is produced from the carbon monoxide CO which is contained in the inflowing exhaust gas ($CO+H_2O \rightarrow CO_2+H_2$). Next, the hydrogen $H_2$ reacts with the NOx in the inflowing exhaust gas whereby ammonia $NH_3$ is produced ($2NO+5H_2 \rightarrow 2NH_3+2H_2O$). On the other hand, if the inflowing exhaust gas is lean or at the stoichiometric air-fuel ratio in the air-fuel ratio AFE, the ammonia producing catalyst 50 does not produce ammonia $NH_3$ from the NOx.

As explained above, if the ash atomization processing is performed, the acid points of the ash atomization agent 78 hold the atomized ash. Next, if the ash atomization processing is ended and normal operation is returned to, the atomized ash is gradually released from the acid points of the ash atomization agent 78. Therefore, the acid points 78 are gradually regenerated. On this point, if focusing on the number of acid points which do not hold the atomized ash, i.e., the active acid points, that is, the quantity QACD of acid of the ash atomization agent 78, performing the ash atomization processing results in the quantity QACD of acid decreasing. Next, if normal operation is returned to, the quantity QACD of acid gradually increases.

On the other hand, the atomization action of the ash is performed by the untreated ash reaching the active acid points of the ash atomization agent 78. Therefore, after the ash atomization processing is performed, when the number of active acid points of the ash atomization agent 78, that is, the quantity QACD of acid, is small, even if performing the next ash atomization processing, the untreated ash is liable to be unable to be sufficiently atomized.

Thus, in the 12th embodiment according to the present invention, after the ash atomization processing is performed, the quantity QACD of acid of the ash atomization agent 78 is found. When the quantity QACD of acid is larger than a predetermined set quantity QACDS, the next ash atomization processing is made to be performed.

Figure 44:
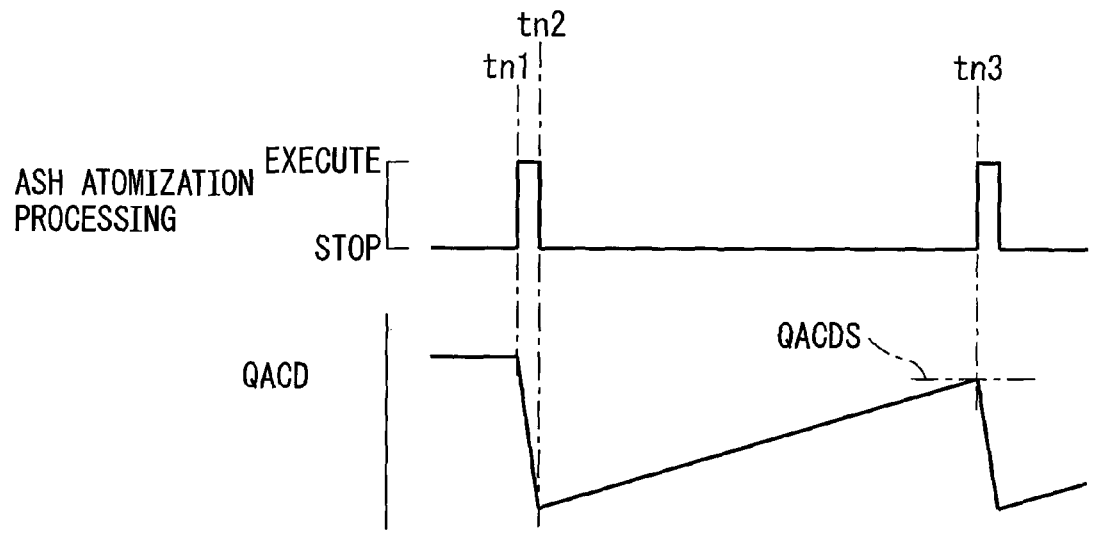
FIG. 44 is a time chart which explains exhaust purification control of the 12th embodiment according to the present invention.

That is, as shown in FIG. 44, at the time tn1, if the ash atomization processing is started, the quantity QACD of acid of the ash atomization agent 78 decreases. Next, at the time tn2, if the ash atomization processing is ended and normal operation is returned to, the quantity QACD of acid gradually increases. Next, at the time tn3, if the quantity QACD of acid exceeds the set quantity QACDS, the ash atomization processing is again performed.

As a result, the next ash atomization processing can be performed at the optimal timing. Therefore, the ash atomization processing can be used to sufficiently and efficiently treat the untreated ash.

The quantity QACD of acid of the ash atomization agent 78 expresses the ash atomization ability of the ash atomization agent 78. Therefore, after the ash atomization processing is performed, the ash atomization ability of the ash atomization agent 78 is found and it is judged whether to perform the next ash atomization processing on the basis of the found ash atomization ability. Specifically, when the ash atomization ability of the ash atomization agent 78 is higher than a predetermined set ability, the next ash atomization processing is performed.

Figure 45:
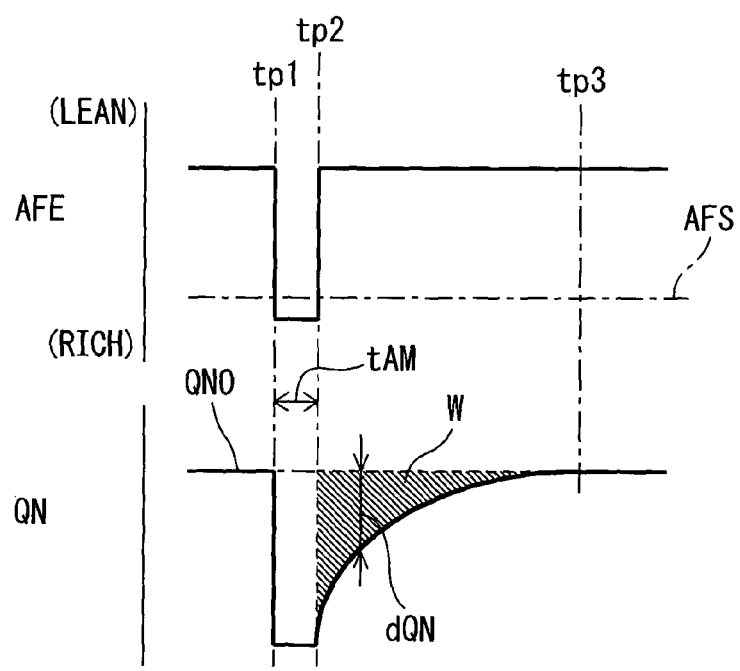
FIG. 45 is a time chart which explains the way for finding the quantity of acid of the ash atomization agent.

The way for finding the ash atomization ability of the ash atomization agent 78, that is, the quantity QACD of acid, will be explained referring to FIG. 45. Referring to FIG. 45, at the time tp1, the exhaust gas which flows into the ammonia producing catalyst 50 or the particulate filter 24 is switched to a rich air-fuel ratio AFE. As a result, at the ammonia producing catalyst 50, ammonia $NH_3$ gas is produced from the NOx in the inflowing exhaust gas and is fed to the ash atomization agent 78. For this reason, the quantity QN of NOx in the exhaust gas flowing out from the particulate filter 24 is greatly decreased from the quantity of outflow of NOx before the feed of ammonia $NH_3$, that is, the initial quantity QN0.

Figure 46A:
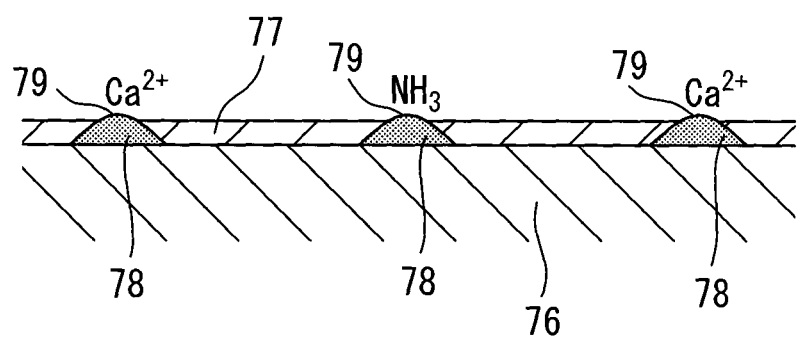
FIG. 46A is a view which explains the way for finding the quantity of acid of the ash atomization agent.

At this time, the ash atomization agent 78 is in a reducing atmosphere. As a result, as shown in FIG. 46A, the active acid points 79 of the ash atomization agent 78 hold ammonia $NH_3$ by for example adsorption. The acid points 79 which hold calcium ions $Ca^{2+}$ do not hold ammonia $NH_3$.

Next, when the time tp2 is reached, that is, the ammonia $NH_3$ is produced and fed for the predetermined set time tAM, the production and feed of ammonia $NH_3$ are ended. That is, the inflowing exhaust gas is returned to a lean air-fuel ratio AFE. The set time tAM is the time period which is required for making substantially all of the acid points 79 of the ash atomization agent 78 hold ammonia $NH_3$ and is for example found in advance by experiments.

Figure 46B:
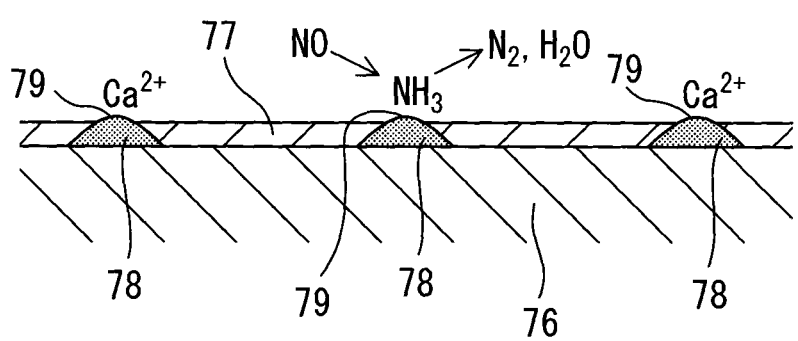
FIG. 46B is a view which explains the way for finding the quantity of acid of the ash atomization agent.

If the air-fuel ratio of the inflowing exhaust gas is returned to a lean air-fuel ratio AFE, the ash atomization agent 78 is in an oxidizing atmosphere and the inflowing exhaust gas contains NOx. As a result, as shown in FIG. 46B, the ammonia $NH_3$ which is held at the ash atomization agent 78 reacts with the NOx ($4NH_3+4NO+O_2 \rightarrow 4N_2+6H_2O$). In other words, the ammonia $NH_3$ which was held at the ash atomization agent 78 is removed by the NOx in the inflowing exhaust gas. For this reason, as shown in FIG. 45, right after the inflowing exhaust gas is returned to a lean air-fuel ratio AFE, the quantity QN of outflowing NOx becomes smaller. However, along with the elapse of time, the quantity of ammonia which is held by the ash atomization agent 78 gradually decreases, therefore the quantity QN of outflowing NOx gradually increases.

Next, when the time tp3 is reached, the quantity QN of the outflowing NOx becomes substantially equal to the initial quantity QN0. This means that substantially all of the ammonia $NH_3$ which was held at the ash atomization agent 78 was removed by the NOx.

The difference dQN (=QN0−QN) between the quantity QN of outflowing NOx and the initial quantity QN0 expresses the quantity of NOx which reacted with the ammonia $NH_3$, therefore expresses the quantity of ammonia which was held by the active acid points of the ash atomization agent 78. Therefore, the cumulative value of the difference dQN from the time tp2 to the time tp3 accurately expresses the number of active acid points of the ash atomization agent 78, that is, the quantity of acid. Note that the cumulative value of the difference dQN corresponds to the hatched region W in FIG. 45.

Therefore, ammonia is temporarily fed to the ash atomization agent 78 under a reducing atmosphere, the quantity of ammonia which is held by the ash atomization agent 78 is found, and the ash atomization ability is found on the basis of the found quantity of ammonia. Furthermore, the quantity of ammonia which is held at the ash atomization agent 78 is found on the basis of the quantity of NOx which flows out from the particulate filter 24 under an oxidizing atmosphere after the feed of ammonia to the ash atomization agent.

Figure 47:
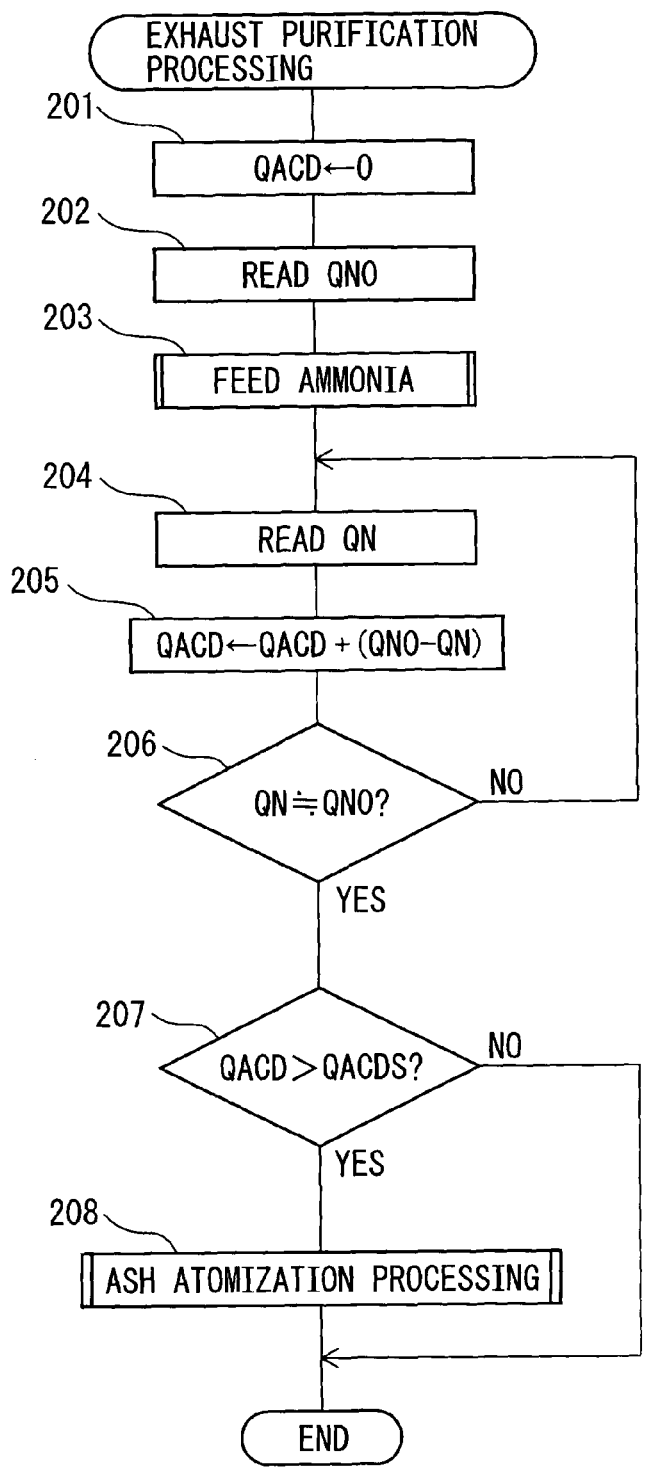
FIG. 47 is a flow chart which shows a routine for performing the exhaust purification control of the 12th embodiment according to the present invention.

FIG. 47 shows the routine for performing the exhaust purification control of the 12th embodiment according to the present invention. The routine of FIG. 47 is executed after the ash atomization processing is performed. Referring to FIG. 47, at step 201, the quantity QACD of acid of the ash atomization agent 78 is reset to zero. At the next step 202, the quantity QN0 of NOx in the outflowing exhaust gas before the feed of ammonia $NH_3$ is read. At the next step 203, the ash atomization agent 78 is fed ammonia $NH_3$ temporarily. At the next step 204, the quantity QN of NOx in the outflowing exhaust gas after the feed of ammonia $NH_3$ is read.

At the next step 205, the quantity QACD of acid is updated (QACD=QACD+(QN0−QN)). At the next step 206, it is judged if the quantity QN of NOx in the outflowing exhaust gas is substantially equal to the quantity QN0 of NOx before feed of ammonia $NH_3$. Steps 204 and 205 are repeated until QN≈QN0. When QN≈QN0, next, the routine proceeds to step 207. At this time, the quantity QACD of acid reliably expresses the quantity of acid of the ash atomization agent 78. At step 207, it is judged if the quantity QACD of acid is greater than the set quantity QACDS. When QACD>QACDS, next, the routine proceeds to step 208 where the ash atomization processing is performed. As opposed to this, when QACDQACDS, the processing cycle is ended. That is, in this case, the ash atomization processing is not performed.

In the 12th embodiment according to the present invention, in the ammonia producing catalyst 50, ammonia $NH_3$ is produced and fed to the ash atomization agent 78. In another embodiment, ammonia gas is produced from urea or solid ammonia and is fed to the ash atomization agent 78.

Figure 48:
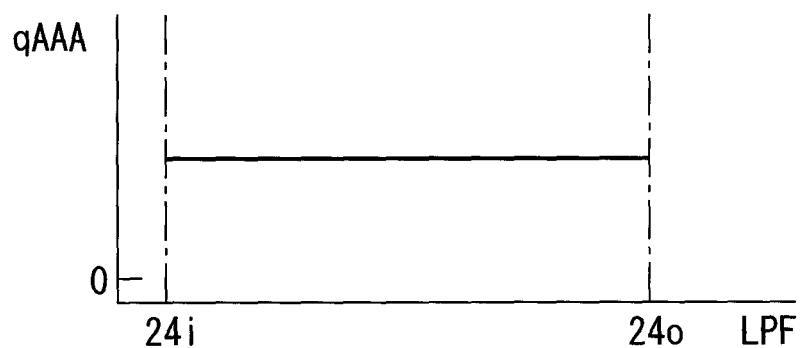
FIG. 48 is a graph which shows the carried quantity of the ash atomization agent.

FIG. 48 shows one example of the quantity qAAA of the carried ash atomization agent 78 per particulate filter unit volume in the embodiments according to the present invention. That is, in the example which is shown in FIG. 48, the quantity qAAA of the carried ash atomization agent 78 is set to be substantially constant across the entire long direction position LPF from the inflow end 24i to the outflow end 24o of the particulate filter 24.

Figure 49:
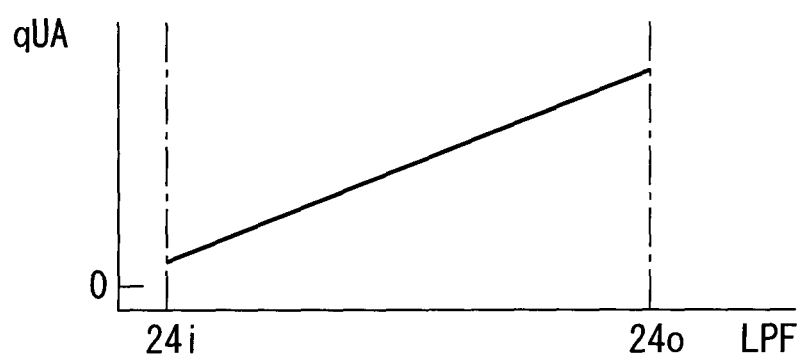
FIG. 49 is a graph which shows a distribution of untreated ash.
Figure 50A:
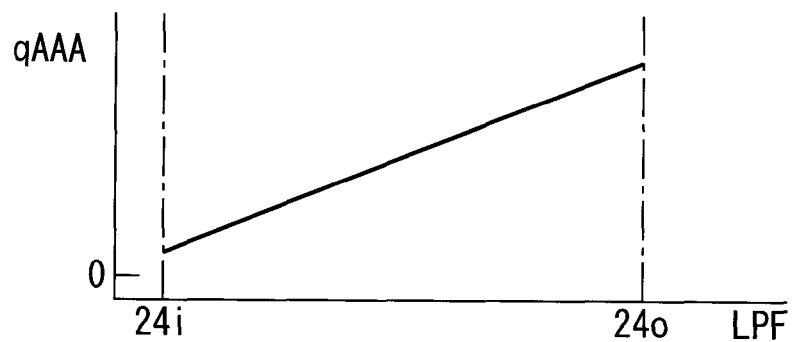
FIG. 50A is a graph which shows another example of the carried quantity of the ash atomization agent.
Figure 50B:
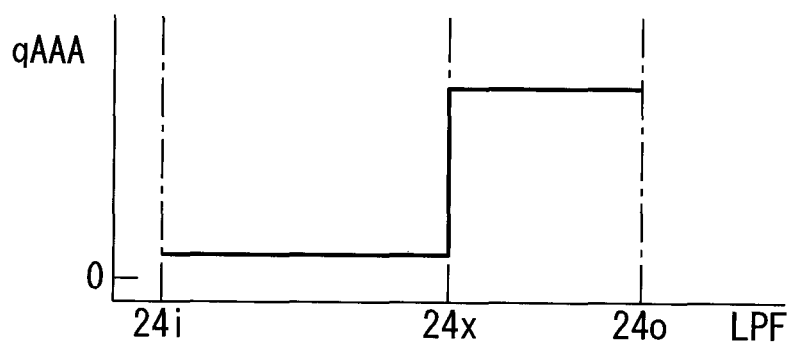
FIG. 50B is a graph which shows another example of the carried quantity of the ash atomization agent.
Figure 50C:
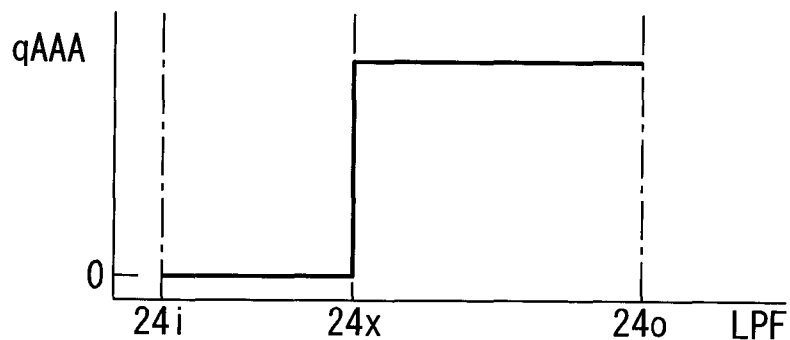
FIG. 50C is a graph which shows another example of the carried quantity of the ash atomization agent.

In this regard, the distribution of the untreated ash on the particulate filter 24 is not uniform across the long direction of the particulate filter 24. That is, as will be understood from FIG. 49 which shows the quantity qAU of untreated ash per particulate filter unit volume, compared with the quantity aAU of untreated ash at the upstream side part of the particulate filter 24, the quantity aAU of untreated ash at the downstream side part of the particulate filter 24 is greater. In other words, the quantity aAU of untreated ash is small around the inflow end 24i of the particulate filter 24 and becomes larger the more downstream in the flow of the exhaust gas and becomes greater around the outflow end 24o of the particulate filter 24.

For this reason, around the downstream end 24o of the particulate filter 24, the untreated ash is not sufficiently processed for ash atomization and is liable to remain at the particulate filter 24. Therefore, the quantity qAAA of the carried ash atomization agent 78 has to be set in accordance with the quantity aAU of untreated ash.

Thus, in the examples which are shown in FIG. 50A, FIG. 50B, and FIG. 50C, the quantity qAAA of the carried ash atomization agent 78 is set so that, compared with the quantity qAAA of the carried ash atomization agent 78 at the upstream side part of the particulate filter 24, the quantity qAAA of the carried ash atomization agent 78 at the downstream side part of the particulate filter 24 becomes greater. As a result, the untreated ash can be reliably and efficiently removed from the particulate filter 24.

Explaining this further, in the example which is shown in FIG. 50A, the quantity qAAA of the carried ash atomization agent 78 is continuously increased from the upstream end 24*i* of the particulate filter 24 toward the downstream end 24*o* of the particulate filter 24.

In the example which is shown in FIG. 50B, compared with the quantity qAAA of the carried ash atomization agent 78 from the inflow end 24*i* to the intermediate position 24*x*, the quantity qAAA of the carried ash atomization agent 78 from the intermediate position 24*x* to the outflow end 24*o* is set larger.

In the example which is shown in FIG. 50C, compared with the quantity qAAA of the carried ash atomization agent 78 from the inflow end 24*i* to the intermediate position 24*x*, the quantity qAAA of the carried ash atomization agent 78 from the intermediate position 24*x* to the outflow end 24*o* is set larger. Furthermore, the quantity qAAA of the carried ash atomization agent 78 from the inflow end 24*i* to the intermediate position 24*x* is set to substantially zero.

Regarding the examples which are shown in FIG. 50A, FIG. 50B, and FIG. 50C, it is possible to consider that the quantity qAAA of the carried ash atomization agent 78 is made smaller at the upstream side part of the particulate filter 24. According to this perspective, the pressure loss of the particulate filter 24 is made smaller at the upstream side part of the particulate filter 24.

Further, regarding the examples which are shown in FIG. 48, FIG. 50A, FIG. 50B, and FIG. 50C, it is possible to consider that the quantity qAAA of the carried ash atomization agent 78 is set so that the quantity qAAA of the carried ash atomization agent 78 at the downstream side part of the particulate filter 24 becomes substantially the same as or greater than the quantity qAAA of the carried ash atomization agent 78 at the upstream side part of the particulate filter 24.

In another embodiment, the embodiments according to the present invention which are explained up to here are suitably combined with each other. For example, the SOx storage agent is arranged upstream of the particulate filter 24, the PM removal processing is performed following the SOx increasing processing, and the ash atomization processing is performed following the PM removal processing.

The present application claims the benefits of International Application Nos. PCT/JP2011/065632, PCT/JP2011/065633, PCT/JP2011/065635, PCT/JP2011/065636, PCT/JP2011/065637, PCT/JP2011/065638, PCT/JP2011/065639, PCT/JP2011/065642, and PCT/JP2011/065648, the entire disclosures of which are incorporated herein by reference.

REFERENCE SIGNS LIST

1 engine body
21 exhaust pipe
22 catalytic converter
24 particulate filter
74 partition wall
78 ash atomization agent
79 acid point
80 ash

The invention claimed is:

1. An exhaust purification system for an internal combustion engine in which fuel is burned under an oxygen excess, comprising:
   a wall flow particulate filter configured to trap particulate matter in exhaust gas; and
   an ash atomizer configured to temporarily perform ash atomization processing:
   wherein:
   the particulate filter comprises a solid acid having an acid strength which is higher than the acid strength of sulfurous acid and lower than the acid strength of sulfuric acid, and
   the ash atomizer is configured to temporarily perform the ash atomization processing by temporarily decreasing a concentration of oxygen in the exhaust gas that flows into the particulate filter and increasing a temperature of the particulate filter to remove ash from the particulate filter.

2. The exhaust purification system as set forth in claim 1, wherein the acid strength of the solid acid is expressed by one or more parameters selected from the group consisting of a Hammett acidity function, hydrogen ion exponent, acid dissociation constant, and measurement value obtained by a temperature programmed desorption method using ammonia.

3. The exhaust purification system as set forth in claim 1, wherein the solid acid has a Hammett acidity function smaller than −0.83 and larger than −12 at standard ambient temperature and pressure of 25° C. and 1 atmosphere.

4. The exhaust purification system as set forth in claim 1, wherein the solid acid is formed from one or more complex oxides which are selected from the group consisting of: silica-alumina, silica-titania, titania-zirconia, silica-zirconia, silica-gallium oxide, titania-alumina, silica-yttrium oxide, alumina-zirconia, silica-lanthanum oxide, titania-cadmium oxide, titania-stannous oxide, titania-zinc oxide, zinc oxide-silica, and zinc oxide-cadmium oxide.

5. The exhaust purification system as set forth in claim 4, wherein the solid acid is formed from silica-alumina.

6. The exhaust purification system as set forth in claim 1, wherein the ash atomizer is configured to make an air-fuel ratio of the exhaust gas that flows into the particulate filter substantially stoichiometric or rich.

7. The exhaust purification system as set forth in claim 1, wherein the ash atomizer is configured to make a temperature of the particulate filter be about 600° C. during the ash atomization processing.

8. The exhaust purification system as set forth in claim 1, further comprising a particulate matter remover configured to temporarily remove particulate matter trapped by the particulate filter; wherein:
   the particulate matter remover is configured to temporarily increase a temperature of the particulate filter in an oxidizing atmosphere to temporarily remove the particulate matter trapped by the particulate filter; and
   the ash atomizer is configured to perform the ash atomization processing after the particulate matter remover removes the particulate matter.

9. The exhaust purification system as set forth in claim 8, particulate matter remover is configured to stop removing the particulate matter trapped by the particulate filter so that a predetermined, set quantity of residual particulate matter remains on the particulate filter.

10. The exhaust purification system as set forth in claim 1, wherein the ash atomizer is configured to:
    repeatedly perform the ash atomization processing at a predetermined, set interval,
    determine a quantity of ash that was processed by the ash atomizer, and
    update the set interval on the basis of the determined quantity of processed ash.

11. The exhaust purification system as set forth in claim 1, further comprising:
    an SOx storage agent arranged upstream of the particulate filter in the exhaust passage, and
    a particulate matter remover configured to temporarily remove particulate matter trapped by the particulate filter;
    wherein:
    the SOx storage agent is configured to:
      store SOx in the exhaust gas that flows into the SOx storage agent when the SOx storage agent has a low temperature or store SOx in the exhaust gas that flows into the SOx storage agent when the exhaust gas has a high concentration of oxygen, and
      release the stored SOx if the temperature of the SOx storage agent increases to a high temperature or if the concentration of oxygen in the exhaust gas that flows into the SOx storage agent becomes low,
    the particulate matter remover is configured to temporarily increase a temperature of the particulate filter in an oxidizing atmosphere to temporarily remove the particulate matter trapped by the particulate filter, and
    the SOx storage agent is configured to release SOx when the particulate matter remover removes the particulate matter trapped by the particulate filter.

12. The exhaust purification system as set forth in claim 11, further comprising an SOx increaser configured to temporarily increase a quantity of SOx that is released from the SOx storage agent and fed to the solid acid, wherein the SOx increaser is configured to increase the quantity of SOx that is released before the particulate matter remover removes the particulate matter trapped by the particulate filter.

13. The exhaust purification system as set forth in claim 11, further comprising an SOx increaser configured to temporarily increase a quantity of SOx that is released from the SOx storage agent and fed to the solid acid wherein the SOx increaser is configured to:

determine if a quantity of the exhaust gas that flows into the particulate filter is greater than a predetermined, set quantity; and temporarily increase the quantity of SOx that is released from the SOx storage agent and fed to the solid acid when the quantity of exhaust gas that flows into the particulate filter is greater than the set quantity.

14. The exhaust purification system as set forth in claim 1, wherein the ash atomizer is configured to determine an ash atomization ability of the solid acid after performing the ash atomization processing and to determine whether to perform another ash atomization processing on the basis of the determined ash atomization ability.

15. The exhaust purification system as set forth in claim 1, wherein a quantity per unit volume of the solid acid at a downstream side part of the particulate filter is greater than a quantity per unit volume of the solid acid at an upstream side part of the particulate filter.

16. The exhaust purification system as set forth in claim 1, wherein the particulate filter further comprises a catalyst that has an oxidation function, the catalyst being formed from ceria and silver.

17. The exhaust purification system as set forth in claim 1, wherein the particulate filter comprises exhaust gas inflow passages and exhaust gas outflow passages alternately arranged through porous partition walls.

* * * * *